(12) United States Patent
Kim et al.

(10) Patent No.: US 11,514,916 B2
(45) Date of Patent: Nov. 29, 2022

(54) SERVER THAT SUPPORTS SPEECH RECOGNITION OF DEVICE, AND OPERATION METHOD OF THE SERVER

(71) Applicant: SAMSUNG ELECTRONICS CO., LTD., Suwon-si (KR)

(72) Inventors: Chanwoo Kim, Suwon-si (KR); Sichen Jin, Suwon-si (KR); Kyungmin Lee, Suwon-si (KR); Dhananjaya N. Gowda, Suwon-si (KR); Kwangyoun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 39 days.

(21) Appl. No.: 16/992,943

(22) Filed: Aug. 13, 2020

(65) Prior Publication Data

US 2021/0050018 A1 Feb. 18, 2021

Related U.S. Application Data

(60) Provisional application No. 62/886,027, filed on Aug. 13, 2019.

(30) Foreign Application Priority Data

Oct. 24, 2019 (KR) .................... 10-2019-0133259
Feb. 14, 2020 (KR) .................... 10-2020-0018574

(51) Int. Cl.
*G10L 15/30* (2013.01)
*G10L 15/16* (2006.01)
*G10L 15/02* (2006.01)

(52) U.S. Cl.
CPC .............. *G10L 15/30* (2013.01); *G10L 15/02* (2013.01); *G10L 15/16* (2013.01)

(58) Field of Classification Search
CPC ......... G10L 15/30; G10L 15/02; G10L 15/16; G10L 2015/223; G10L 15/22; G10L 15/32

(Continued)

(56) References Cited

U.S. PATENT DOCUMENTS 5,895,447 A * 4/1999 Ittycheriah .............. G10L 15/07
704/251
6,205,261 B1 * 3/2001 Goldberg ............... G06V 10/98
382/187

(Continued)

FOREIGN PATENT DOCUMENTS

JP 2000-348141 A 12/2000
JP 4012143 B2 11/2007

(Continued)

OTHER PUBLICATIONS

Communication dated Feb. 5, 2021 issued by the European Patent Office in European Application No. 20190406.7.

(Continued)

*Primary Examiner* — Thuykhanh Le
(74) *Attorney, Agent, or Firm* — Sughrue Mion, PLLC

(57) ABSTRACT

A server for supporting speech recognition of a device and an operation method of the server. The server and method identify a plurality of estimated character strings from the first character string and obtain a second character string, based on the plurality of estimated character strings, and transmit the second character string to the device. The first character string is output from a speech signal input to the device, via speech recognition.

16 Claims, 26 Drawing Sheets

(58) Field of Classification Search
USPC .......................................................... 704/201
See application file for complete search history.

(56) References Cited

U.S. PATENT DOCUMENTS

| | | | |
|---|---|---|---|
| 6,269,335 B1* | 7/2001 | Ittycheriah | G10L 15/22 704/E15.04 |
| 6,400,805 B1* | 6/2002 | Brown | H04M 1/271 704/E15.045 |
| 6,789,057 B1* | 9/2004 | Morimoto | G06F 40/211 704/7 |
| 7,630,899 B1* | 12/2009 | Brown | G10L 15/06 704/235 |
| 7,933,777 B2 | 4/2011 | Koll | |
| 8,249,877 B2 | 8/2012 | Koll | |
| 9,009,041 B2* | 4/2015 | Zavaliagkos | G10L 15/26 704/238 |
| 9,131,369 B2 | 9/2015 | Ganong, III et al. | |
| 9,171,541 B2 | 10/2015 | Kennewick et al. | |
| 9,263,036 B1 | 2/2016 | Graves | |
| 9,305,554 B2 | 4/2016 | Jagatheesan et al. | |
| 9,401,147 B2* | 7/2016 | Jitkoff | H04M 1/72457 |
| 9,430,465 B2 | 8/2016 | Waibel et al. | |
| 9,520,126 B2 | 12/2016 | Kim et al. | |
| 9,620,122 B2 | 4/2017 | VanBlon | |
| 9,674,328 B2 | 6/2017 | Juneja | |
| 9,881,608 B2* | 1/2018 | LeBeau | G06F 40/166 |
| 9,886,952 B2 | 2/2018 | Choi et al. | |
| 10,032,451 B1* | 7/2018 | Mamkina | G10L 15/01 |
| 10,127,908 B1 | 11/2018 | Deller et al. | |
| 10,366,692 B1 | 7/2019 | Adams et al. | |
| 10,460,726 B2 | 10/2019 | Lee | |
| 10,748,532 B1* | 8/2020 | Antunes | G06F 40/106 |
| 2005/0131686 A1 | 6/2005 | Yamamoto et al. | |
| 2005/0182628 A1 | 8/2005 | Choi | |
| 2007/0033026 A1* | 2/2007 | Bartosik | G10L 15/22 704/E15.04 |
| 2007/0276651 A1* | 11/2007 | Bliss | G10L 15/30 704/9 |
| 2010/0131277 A1 | 5/2010 | Nakano | |
| 2013/0030804 A1* | 1/2013 | Zavaliagkos | G10L 15/24 704/235 |
| 2013/0151250 A1 | 6/2013 | VanBlon | |
| 2014/0012575 A1 | 1/2014 | Ganong, III et al. | |
| 2015/0051908 A1* | 2/2015 | Romriell | G06F 40/279 704/235 |
| 2015/0149167 A1 | 5/2015 | Beaufays et al. | |
| 2015/0279355 A1* | 10/2015 | Veksler | G10L 15/063 704/235 |
| 2015/0287406 A1* | 10/2015 | Kristjansson | G10L 15/20 704/233 |
| 2016/0171982 A1* | 6/2016 | Kore | H04R 27/00 704/235 |
| 2016/0275950 A1* | 9/2016 | Ogawa | G10L 15/183 |
| 2016/0379626 A1* | 12/2016 | Deisher | G10L 15/30 704/235 |
| 2017/0133007 A1* | 5/2017 | Drewes | G10L 15/22 |
| 2017/0148431 A1 | 5/2017 | Catanzaro et al. | |
| 2017/0256254 A1 | 9/2017 | Huang et al. | |
| 2017/0256264 A1* | 9/2017 | Stonehocker | G10L 15/30 |
| 2017/0372696 A1 | 12/2017 | Lee | |
| 2018/0130465 A1* | 5/2018 | Kim | G06F 40/284 |
| 2018/0174589 A1 | 6/2018 | Choi et al. | |
| 2018/0197545 A1* | 7/2018 | Willett | G10L 15/005 |
| 2018/0268409 A1* | 9/2018 | Guo | G06Q 20/4014 |
| 2019/0057683 A1 | 2/2019 | Sak et al. | |
| 2019/0103109 A1* | 4/2019 | Du | G06F 3/167 |
| 2019/0164002 A1* | 5/2019 | Choi | G06V 30/153 |
| 2019/0180740 A1 | 6/2019 | Nandy et al. | |
| 2019/0189115 A1 | 6/2019 | Hori et al. | |
| 2019/0189124 A1 | 6/2019 | Tsunsoo et al. | |
| 2019/0214039 A1* | 7/2019 | Nakayama | G10L 15/22 |
| 2019/0244604 A1 | 8/2019 | Masatakl et al. | |
| 2019/0312973 A1* | 10/2019 | Engelke | H04M 1/72433 |
| 2019/0370323 A1* | 12/2019 | Davidson | G06F 40/253 |
| 2020/0027445 A1* | 1/2020 | Raghunathan | G10L 15/183 |
| 2020/0153957 A1* | 5/2020 | Engelke | G10L 15/01 |
| 2020/0202159 A1* | 6/2020 | Zhou | G06F 40/103 |
| 2020/0286485 A1* | 9/2020 | Steelberg | G10L 15/063 |
| 2020/0327893 A1* | 10/2020 | Taki | G10L 15/22 |
| 2020/0357389 A1* | 11/2020 | Bai | G10L 25/21 |

FOREIGN PATENT DOCUMENTS

| | | | |
|---|---|---|---|
| JP | 2015-75706 A | | 4/2015 |
| JP | 2019-120841 A | | 7/2019 |
| KR | 1020030012064 A | | 2/2003 |
| KR | 10-2012-0110751 A | | 10/2012 |
| KR | 10-2015-0087687 A | | 7/2015 |
| KR | 101786533 B1 | | 10/2017 |
| KR | 10-2018-0001889 A | | 1/2018 |

OTHER PUBLICATIONS

International Search Report and Written Opinion dated Nov. 11, 2020 by the International Searching Authority in International Application No. PCT/KR2020/010494 (PCT/ISA/220; PCT/ISA210; PCT/ISA/237).

International Search Report and Written Opinion dated Nov. 13, 2020 by the International Searching Authority in International Application No. PCT/KR2020/010565 (PCT/ISA/220; PCT/ISA210; PCT/ISA/237).

International Search Report and Written Opinion dated Nov. 27, 2020 by the International Searching Authority in International Application No. PCT/KR2020/010567 (PCT/ISA/220; PCT/ISA/210; PCT/ISA/237).

Hoon Kim, [kakaoAIreport], "Voice recognition method and kakaoi's voice engine. brunch", Aug. 31, 2017, pp. 1-6, Retrieved from the Internet, Cited in Int. Search Report and Written Opinion dated Nov. 13, 2020 in PCT/KR2020/010565.

Guo, J., et al., "A Spelling Correction Model for End-To-End Speech Recognition", University of California, Los Angeles, USA; Google, Inc., USA; arXiv:1902.07178v1 [eess.AS], Feb. 19, 2019, 5 pages.

Communication dated Apr. 12, 2022 issued by the European Patent Office in European Application No. 20851479.4.

Hannun et al., "Deep Speech: Scaling up end-to-end speech recognition", Baidu Research—Silicon Valley AI Lab, arXiv:1412.5567v2 [cs.CL], Dec. 19, 2014, XP055453713, (12 total pages).

Communication dated Jul. 7, 2022 by the European Patent Office in European Patent Application No. 20852027.0.

Communication dated Oct. 11, 2022 by the European Patent Office in European Patent Application No. 20190406.7.

* cited by examiner

| ACTUAL CHARACTER \ ESTIMATED CHARACTER | a | e | b | p | ... |
|---|---|---|---|---|---|
| a | 0.56 | 0.23 | 0.01 | 0.01 | ... |
| e | 0.18 | 0.62 | 0.01 | 0.01 | ... |
| b | 0.01 | 0.01 | 0.43 | 0.35 | ... |
| p | 0.01 | 0.01 | 0.41 | 0.46 | ... |
| ⋮ | ⋮ | ⋮ | ⋮ | ⋮ | ⋮ |

SERVER THAT SUPPORTS SPEECH RECOGNITION OF DEVICE, AND OPERATION METHOD OF THE SERVER

CROSS-REFERENCE TO RELATED APPLICATIONS

This application is based on and claims the benefit of U.S. Provisional Patent Application No. 62/886,027, filed on Aug. 13, 2019, in the United States Patent and Trademark Office, and claims priority under 35 U.S.C. § 119 to Korean Patent Application No. 10-2019-0133259, filed on Oct. 24, 2019, in the Korean Intellectual Property Office, and Korean Patent Application No. 10-2020-0018574, filed on Feb. 14, 2020, in the Korean Intellectual Property Office, the disclosures of which are incorporated by reference herein in their entireties.

BACKGROUND

1. Field

The disclosure relates to a server for supporting speech recognition of a device and an operation method of the server. More specifically, the disclosure relates to a method of reinforcing a result of speech recognition by using server-side post-processing.

2. Description of the Related Art

With developments in electronic devices that perform various complex functions, electronic devices including a speech recognition function to improve device accessibility have been released on the market. In a speech recognition function, a speech of a user is recognized without any special button manipulation or contact with a touch module, and thus a device can be easily controlled.

According to this speech recognition function, for example, calling or messaging can be performed in portable terminals such as a smartphone and home appliances such as a TV and a refrigerator without requiring special button pressing operations, and various functions such as path finding, Internet searching, and alarm setting can be easily set in the portable terminals and the home appliances.

Recently, with developments in artificial intelligence (AI) technology, such artificial intelligence (AI) technology is connected to even speech recognition. Thus, quick and accurate recognition of various utterances has been enabled.

On-device speech recognition in which automatic speech recognition (ASR) is locally performed is applicable even when latency is short and a network is not connected. However, in server-based speech recognition, speech recognition is performed based on information stored in a server.

SUMMARY

Provided is a method in which a device selectively uses on-device speech recognition and server-based speech recognition.

Additional aspects will be set forth in part in the description which follows and, in part, will be apparent from the description, or may be learned by practice of the presented embodiments of the disclosure.

According to an embodiment of the disclosure, there is provided a server including a memory storing one or more computer-readable instructions: a processor configured to execute the one or more computer-readable instructions stored in the memory; and a communication interface configured to receive from a device a first character string of speech recognition by the device of a speech signal input to the device. The processor s further configured to execute the one or more instructions to: identify an estimated character string to replace a portion of the first character string, based on the first character string; and control the communication interface to transmit a second character string to the device, the second character string comprising the portion of the first character string replaced with the estimated character string. The first character string is output from a speech signal input to the device, via speech recognition.

According to an embodiment of the disclosure, there is provided an operation method of a server including receiving from a device a first character string of speech recognition by the device of a speech signal input to the device; and transmitting a second character string to the device, the second character string comprising the portion or the first character string replaced with the estimated character string. The first character string is output from a speech signal input to the device, via speech recognition.

According to an embodiment of the disclosure, there is provided a device including a memory storing one or more computer-readable instructions: a processor configured to execute the one or more instructions stored in the memory; and a communication interface configured to communicate with a server. The processor is further configured to execute the one or more instructions to: obtain a first character string by performing speech recognition on a speech signal; determine whether to replace a portion of the first character string with another character string; control the communication interface to transmit the first character string to the server, based on the determination; and control the communication interface to receive, from the server, a second character string obtained by the server by replacing the portion included in the first character string with an estimated character string.

According to an embodiment of the disclosure, there is provided an operation method of a device including obtaining a first character string by performing speech recognition on a speech signal; determining whether to replace a portion of the first character string with another character string; transmitting the first character string to a server, based on the determination; and receiving, from the server, a second character string obtained by the server by replacing the portion included in the first character string with an estimated character string.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
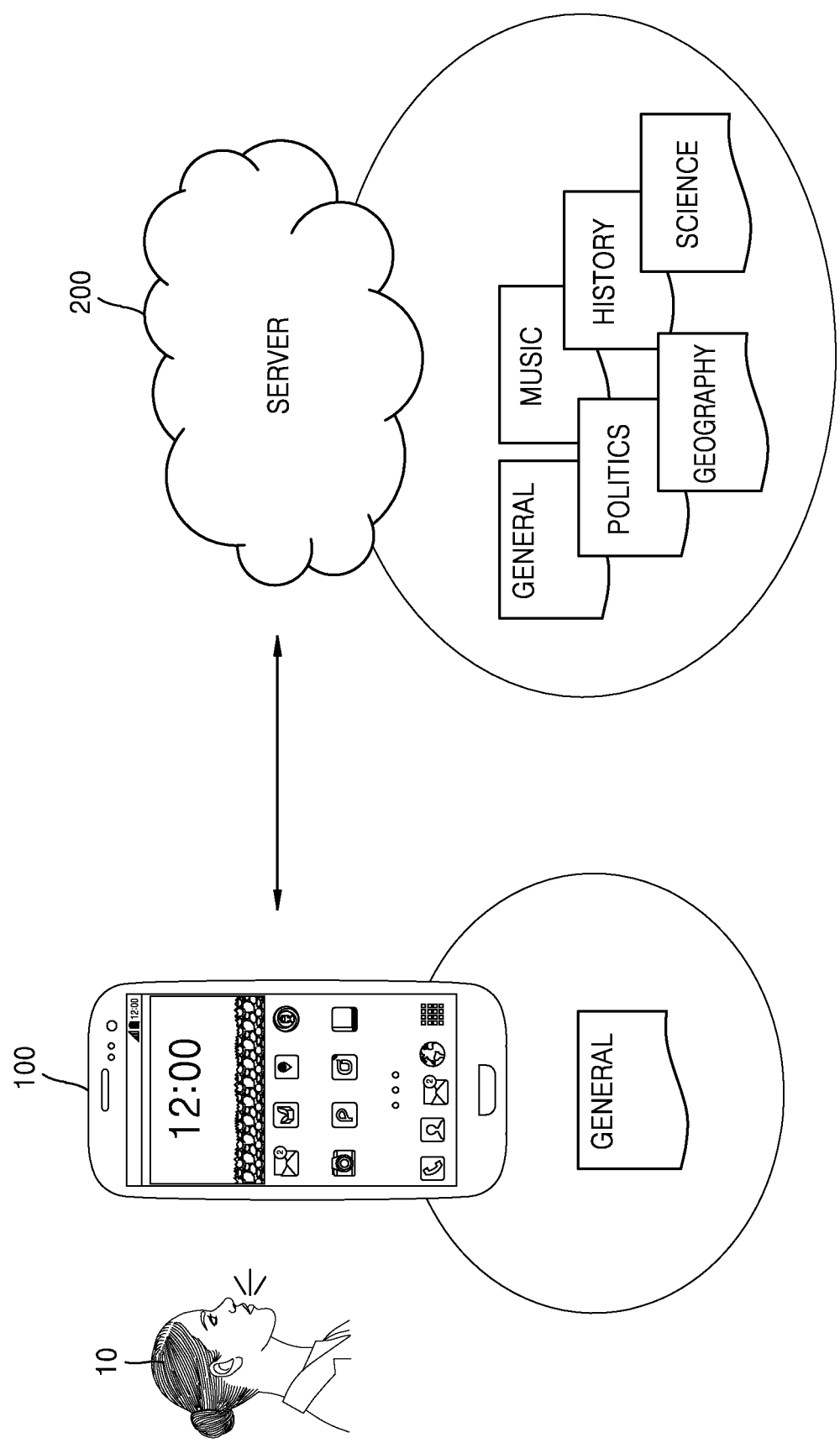
FIG. 1 is a diagram for comparing and explaining on-device speech recognition end server-based speech recognition.

Although general terms widely used at present were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be iced in a specific case. In this case, their meanings need to be assigned in the detailed description. Hence, the terms must be defined based on their meanings and the contents of the entire specification, not by simply stating the terms.

Throughout the disclosure, the expression "at least one of a, b or c" indicates only a, only b, only c, both a and b, both a and c, both b and c, all of a, b, and c, or variations thereof.

The terms "comprises" and/or "comprising" or "includes" and/or "including" when used in this specification, specify the presence of stated elements, but do not preclude the presence or addition of one or more other elements. The terms "unit," "-er (-or)," and "module" when used in this specification refer to a unit in which at least one function or operation is performed, and may be implemented as hardware, software, or a combination of hardware and software.

In the disclosure, the term "character" refers to a character used to write human language in visual form. Examples of characters may include Korean characters, alphabet characters, Chinese characters, numbers, phonetic symbols, punctuation marks, and other symbols.

In the disclosure, the term "character string" refers to a sequence of characters.

In the disclosure, the term "grapheme" is a smallest unit representing sound and being composed of at least one character. For example, in an alphabet notation system, one character may be a grapheme. Accordingly, a character in the disclosure may be referred to as a grapheme, and a character string in the disclosure may mean a sequence of graphemes. In the disclosure, a character string may also be referred to as text or a text string.

The term "morpheme" is a smallest meaningful unit that is composed of at least one grapheme. The term "word" is the smallest basic unit of language that is composed of at least one morpheme and may be used independently or represents a grammatical function. The term "phoneme" is a unit of sound that distinguishes one word from another in human language.

A speech recognition model according to an embodiment of the disclosure may transform a speech signal into a character string and output the character string. The character string output by the speech recognition model according to an embodiment of the disclosure may be a "frame-synchronized character string." The term "frame" may refer to a unit in which a speech signal is split at intervals of a preset time to process the speech signal, or the split speech signal itself. In the disclosure a "frame-synchronized character string" refers to a character string including characters respectively corresponding to the frames of a speech signal when the speech signal is transformed into the character string by a speech recognition model and the character string is generated as output.

For example, the speech recognition model may receive a speech signal corresponding to a "baseball" uttered by a user, and may output a frame-synchronized character string [b, b, a, a, a, s, s, e, b, b, a, a, l].

In the disclosure, when the speech recognition model generates a certain character string from a speech signal and outputs the certain character string, a "confidence score of a certain character string" refers to the accuracy of the speech recognition model having output the certain character string. For example, the confidence score of the certain character string may be calculated according to an equation previously determined based on, for example, a likelihood obtained from the certain character string, a partial Mamma output while the certain character string is being estimated, or a posteriori probability value. As the confidence score of the certain character string increases, it may be determined whether the certain character string was accurately estimated by the speech recognition model.

In the disclosure, "evaluation information of a certain character string" may refer to information about the certain character string used by a server according to recommend and output another character string having a confidence score greater than a confidence score of the certain character string. For example, the evaluation information of the certain character string may include likelihood of a plurality of estimated character strings obtained front the certain character string. The server according to an embodiment of the disclosure may select and output a character string having maximum likelihood or confidence from among the plurality of estimated character strings.

In the disclosure, "likelihood" may refer to a probability or possibility, and thus "likelihood of an event B with respect to an event A" may refer to a conditional probability P(B|A) indicating likelihood that the event B occurs when the event A occurs.

In the disclosure, when the speech recognition model generates the certain character string from the speech signal and outputs the certain character string, "likelihood obtained from a certain character string" refers to likelihood of the plurality of estimated character strings estimated from the certain character string. The plurality of estimated character strings estimated from the certain character string may refer to a plurality of character strings obtained by replacing at least one character within the certain character string with another character.

In greater detail, a character string output when speech recognition Is accurately perform is referred to as a ground truth character string, and "likelihood obtained from a certain character string" may refer to likelihood that the certain character string is estimated as a speech recognition result when each of the plurality of estimated character strings is assumed to be a ground truth character string. According to an embodiment of the disclosure, "likelihood obtained from a certain character string" may include likelihood matrices relating to replacement characters that are to respectively replace each character within the certain character string.

According to an embodiment of the disclosure, "likelihood obtained from a certain character string" may be used to identify replacement characters having pronunciations similar to each character within the certain character string and determine estimated character strings in which at least one character within the certain character string is corrected into another character, based on the identified replacement characters. Furthermore, a most appropriate estimated character string may be selected from the determined estimated character strings, based on pre-stored information such as a language model end dictionary information, and may be a recommended character string instead of the certain character string.

When the speech recognition model performs speech recognition, a result of previously performed speech recognition may affect a result of speech recognition that is subsequently performed. When a certain character is incorrectly recognized as another character having a similar pronunciation, the probability of incorrectly determined linguistic information due to the incorrect recognition, and thus characters behind the certain character are also incorrectly recognized, may increase. In other words, when a certain character is incorrectly recognized as another character, words determined by combining the certain character with the following characters and words determined by combining the other incorrectly-recognized character with the following characters may become different.

Accordingly, a device or server according to an embodiment of the disclosure may use likelihood obtained from a certain character string, to obtain a replacement character string by decoding the certain character string in consideration of both pronunciation information and language information about the certain character string.

In the disclosure, a "likelihood matrix obtained for a certain character" may refer to a matrix including likelihood values for replacement characters that are to replace the certain character. A "likelihood value for a replacement character that is to replace a certain character" may refer to a probability that the certain character is estimated as a speech recognition result when the certain character is assumed to be a ground truth character. For example, for a character "a" included in a character string obtained via speech recognition, a likelihood matrix [0.4 0.01 0.01 0.01 0.2 . . . 0.01] including a probability that a ground truth character is "a," a probability that the ground truth character is "b," a probability that a ground truth character is "c," . . . , and a probability that the ground truth character is "z" may be obtained. When a likelihood matrix including likelihood values for replacement characters corresponding to each character included in a character string is obtained, high likelihood values may be assigned to replacement characters having similar pronunciations to each character.

In the disclosure, "likelihood obtained from a certain character string" may be obtained from likelihood values relating to replacement characters corresponding to each character within the certain character string. The likelihood values relating to the replacement characters corresponding to each character within the certain character string may be calculated in consideration of characters accumulated prior to each character. However, embodiments of the disclosure are not limited thereto, and the likelihood values relating to the replacement characters corresponding to each character within the certain character string may be calculated by taking into account only each character without taking into account the characters accumulated prior to each character.

According to an embodiment of the disclosure, "likelihood obtained from a certain character string in consideration of the characters accumulated prior to each character within the certain character string" may be calculated from "posterior probabilities of each character included in the certain character string" and "a character sequence probability" of the certain character string.

A "posterior probability" of an event A refers to a conditional probability that the event A is anticipated when considering an event related to the event A, an observational fact, or background knowledge.

In the disclosure, when the speech recognition model generates a character string from a speech signal and outputs the character string, "posterior probabilities of a certain character within the character string" may include a probability that the speech recognition model has accurately predicted the certain character and a probability that the speech recognition model has incorrectly predicted the certain character as being another character, when considering the characters previous to the certain character within the character string.

In the disclosure, when the speech recognition model generates a character string from a speech signal and outputs the character string, a "character sequence probability of the character string" may refer to a probability that characters are arranged according to the character string.

According to an embodiment of the disclosure, "likelihood obtained from a certain character string in consideration of only each character within the certain character string" may be calculated from a "confusion matrix" including probabilities that the characters have been incorrectly predicted. In the disclosure, a "confusion matrix" is also referred to as an error matrix, and, when the speech recognition model transforms a speech signal into a certain character string and outputs the certain character string, the confusion matrix induces a probability that the speech recognition model has accurately predicted a certain character included in the certain character string and a probability that the speech recognition model has incorrectly predicted the certain character as being another character. For example, a probability that the speech recognition model has incorrectly predicted characters having pronunciations similar to the certain character as being the certain character may be more strongly weighted to the characters having pronunciations similar to the certain character.

In the disclosure, an "acoustic model" may refer to a model including information used to determine with which character or phonetic symbol a speech signal is matched, in units of graphemes. For example, a device according to an embodiment of the disclosure may calculate a probability that each of the characters is matched with the speech signal based on the acoustic model.

In the disclosure, "dictionary information" may include mapping information between a plurality of words and the characters included in each of the plurality of words. A "language model" may be an artificial intelligence (AI) model that has learned a relationship between words to estimate a probability of following words when a specific word string is assigned.

In the disclosure, an "artificial neural network" is a general term for a computing system realized based on the neural network of human or animal brains. The artificial neural network is one of detailed methods of machine learning, and thus is a network in which several neurons as nerve cells are connected. The artificial neural network may be implemented by using hardware, but is mainly implemented by using computer software. The artificial neural network is a connection of several neurons, each being a basic computing unit, to a weighted link. The weighted link may adjust a weight such that the weight may adapt to a given environment.

The artificial neural network is a general term for various models such as a self-organizing map (SOM), a recurrent neural network (RNN), and a convolutional neural network (CNN), and there are several types of artificial neural networks.

In the disclosure, a group of words related to a certain attribute is referred to as a domain of the certain attribute.

In the disclosure, an "operation of correcting a first character string" may refer to an operation of recommending and outputting a second character string having a confidence score greater than the first character string by replacing at least one character included in the first character string with another character. Accordingly, in the disclosure, expressions 'correction of a character string,' 'correction of a character,' 'replacement of a certain character with another character,' 'recommendation of another character instead of a certain character, 'replacement of a certain character string with another character string,' and 'recommendation of another character string instead of a certain character string' may be interchangeably used.

A device or server included in a speech recognition system according to an embodiment of the disclosure may be a voice assistant device and/or provide a "voice assistant service." The voice assistant service may be a service that provides a conversation with a user. The voice assistant service may provide a response message to the user, to imitate a person directly talking with the user in consideration of a situation of the user, a situation of the device, and the like. The voice assistant service may suitably generate information needed by the user and provide the information to the user, like a personal assistant of the user. The voice assistant service may be linked to access various services such as broadcasting services, content sharing services, content providing services, power management services, game providing services, chatting services, document wilting services, search services, calling services, photographing services, transportation recommendation services, and moving picture playback services, and may provide necessary information or necessary functions to a user.

Examples are described in detail herein with reference to the accompanying drawings so that this disclosure may be easily performed by one of ordinary skill in the art to which the disclosure pertain. The disclosure may, however, be embodied in many different forms and should not be construed as being limited to the examples set forth herein.

Embodiments of the disclosure now will be described more fully hereinafter with reference to the accompanying drawings.

FIG. 1 is a diagram for comparing and explaining on-device speech recognition and server-based speech recognition.

The on-device speech recognition refers to speech recognition locally executed by the device 100 with respect to an utterance of a user 10, and the server-based speech recognition refers to speech recognition with respect to the utterance of the user 10 received by the device 100 that is remotely performed by a server 200. That is, on-device speech recognition may not require connection of the device 100 to the server 200, while the server-based speech recognition may provide speech recognition using the device 100 and the server 200 in a client-server relationship.

As on-device speech recognition technology gradually develops with developments in end-to-end speech recognition and compression technology, a difference between performances of the on-device speech recognition and the server-based speech recognition is gradually decreasing. In particular, in speech recognition or general dictation of an utterance of an open domain that is not restricted in a particular field, a difference between performances of a device and a server may be negligible. The general dictation refers to writing-down of an utterance that does not correspond to a named entity-oriented domain. A named entity may include a particular place name, a particular personal name, a particular apparatus name, a particular trademark name, and the like. When describing a domain, a group of words related to a certain attribute is referred to as a domain of the certain attribute.

On-device speech recognition provides a latency of less than about 50 ms, which may be significantly shorter than a latency of several hundred ms of server-based speech recognition. Accordingly, on-device speech recognition may be more suitable in certain environments in which the device 100 operates, such as in a suburb, the inside of an airplane, or a wave shadow region where network accessibility is limited or unavailable. On-device speech recognition is more favorable in security and privacy invasion issues, and may reduce costs for managing a server.

Server-based speech recognition is realized in a server capable of storing more named entitles (such as, a place name, a personal name, and a trademark name) than a device.

Accordingly, according to server-based speech recognition, higher weights may be assigned to words related to new buzzwords or new song titles, and, when a word is not speech-recognized, a hotfix operation of repairing a defect of speech recognition by adding the word to a dictionary may be performed. Rescoring with respect to a speech recognition result by using, for example, a language model and dictionary information optimized for a third-party application that operates in a server may be performed.

Thus, general-purpose speech recognition such as dictation, general commands, and caption generation is performed by a device, but, when speech recognition needs to be performed by using, for example, a language model and dictionary information corresponding to a particular domain, hybrid speech recognition that is performed by a server is needed.

At this time, when the entire speech recognition process is divided and performed by a device and a server, dependency may be generated between the device and the server.

For example, a method may be used in which a calculation of applying an acoustic model to an utterance is performed by a device and a decoding calculation of applying a language model and dictionary information to an intermediate value extracted from an acoustic model is performed by a server. Because a dependency is generated between the device and the server according to this method, this method may not be used between a device and a server that are incompatible with each other.

As another example, in end-to-end speech recognition Including encoding calculation and decoding calculation, a method may be used in which only encoding calculation is performed by a device and decoding calculation with respect to encoded data is performed by a server. Because dictionary information regarding an encoding method is needed to perform the decoding calculation, a dependency is generated between the device performing encoding and the server performing decoding. Accordingly, even this method may not be used between a device and a server that are incompatible with each other.

Figure 2A:
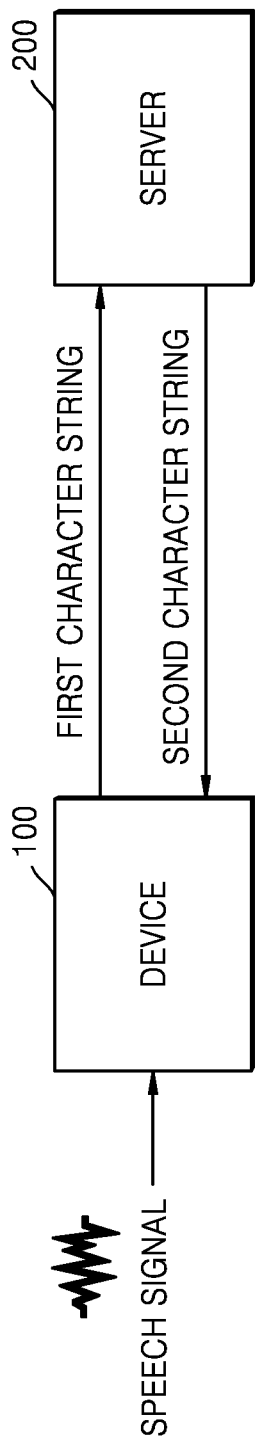
FIG. 2A is a block diagram of a speech recognition system according to an embodiment of the disclosure.

To address this problem, FIG. 2A illustrates a speech recognition system according to an embodiment of the disclosure.

The device 100 according to an embodiment of the disclosure may perform on-device speech recognition of transforming a speech signal into a first character string. The device 100 may determine whether the on-device speech recognition has failed, based on the confidence score of the first character string. When the device 100 determines that the on-device speech recognition has failed, the device 100 may transmit a first character string corresponding to a result of the on-device speech recognition to the server 200.

According to an embodiment of the disclosure, the device 100 may transmit information about the speech signal in the form of a character string to the server 200, and thus the server 200 may process the character string regardless of the on-device speech recognition that is used by the device 100.

According to an embodiment of the disclosure, the first character string transmitted by the device 100 to the server 200 may be a frame-synchronized character string.

A "frame" may refer to a unit n which a speech signal is spilt at intervals of a certain time to process the speech signal, or the split speech signal itself. A "frame-synchronized character string" refers to a character string including characters respectively corresponding to the frames of a speech signal when the speech signal is transformed into the character string by a speech recognition model and the character string is generated as output.

The device 100 according to an embodiment of the disclosure may generate a frame-synchronized character string as a speech recognition result by using an algorithm such as an recurrent neural network-transducer (RNN-T) or connectionist temporal classification (CTC).

However, embodiments of the disclosure are not limited thereto. Even when a speech recognition result of the device 100 according to an embodiment of the disclosure is not frame-synchronized, the device 100 may generate the frame-synchronized character string by performing forced alignment. The frame-synchronized character string and a detailed method of generating the frame-synchronized character string via forced alignment will be descried later in detail with reference to FIG. 6.

When a confidence score fora result of executing speech recognition by using on-device speech recognition is sufficiently high, the device 100 according to an embodiment of the disclosure may use the result of executing speech recognition, without changes.

On the other hand, when the device 100 according to an embodiment of the disclosure determines that the confidence score for the result of executing speech recognition via on-device speech recognition is insufficiently high, the device 100 may transmit a character string corresponding to the speech recognition result to the server 200.

Accordingly, when the device 100 according to an embodiment of the disclosure determines that the confidence score for the result of executing speech recognition via on-device speech recognition is greater than a confidence threshold, the device 100 does not transmit a speech signal to the server 200 to prevent the server 200 from restarting a speech recognition process from the beginning, thereby reducing a process time.

When the device 100 according to an embodiment of the disclosure determines that the confidence score for the result of executing speech recognition via on-device speech recognition less than a confidence threshold, the device 100 may transmit a character string corresponding to the speech recognition result to the server 200 in units of sentences, words, phrases, or frames.

When the device 100 according to an embodiment of the disclosure performs speech recognition and thus obtains a character string that constitutes a sentence or a phrase, the device 100 may transmit all of the characters included in the sentence or phrase to the server 200 or transmit only some of the characters included in the sentence or phrase to the server 200. The device 100 may transmit some characters having low confidence scores b the server 200, based an the confidence score of the character string.

The device 100 according to an embodiment of the disclosure may receive a character string corrected by the server 200, and may combine a character string not transmitted to the server 200 according to a determination that correction Is not necessary, with the corrected character string. The device 100 according to an embodiment of the disclosure may output a combined character string, or may provide a voice assistant service, based on a result of interpreting the combined character string.

The server 200 according b an embodiment of the disclosure may receive a character string corresponding to the speech recognition result from the device 100 in units of sentences, wards, phrases, or frames.

The server 200 according to an embodiment of the disclosure may correct an error to the received first character string by using a language model and dictionary information stored in the server 200. The server 200 may obtain a second character string from the first character string by using the language model in the server 200 including more pieces of information than the language model stored in the device 100. The server 200 may obtain the second character string by replacing at least one character included in the first character string with another character. The second character string may be a character string obtained by correcting an error included in the first character string.

In the disclosure, the server 200 according to an embodiment of the disclosure may correct the first character string by replacing at least one character included in the first character string received from the device 100 with another character, and may transmit a corrected first character string to the device 100.

An "operation of correcting a first character string" may refer to an operation of recommending and outputting a second character string having a higher confidence score than the first character string. Accordingly, in the disclosure, expressions 'correction of a character string,' 'correction of a character,' 'replacement of a certain character with another character,' recommendation of another character instead of a certain character, 'replacement of a certain character string with another character string,' and 'recommendation of another character string instead of a certain character string' may be interchangeably used with each other.

When the server 200 according to an embodiment of the disclosure obtains from the device 100 a character string that constitutes a sentence or a phrase, the server 200 may correct the characters included in the sentence or the phrase or may correct some of the characters included in the sentence or the phrase. The server 200 may correct some characters having low confidence scores, based on the confidence score of the character string.

The server 200 according b an embodiment of the disclosure may combine a character string that has not undergone correction according to a determination that correction is not necessary, with a corrected character string. The device 200 according to an embodiment of the disclosure may transmit a combined character string to the device 100.

The server 200 according to an embodiment of the disclosure may perform decoding with respect to the received character string, by using different pieces of dictionary information and different language models for different domains. According to an embodiment of the disclosure, because dictionary information is stored in the server 200, a new terminology or a new named entity may be easily hot-fixed.

The server 200 according b an embodiment of the disclosure may receive a character string from the device 100 and select a domain related to the received character string. For example, the server 200 may receive information of a domain related to the character string together with the character string from the device 100, and may determine a domain to perform decoding with respect to the character string, based on the received information. For example, the domain may be a subject area of the character string, such as baseball, weather, biology, etc. As another example, the server 200 may determine a domain related to the character string received from the device 100, based on the received character string. The server 200 according to an embodiment of the disclosure may perform decoding with respect to the received character string, by using dictionary information and a language model corresponding to the determined domain.

Accordingly, the server 200 according to an embodiment of the disclosure may output a speech recognition result having an improved speech recognition accuracy through re-decoding with respect to the character string received from the device 100. For example, the server 200 may receive the first character string from the device 100 and decode the first character string by using the language model and the dictionary information within the server 200, thereby outputting the second character string in which at least one character included in the first character string has been corrected.

The server 200 may transmit the second character string to the device 100. The device 100 may increase speech recognition accuracy performance by receiving the second character string having a confidence score greater than the first character string from the server 200 and utilize the second character string to improve speech recognition of a user voice input.

When the server 200 according to an embodiment of the disclosure obtains from the device 100 a character string including characters that constitute a sentence, the server 200 may correct an error to the entire sentence or may correct an error to some of the characters included in the sentence. The server 200 may correct an error to some characters having low confidence scores, based on the confidence score of the character string. The server 200 according to an embodiment of the disclosure may combine a character string not corrected according to a determination that correction is not necessary, with the corrected character string, thereby obtaining the second character string.

Referring to FIG. 2A, the server 200 according to an embodiment of the disclosure may transmit the second character string as a speech recognition result to the device 100. However, embodiments of the disclosure are not limited to the example of FIG. 2A.

Figure 2B:
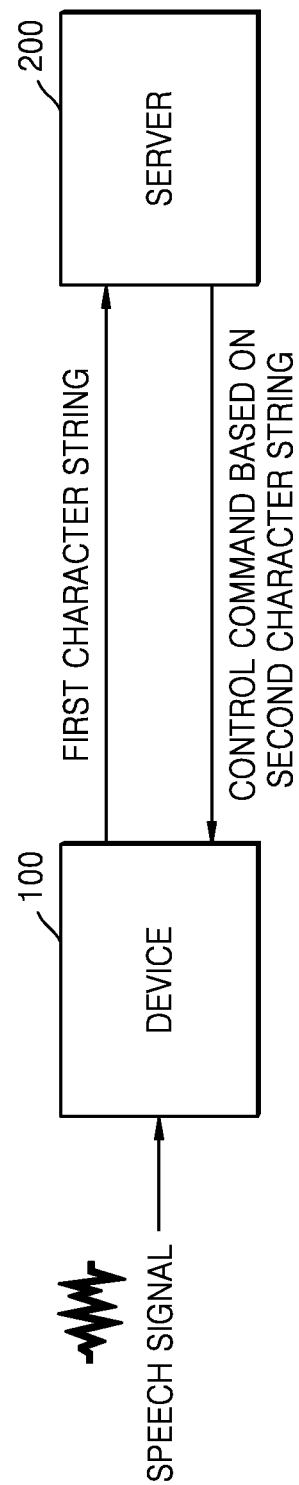
FIG. 2B is a block diagram of a speech recognition system according to an embodiment of the disclosure.
Figure 2C:
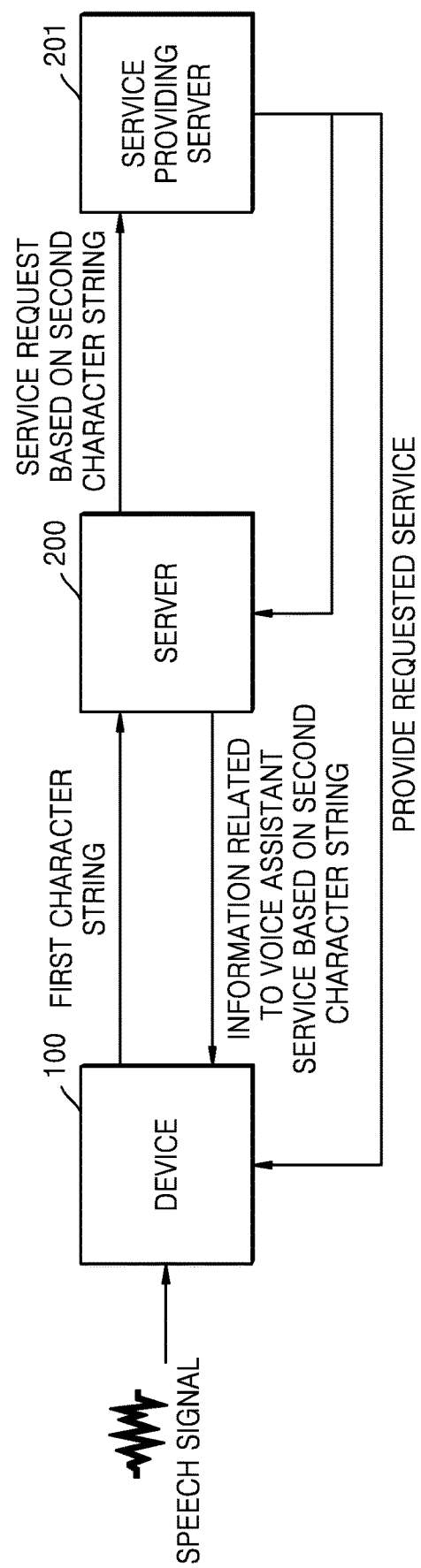
FIG. 2C is a block diagram of a speech recognition system according to an embodiment of the disclosure.

Referring to FIGS. 2B and 2C, the server 200 according to an embodiment of the disclosure may transmit information related to a voice assistant service based on the second character string to the device 100, by ascertaining an utterance intention of a user with respect to the second character siring.

The server 200 according to an embodiment of the disclosure may provide various types of voice assistant services to the device 100 by using the second character string obtained from the first character string. The voice assistant service may be a service that provides a conversation with a user. The voice assistant service may provide a response message to the user, to imitate a person directly talking with the user in consideration of a situation of the user, a situation of the device, and the like. The voice assistant service may suitably generate Information requested by the user and provide the information to the user in reply to a request of the user, like a personal assistant of the user.

In this case, to provide the voice assistant service, based on a character string, the server 200 may provide information for performing conversation with a user to the device 100, by using a natural language understanding (NLU) model, a dialog manager (DM) model, a natural language generating (NLG) model, and the like within the server 200.

For example, the server 200 may control the device 100 or another device (for example, a smart home appliance or a wearable device), based on a result of interpreting the second character string.

Referring to FIG. 2B, the server 200 according to an embodiment of the disclosure may generate a control command for controlling the device 100 or a control command for enabling the device 100 to control another device, based on a result of interpreting a character string, and provide the generated control command to the device 100.

Referring to FIG. 2C, the server 200 according to an embodiment of the disclosure may provide a voice assistant service related to various services that may be provided by other controlled devices such as a television, home appliance, etc., for example in a home network setting. For example, the voice assistant service may be linked to various services such as broadcasting services, content sharing services, content providing services, power management services, game providing services, chatting services, document writing services, search services, calling services, photographing services, transportation recommendation services, and moving picture playback services, and may provide necessary information or necessary functions to a user.

The server 200 according b an embodiment of the disclosure may transmit information related to the voice assistant service to the device 100, based on the second character string. The information related to the voice assistant service may include a response message provided to the user or information requested by the user, to imitate a person directly talking with the user in consideration of a situation of the user, a situation of the device, and the like The server 200 may ascertain an utterance intention of the user, based on the second character string, and request a service providing server 201 to provide a service needed by the user. The service providing server 201 may provide at least one of a broadcasting service, a content sharing service, a content providing service, a power management service, a game providing service, a chatting service, a document writing service, a search service a calling service, a photographing service, a transportation recommendation service, or a moving picture playback service. The service providing server 201 may be implemented within one or more controlled devices such as a television, home appliance, etc., for example in a home network setting.

Although the server 200 providing a voice assistant service is connected to the single service providing server 201 in FIG. 2C, embodiments of the disclosure are not limited thereto. For example, according to an embodiment of the disclosure, the server 200 may be connected to a plurality of service providing servers and may determine a service requested by the user according to the utterance intention of the user. The server 200 may select a service providing server corresponding to the determined service, and may transmit a service providing request to the selected service providing server.

The service providing server 201 according to an embodiment of the disclosure may provide information related to the requested service, based on a service request received from the server 200 providing the voice assistant service. For example, the service providing server 201 may provide broadcasting, content, an application, transportation recommendation information, a search result, and the like, as the information related to the requested service. The service providing server 201 may provide the information related to the requested service to the server 200 providing the voice assistant service or the device 100.

Respective structures and respective operation methods of the device 100 selectively transmitting a character siring as a speech recognition result to the server 220 to request the server 200 to correct the character string and the server 200 correcting the received character string, according to an embodiment of the disclosure, will now be described in detail.

Figure 3:
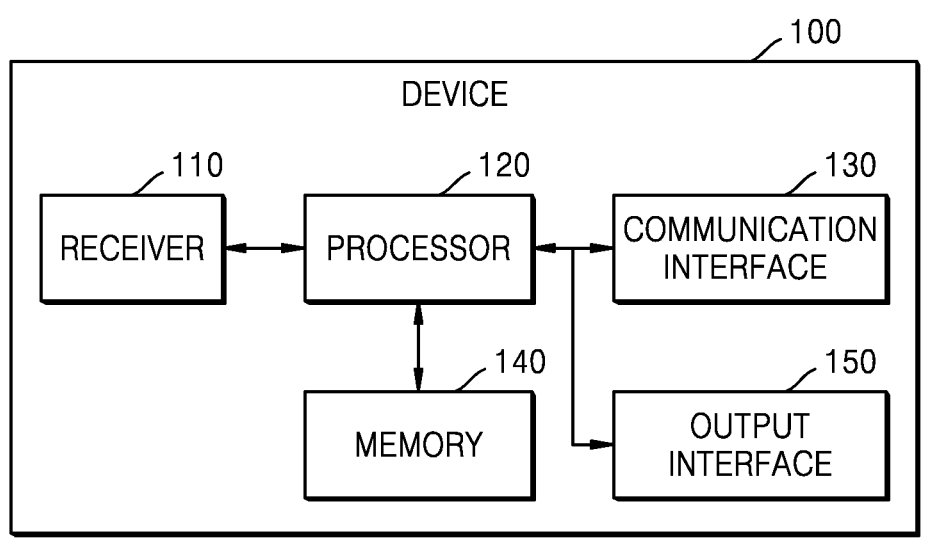
FIG. 3 is a block diagram of a structure of a device according to an embodiment of the disclosure.

FIG. 3 is a block diagram of a structure of a device 100 according to an embodiment of the disclosure.

The device 100 according to an embodiment of the disclosure may be a fixed terminal or mobile terminal implemented as a computer device. The device 100 may be, but is not limited to, at least one of a smartphone, a mobile phone, a navigation device, a computer, a laptop computer, a digital broadcasting terminal, an AI speaker, a speaker, personal digital assistants (PDAs), a portable multimedia player (PMP), or a tablet personal computer (PC). The device 100 may communicate WM another device and/or a server through a network ty using a wireless or wired communication method.

Referring to FIG. 3, the device 100 may include a receiver 110, a processor 120, a communication interface 130, a memory 140, and an output interface 150. One or more components of the device 100 illustrated in FIG. 3 may be omitted or consolidated together. Additional components other than those illustrated in FIG. 3 may constitute the device 100. For example, referring to FIG. 19, a device 100 according to some embodiments of the disclosure may further include a user input interface 2100, a sensing unit 2400, and an audio/video (A/V) input interface 2600.

The receiver 110 according to an embodiment of the disclosure may receive a speech signal from a user. For example, the receiver 110 may receive a speech signal by transforming external sound into electrical acoustic data via a microphone. In FIG. 3, the receiver 110 is included in the device 100. However, according to another embodiment of the disclosure, the receiver 110 may be included in a separate device and may be connected to the device 100 in a wired or wireless manner.

The memory 140 according to an embodiment of the disclosure may store instructions for performing speech recognition, and various models, a neural network, dictionary information, and the like that are used in speech recognition.

The processor 120 according to an embodiment of the disclosure may perform speech recognition by executing one or more instructions stored in the memory 140 and loaded for execution.

The processor 120 according to an embodiment of the disclosure may obtain a first character string as a result of speech recognition with respect to the speech signal.

For example, the first character string may be a frame-synchronized character string including characters respectively corresponding to speech signal frames obtained by spitting the speech signal at intervals of a preset time. Alternatively, the first character string may be a character string obtained according to a label synchronization method to include each character uttered by the speech signal one by one.

Next, the processor 120 according to an embodiment of the disclosure may determine whether to replace the first character string with another character string, and may transmit the first character string to the server 200 via the communication interface 130, according to the determination. The processor 120 according to an embodiment of the disclosure may transmit the first character string to the server 200 in units of sentences, words, phrases, or frames. When the processor 120 according to an embodiment of the disclosure performs speech recognition and thus obtains a character string that constitutes a sentence or a phrase, the processor 100 may transmit all of the characters included in the sentence or phrase to the server 200 or transmit only some of the characters included in the sentence or phrase to the server 200. The processor 120 may transmit those characters having low confidence scores to the server 200, based on the confidence score of the character string.

The determination as to whether to replace the first character string with another character string may mean determining that speech recognition has failed and thus determining to replace the first character string by another character string. Alternatively, the determination as to whether to replace the first character string with another character string may refer to determining whether to replace the first character string by another character string obtained by additionally performing speech recognition in a server.

For example, the processor 120 may determine a confidence score of the first character string, and may determine whether to replace the first character string with another character string, based on the determined confidence score.

The confidence score of the first character string may be calculated based on at least one of the likelihoods of a plurality of estimated character strings obtained from the first character string, or the posterior probabilities that at least one character within the first character string is replaced by another character.

For example, the processor 120 may calculate a confidence score, based on a likelihood that is output as a Viterbi decoding result. Alternatively, the processor 120 may calculate a confidence score, based on posterior probabilities that are output from a softmax layer in an end-to-end speech recognition model.

Alternatively, the processor 120 according to an embodiment of the disclosure may determine a plurality of estimated character strings estimated during speech recognition with respect to the speech signal, and may calculate the confidence score of the first character string, based on a correlation between the plurality of estimated character strings. As the correlation between the plurality of estimated character strings including the first character string increases, the confidence score of the first character string may increase.

As another example, the processor 120 may determine whether to replace the first character string with another character string, based on a result of comparing keywords pre-stored in the device 100 with the first character string. For example, when the pre-stored keywords are not included in the first character string, the processor 120 may determine whether to replace the first character string with another character string.

As another example, the processor 120 may determine whether to replace the first character string with another character string, based on whether a named entity is included in a domain to which the first character string is related or in the first character string. For example, when it is determined that the first character string is associated with a named entity-oriented domain or it is determined that the first character string is not associated with an open domain, the processor 120 may determine that the first character string is to be replaced with another character string.

When it is determined that the first character string is to be replaced with another character string, the processor 120 according to an embodiment of the disclosure may control the communication interface 130 to transmit the first character string to the server 200, based on the determination.

The communication interface 130 according to an embodiment of the disclosure may communicate with an external device, a device, or a server via a wired or wireless communication. The communication interface 130 may include a short-range communication module, a wired communication module, a mobile communication module, a broadcasting reception module, and the like.

When a result of speech recognition with respect to the speech signal is not a frame-synchronized character string, the processor 120 according to an embodiment of the disclosure may generate a frame-synchronized character string by performing forced alignment with respect to the first character string, and transmit the same to the server 200.

The processor 120 according to an embodiment of the disclosure may identify a speech signal section in which each character included in the first character string is pronounced, and may identify a plurality of speech frames included in the identified speech signal section. The processor 120 may obtain the frame-synchronized character string by consecutively arranging the character a number of times according to the identified speech frames.

For example, when a pronunciation time period of a certain character included in the first character string is n frames (where n is a natural number), the processor 120 may obtain a frame-synchronized character string by consecutively arranging n certain characters (n is greater than or equal to 2).

The communication interface 130 may receive a second character string from the sever 200. The second character string is a character string obtained by the server 200 by replacing at least one character within the first character string with another character. The communication interface 130 may receive, from the server 200, a response message generated based on interpretation of the second character string by the server 200.

When it is determined that correction of the first character string is unnecessary, the processor 120 according to an embodiment of the disclosure may determine that the first character string is not to be replaced by another character string. When the first character string is not replaced by another character string, the processor 120 according to an embodiment of the disclosure may output the first character string through the output interface 150.

On the other hand, when it is determined that correction of the first character string is necessary, the processor 120 may determine that the first character string is to be replaced by another character string. When it is determined that the first character string is to be replaced by another character string, the output interface 150 may output the second character string received from the server 200, instead of the first character string.

According to an embodiment of the disclosure, the first character string obtained by the device 100 may be a character string obtained based on first dictionary information and a first language model. According to an embodiment of the disclosure, the second character string obtained by the device 200 may be a character string obtained based on second dictionary information and a second language model stored in the server 200.

The second dictionary information and the second language model stored in the server 200 may include a larger amount of information than the first dictionary information and the first language model. Accordingly, the second character string received from the server 200 may have a confidence score greater than a confidence score of the first character string. The device 100 may increase speech recognition performance by receiving the second character string having a higher confidence score than the first character string from the server 200 and utilize the second character string to provide output in reply to a user voice input.

The output interface 150 according to an embodiment of the disclosure may output the first character string or the second character string without changes, or may output a word string obtained from the first character string or the second character string. For example, when the first character string is a frame-synchronized character string, the output interface 150 may output the word string obtained from the first character string.

The output interface 150 according to an embodiment of the disclosure may output a result of speech recognition performed based on the first character string or the second character string. The output Interface 150 may Inform the user of the result of the speech recognition or may transmit the result of the speech recognition to an external device (for example, a smartphone, a home appliance, a wearable device, or a server). For example, the output interface 150 may include a speaker capable of outputting an audio signal or a display capable of outputting a video signal.

Alternatively, the output interface 150 may perform an operation corresponding to the result of the speech recognition. For example, the device 100 may interpret the first character string or the second character string and may determine a function of the device 100 corresponding to a result of the interpretation. The device 100 may output a screen image for performing the function, through the output interface 150. Alternatively, the device 100 may transmit a keyword corresponding to the result of the interpretation to an external server, and may receive information related to the transmitted keyword from the external server and output the received information on a screen through the output interface 150. Alternatively, the device 100 may generate the response message for the speech signal, based on the result of the interpretation, and may output the response message through the output interface 150.

The device 100 according to an embodiment of the disclosure may output information related to a voice assistant service through the output interface 150, by ascertaining an utterance intention of the user through natural language processing with respect to the first character string or the second character string. The device 100 may use, for example, an NLU model, a DM model, and an NLG model within the device 100, to provide a voice assistant service based on the first character string or the second character string.

Alternatively, the output interface 150 may receive information related to a voice assistant service based on the second character string from the server 200 and may output the received information. For example, the information related to the voice assistant service based on the second character string may include a control command for controlling the device 100 or another device, the control command being generated based on a result of interpreting the utterance intention of the user through natural language processing with rasped to the second character string. Alternatively, for example, the information related to the voice assistant service based on the second character string may include a service or information needed by the user, the service or information being provided based on a result of interpreting the utterance intention of the user through natural language processing with respect to the second character string.

When the processor 120 according to an embodiment of the disclosure transmits only some of the characters included in a sentence or phrase to the server 200, the processor 120 may combine the corrected character string received from the server 200 with a character string not transmitted to the server 200 according to a determination that correction is unnecessary. The processor 120 may output a combined character string, output a result of speech recognition based on the combined character string, or provide a voice assistant service, based on a result of interpreting the combined character string.

An operation method of the device 100 will now be described in detail with reference to FIGS. 4A and 4B.

Figure 4A:
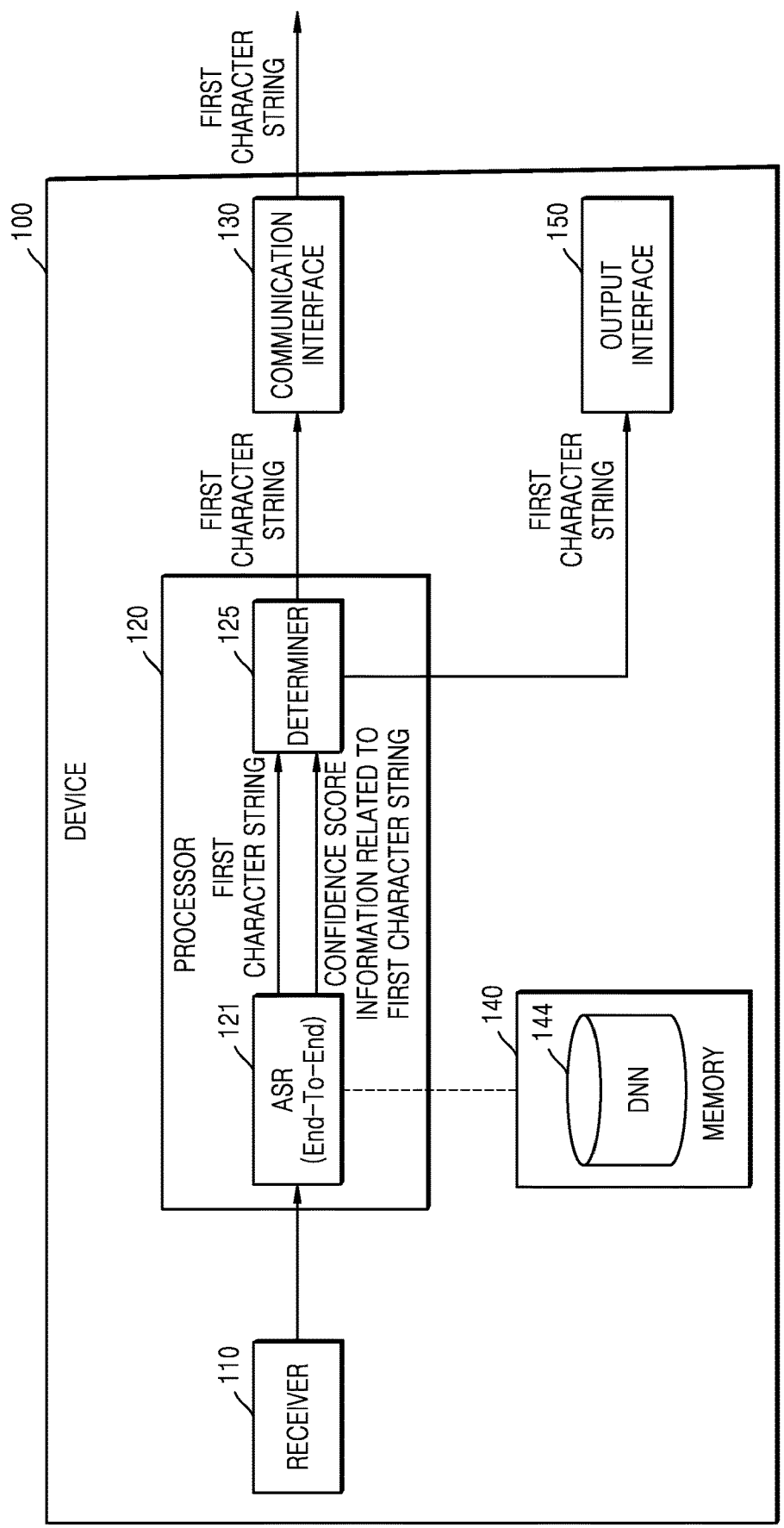
FIG. 4A is a block diagram or a detailed structure of a device according to an embodiment of the disclosure.

FIG. 4A is a block diagram or a detailed structure of the device according to an embodiment of the disclosure.

As shown in FIG. 4A, an automatic speech recognition (ASR) module 121 of the processor 120 may receive a speech signal obtained by the receiver 110, and perform speech recognition with respect to the speech signal.

The ASR module 121 of FIG. 4A may perform speech recognition with respect to the speech signal by using an end-to-end method. The end-to-end method is a speech recognition method using a deep neural network (DNN) trained to directly map a speech signal to a character string or a word string. Compared with other speech recognition methods using a plurality of models such as an acoustic model and a language model, the end-to-end method may simplify a speech recognition process by using a single trained DNN. An RNN-T model, a CTC model, and the like exist as lower-level examples of an end-to-end speech recognition model.

The ASR module 121 may extract a feature vector from the speech signal. The ASR module 121 may output a first character string from the feature vector by using a DNN 144 stored in the memory 140.

A determiner 125 of the processor 120 according to an embodiment of the disclosure may determine whether to replace the first character string with another character string, based on the confidence score of the first character string output by the ASR module 121. The determiner 125 may receive confidence score information about the first character string from the ASR module 121.

The determiner 125 according to an embodiment of the disclosure may receive a posterior probability value that is output as the confidence score information about the first character string by a softmax layer of the ASR module 121. The determiner 125 may calculate the confidence score, based on a posterior probability value associated with the first character string.

For example, when the confidence score is equal to or greater than a threshold value, the determiner 125 may determine that correction of the first character string is unnecessary, and may output the first character string through the output interface 150. On the other hand, when the confidence score is less than the threshold value, the determiner 125 may determine that correction of the first character string is necessary, and may transmit the first character string to the server 200 through the communication interface 130.

For convenience of explanation, FIG. 4A illustrates a case in which the first character string is output through the output interface 150. However, embodiments of the disclosure are not limited thereto. The device 100 according to an embodiment of the disclosure may output information related to a voice assistant service through the output interface 150, by ascertaining an utterance intention of the user through natural language processing with respect b the first character string.

The device 100 may use, for example, an NLU model, a DM model, and an NLG model within the device 100, to provide a voice assistant service, based on the first character string.

For example, the processor 120 of the device 100 may generate a response message for the first character string and may output the same to the user through the output interface 150, to imitate a person directly talking with the user in consideration of a situation of the user, a situation of a device, and the like. Alternatively, for example, the processor 120 may generate information needed by the user, based on the first character string, aid may provide the generated information to the user through the output interface 150. Alternatively, for example, the processor 120 may ascertain an utterance intention of the user, based on the first character string, and may request a service providing server to provide a service needed by the user. The output interface 150 may output information received from the service providing server.

The output interface 150 of the device 100 according to an embodiment of the disclosure may receive information related to a voice assistant service from the server 200 and may output the received information. The information related to the voice assistant service may be information generated based on the first character string or the second character string, which is obtained by correcting the first character string, by the server 200. For example, the information related to the voice assistant service may include a response message or the speech signal of the user, a service needed by the user, or information needed by the user.

Figure 4B:
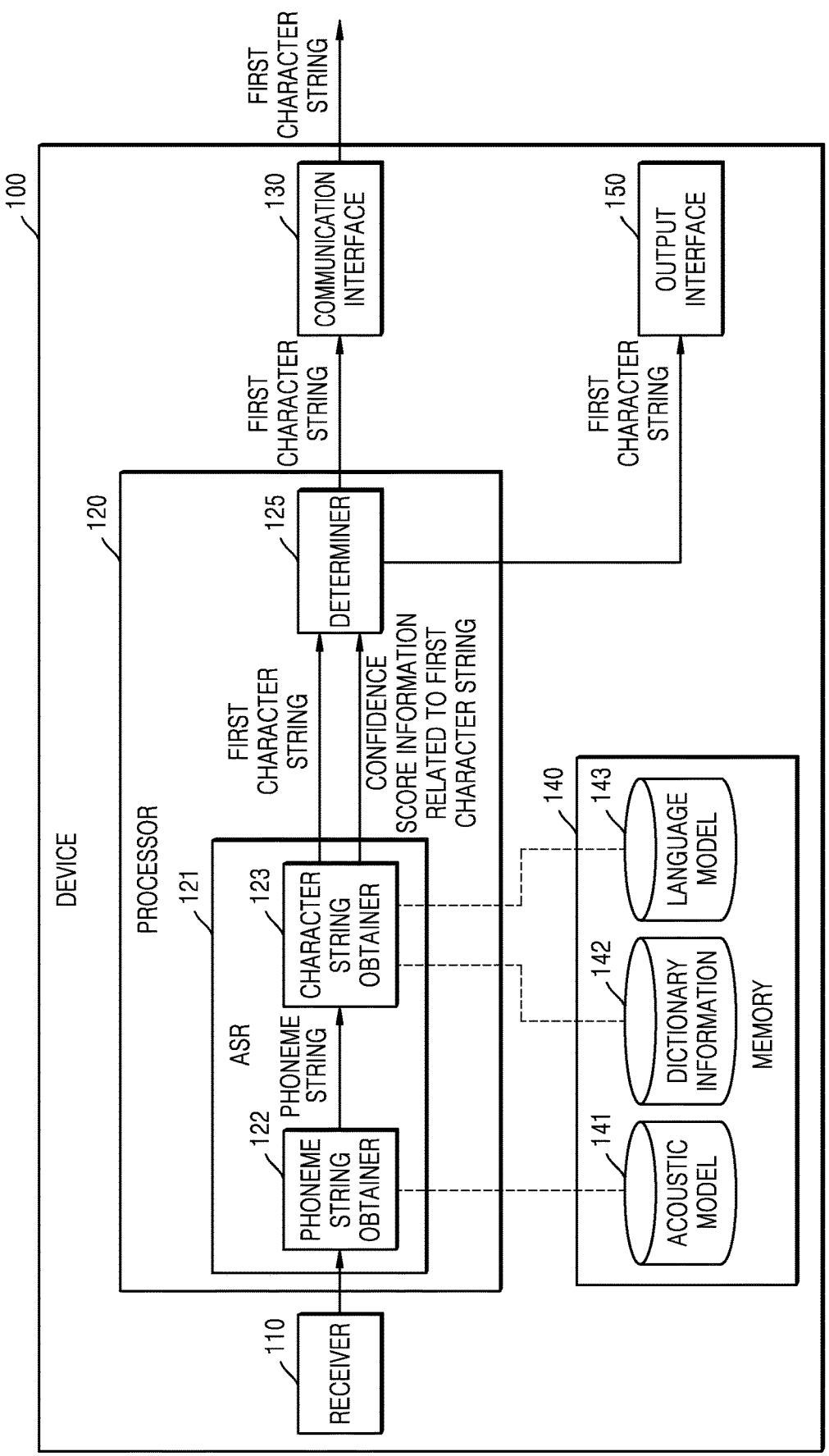
FIG. 4B is a block diagram of a detailed structure of a device according to an embodiment of the disclosure.

FIG. 4B is a block diagram of a detailed structure of the device according to another embodiment of the disclosure.

As shown in FIG. 4B, an ASR module 121 of the processor 120 may receive a speech signal obtained by the receiver 110, and perform speech recognition with respect to the speech signal. A phoneme string obtainer 122 may obtain a phoneme string from the speech signal by using an acoustic model 141 stored in the memory 140. The acoustic model 141 may split the waveform of the speech signal, and may estimate a phoneme string including phonemes by using a hidden Markov model, a Gaussian mixture model, a Bayesian inference, a multilayer neural network, or the like.

A character string obtainer 123 of the processor 120 may estimate words from the phoneme string and output a character string including the estimated words, based on dictionary information 142 and a language model 143 stored in the memory 140.

A determiner 125 of the processor 120 according to an embodiment of the disclosure may calculate a confidence score of the first character string output by the ASR module 121, and may determine whether to replace the first character string with another character string, based on the calculated confidence score. The determiner 125 may receive confidence score information about the first character string from the ASR module 121.

The determiner 125 according to an embodiment of the disclosure may calculate the confidence score, based on a partial likelihood of the first character string that is output as the confidence score information about the first character string by a Viterbi decoder of the ASR module 121.

When the confidence score is equal to or greater than a threshold value, the determiner 125 according to an embodiment of the disclosure may determine that correction of the first character string is unnecessary, and may output the first character string through the output interface 150. On the other hand, when the confidence score is less than the threshold value, the determiner 125 may determine that correction of the first character string is necessary, and may transmit the first character string to the server 200 through the communication interface 130. For convenience of explanation. FIG. 48 illustrates a case in which the first character string is output through the output interface 150 However, embodiments of the disclosure are not limited thereto. The device 100 according to an embodiment of the disclosure may output Information related to a voice assistant service through the output Interlace 150, by ascertaining an utterance intention of the user through natural language processing with respect to the first character string.

The device 100 may use, for example, an NLU model, a DM model, and an NLG model within the device 100, to provide a voice assistant service, based on the first character string.

For example, the processor 120 of the device 100 may generate a response message for the first character string and may output the same to the user through the output interface 150, to imitate a person directly talking with the user in consideration of a situation of the user, a situation of a device, and the like. Alternatively, for example, the processor 120 may generate information requested by the user, based on the first character string, and may provide the generated information to the user through the output interface 150. Alternatively, for example, the processor 120 may ascertain an utterance intention of the user, based on the first character string, and may request a service providing server to provide a service requested by the user. The output interface 150 may output information received from the service providing server.

The output interface 150 of the device 100 according to an embodiment of the disclosure may receive information related to a voice assistant service from the server 200 and may output the received information. The information related to the voice assistant service may be information generated based on the first character string or the second character string, obtained by correcting the first character string, by the server 200. For example, the information related to the voice assistant service may include a response message for the speech signal of the user, a service needed by the user, or information needed by the user.

As described above, the device 100 according to an embodiment of the disclosure may determine whether to replace the first character string with another character string, based on the confidence score of a result of speech recognition with respect to the speech signal. However, embodiments of the disclosure are not limited thereto. According to another embodiment of the disclosure, the device 100 may determine whether to replace the first character string with another character string, based on a result of comparing keywords pre-stored in the device 100 with the first character string. Alternatively, the device 100 according to another embodiment of the disclosure may determine whether to replace the first character string with another character string, based on a domain associated with the first character string. Alternatively, the device 100 according to another embodiment of the disclosure may interpret the meaning of the first character string via natural language understanding, and may determine whether to replace the first character string with another character string, based on a result of the interpretation.

Figure 5A:
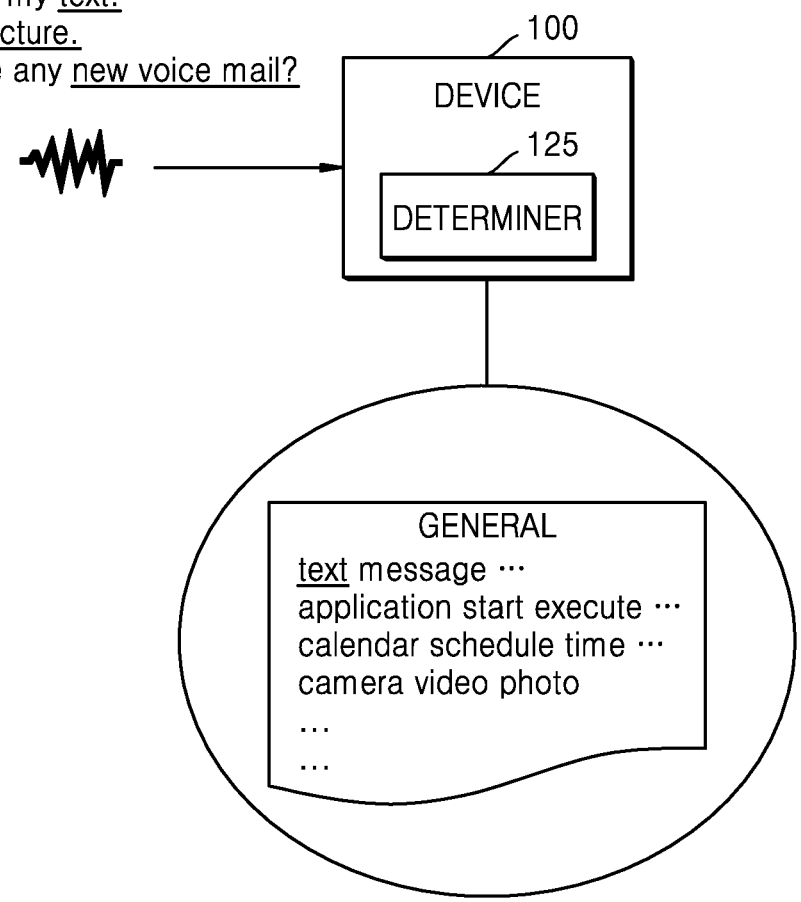
FIG. 5A is a view for explaining a method, performed by a device, of determining that on-device speech recognition is to be performed, according to an embodiment of the disclosure.

FIG. 5A is a view for explaining a method, performed by the device 100, of determining that on-device speech recognition is to be performed, according to an embodiment of the disclosure.

For example, the determiner 125 of the processor 120 of the device 100 according to an embodiment of the disclosure may determine whether to replace the first character string with another character string, based on a rest of comparing keywords pre-stored in the device 100 with the first character string.

When at least one of the pre-stored keywords is included in the first character string, the processor 125 according to an embodiment of the disclosure may determine mat the first character string is lot replaced with another character string. Accordingly, the device 100 may use a result of speech recognition performed by the ASR module 121 of the device 100, without intervention of the server 200.

For example, when the first character string output by the ASR module 121 is "Read the my text," the determiner 125 may determine that the first character string includes a pre-stored keyword "text," and may determine that the first character string is not replaced by another character string.

As another example, the determiner 125 of the processor 120 of the device 100 according to an embodiment of the disclosure may determine whether to replace the first character string with another character string, based on whether a domain with which the first character string is associated or the first character string includes a named entity.

When it is determined that the first character string is not associated with a named entity-oriented domain and is associated with an open domain, the processor 125 according to an embodiment of the disclosure may determine that the first character string is not replaced with another character string. Accordingly, the device 100 may use a result of speech recognition performed by the ASR module 121 of the device 100, without intervention of the server 200.

For example, when the first character string output by the ASR module 121 is "Take a picture," the determiner 125 may determine that the first character string is associated with an open domain, and may determine that the first character string is not replaced by another character string When it is determined that a named entity is included in the first character string, the processor 125 according to an embodiment of the disclosure may determine that the first character string is replaced with another character string.

The determiner 125 according to an embodiment of the disclosure may determine whether at least one of the named entities stored in the memory 140 is included in the first character string. Alternatively, without dictionary information for named entities, the determiner 125 according to an embodiment of the disclosure may determine whether a named entity is included in the first character string. For example, the determiner 125 may identify a named entity included in the first character string, by performing part-of-speech (POS) tagging of words identified from the first character string.

For example, when the first character string output by the ASR module 121 is "Take a picture," the determiner 125 may determine that the first character string includes no named entities, and may determine that the first character string is not replaced by another character string.

As another example, the determiner 125 of the processor 120 of the device 100 according to an embodiment of the disclosure may interpret the meaning of the first character string via natural language understanding, and may determine whether to replace the first character string with another character string, based on whether a result of the interpretation.

When it is determined as a result of the interpretation that the speech signal is a general command associated with an operation of the device 100, the processor 125 according to an embodiment of the disclosure may determine that the first character string is not replaced with another character string. Accordingly, the device 100 may use a result of speech recognition performed by the ASR module 121 of the device 100, various Intervention of the server 200.

For example, when the first character string output by the ASR module 121 is "Do I have any new voice mail," the determiner 125 may determine that the first character string is a general command associated with confirmation of a text message, and may determine that the first character string is not replaced by another character string.

Figure 5B:
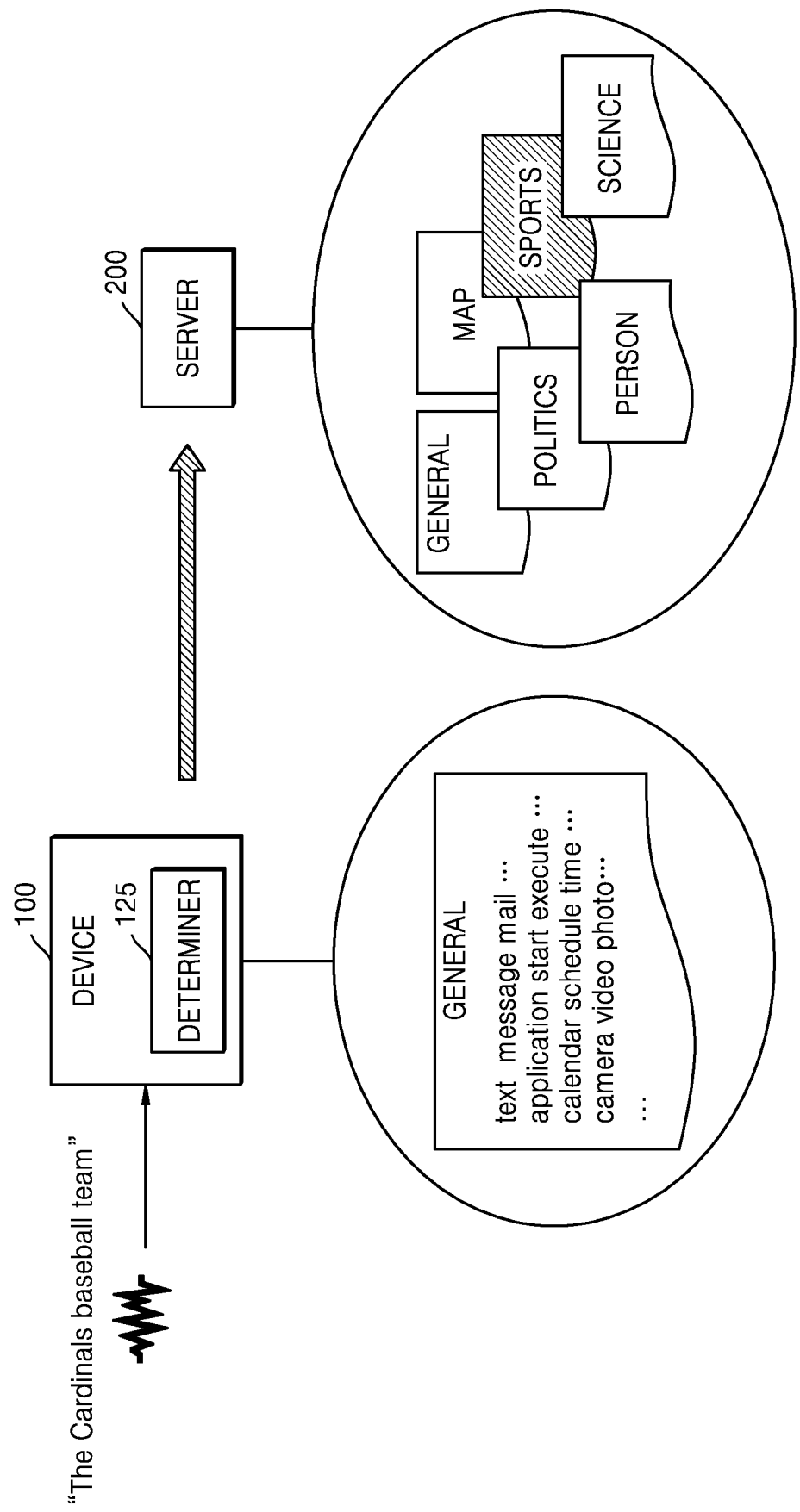
FIG. 5B is a view for explaining a method, performed by a device, of determining that server-based speech recognition is performed, according to an embodiment of the disclosure.

FIG. 5B is a view for explaining a method, performed by the device 100, of determining that server-based speech recognition is performed, according to an embodiment of the disclosure.

As shown in FIG. 5B, the determiner 125 of the processor 120 of the device 100 according to an embodiment of the disclosure may determine that the first character string needs to be replaced with another character string, and may transmit the first character string to the server 200, based on the determination.

FIG. 5B illustrates a case where the ASR module 121 of the device 100 receives a speech signal corresponding to "The Cardinals baseball team" uttered by the user and incorrectly obtains a first character string "the cat and deers baseball team."

For example, the determiner 125 of the processor 120 of the device 100 according to an embodiment of the disclosure may determine that the first character string is to be replaced with another character string, because the first character string includes no pre-stored keywords.

As another example, the determiner 125 of the processor 120 of the device 100 according to an embodiment of the disclosure may determine that the first character string is to be replaced with another character string, when it is determined that the first character string is related to a sports domain or includes a named entity.

The determiner 125 according to an embodiment of the disclosure may determine whether at least one of the named entities stored in the memory 140 is included in the first character string. Alternatively, without dictionary information for named entities, the determiner 125 according to an embodiment of the disclosure may determine whether a named entity is included in the first character string. For example, the determiner 125 may identify a named entity included in the first character string, by performing part-of-speech (POS) tagging of words identified from the first character string. However, embodiments of the disclosure are not limited thereto, and various types of named entity recognition (NER) methods may be used.

As another example, the determiner 125 of the processor 120 of the device 100 according to an embodiment of the disclosure may determine that the speech signal is not a general command, as a result of interpreting the first character string, and may determine that the first character string is to be replaced with another character string.

As shown in FIG. 5B, the determiner 125 of the device 100 according to an embodiment of the disclosure may determine that the first character string needs to be replaced with another character string, and may transmit the first character string to the server 200, based on the determination. The server 200 may receive the first character string from the device 100, and may perform decoding by using a language model and dictionary information (for example, dictionary information of a sports domain) available to or stored within the server 200. The server 200 may obtain a second character string in which at least one character included in the first character string has been corrected, as a result of the decoding. The device 100 may increase the accuracy of speech recognition by receiving the second character string from the server 200 and using the received second character string.

When the device 100 according to an embodiment of the disclosure performs speech recognition and thus obtains a character string that constitutes a sentence or phrase, the device 100 may transmit all of the characters included in the sentence or phrase to the server 200 or transmit only some of the characters included in the sentence or phrase to the server 200. The determiner 125 of the processor 120 of the device 100 may determine that some characters having low confidence scores are to be transmitted to the server 200, based on the confidence score of the character string The device 100 according to an embodiment of the disclosure may receive a corrected character string from the server 200, and may combine a character string not transmitted to the server 200 according to a determination that correction is not necessary with the corrected character string. The device 100 according to an embodiment of the disclosure may output a combined character string, output a result of speech recognition based on the combined character string, or provide a voice assistant service, based on a result of interpreting the combined character string.

The device 100 according to an embodiment of the disclosure may provide information of a domain associated with the first character string of the device 100 to the server 200, while requesting the server 200 to correct the first character string The information of the domain is information for indicating or identifying the domain, and may include, for example, the name of the domain and the identifier of me domain, but embodiments of the disclosure are not limited thereto. The device 100 may identify the domain associated with the first character string, based on a domain confidence score of the first character string output by an ASR model of the device 100. The domain confidence score may be a figure representing the strength of association of at least a portion of the first character string with a specific domain. For example, the device 100 may calculate a confidence score representing how strongly the first character string output by the ASR model is associated with a domain previously registered in the device 100. The device 100 may identify the domain associated with the first character string, based on the calculated domain confidence score. The device 100 may identify the domain associated with the first character string, based on a rule, or may obtain a domain confidence score associated with the first character string by using an AI model trained for domain identification.

Figure 6:
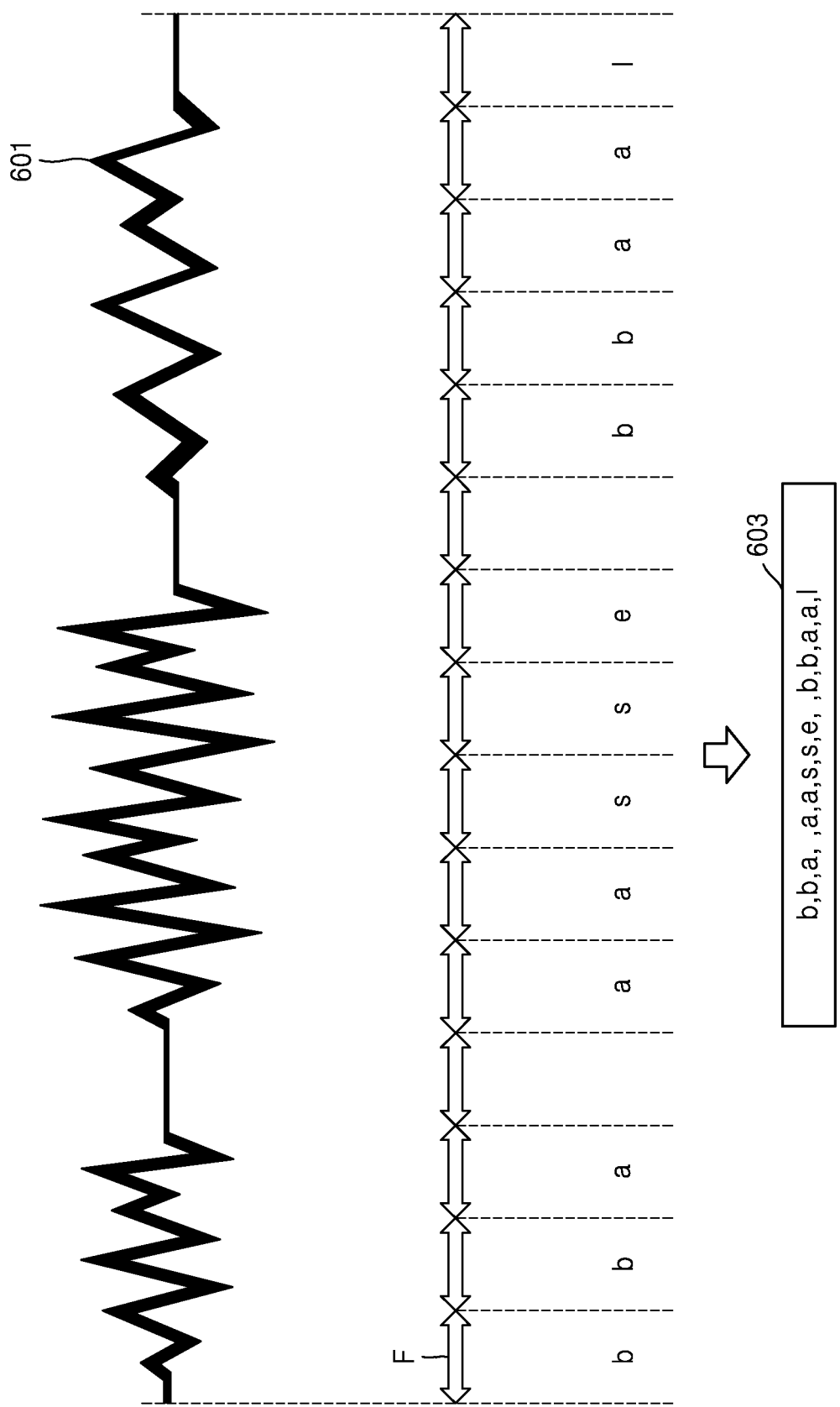
FIG. 6 is a view for explaining a frame-synchronized character string according to art embodiment of the disclosure.

FIG. 6 is a view for explaining a frame-synchronized character string according to an embodiment of the disclosure.

As shown in FIG. 6, the ASR module 121 of the device 100 according to an embodiment of the disclosure may output a frame-synchronized character string 603 including characters respectively corresponding to speech signal frames F obtained by splitting a speech signal 601 at intervals of a preset time.

For example, the ASR module 121 may receive a speech signal corresponding to an utterance "baseball" of a user, and may output a frame-synchronized character string [b, b, a, a, a, s, s, e, b, b, a, a, l].

However, embodiments of the disclosure are not limited thereto, and the ASR module 121 according to an embodiment of the disclosure may output a frame-unsynchronized character string (i.e., a label-synchronization character string) as a speech recognition result. Even in this case, the device 100 may generate a frame-synchronized character string by performing forced alignment with respect to a character string obtained from the speech signal.

The processor 120 of the device 100 according to an embodiment of the disclosure may identify a speech signal section where each character included in the first character string is pronounced, and may identify a plurality of speech frames included in the identified speech signal section. The processor 120 may obtain the frame-synchronized character string by consecutively arranging the character a plurality of number of times according to the identified speech frames.

For example, the ASR module 121 may output a first character string [b, a, s, e, b, a, l, l] that is a frame-unsynchronized character string. In this case, the processor 120 may consecutively arrange each of the characters included in the first character string a plurality of numbers of times, based on a time period during which each of the characters is pronounced. As a result, the processor 120 may obtain a frame-synchronized character string [b, b, a, a, a, s, s, e, b, b, a, a, l].

The device 100 according to an embodiment of the disclosure may output the frame-synchronized character wring 603 to the server 200. The server 200 may decode the frame-synchronized character string 603 received from the device 100, and may transmit a second character string obtained based on a result of the decoding to the device 100.

Figure 7:
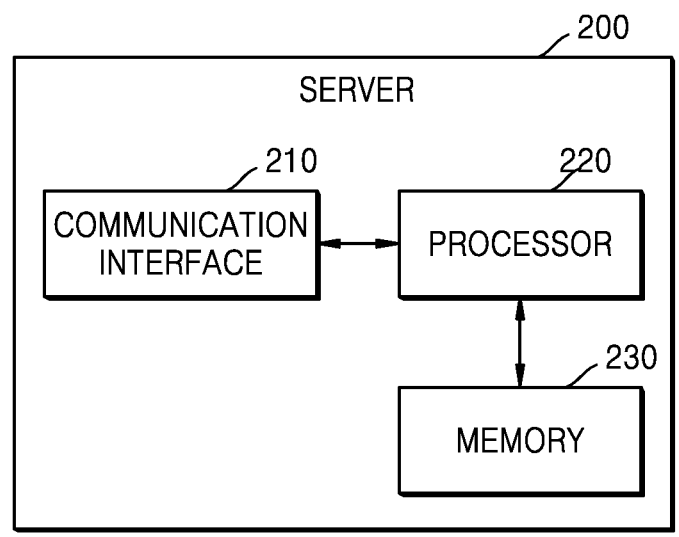
FIG. 7 is a block diagram of a server according to an embodiment of the disclosure.

FIG. 7 is a block diagram of a server according to an embodiment of the disclosure.

The server 200 according to an embodiment of the disclosure may be connected to the device 100 in a wired or wireless manner, so long as the server 200 is communicatively connected tome device 100.

Referring to FIG. 7, the server 200 may include a communication interface 210, a processor 220, and a memory 230. Alternative components other than those illustrated in FIG. 7 may constitute the server 200. One or more components of the server illustrated in FIG. 7 may be omitted or consolidated together.

The memory 230 of the server 200 according to an embodiment of the disclosure may store instructions for performing speech recognition, and various models, a neural network, dictionary information, and the like that are used in speech recognition.

The processor 220 according to an embodiment of the disclosure may perform speech recognition by executing one or more instructions stored in the memory 230 and loaded for execution.

The communication interface 210 according to an embodiment of the disclosure may communicate with an external device or a device via a wired or wireless communication. The communication interface 210 may include a short-range communication module, a wired communication module, a mobile communication module, a broadcasting reception module, and the like.

The communication interface 210 of the server 200 according to an embodiment of the disclosure may receive a first character string from the device 100. The first character string may be output via speech recognition performed by the device 100 with respect to the speech signal input to the device 100.

For example, the first character string received by the server 200 may be a frame-synchronized character string including characters respectively corresponding to speech signal frames obtained by splitting the speech signal at intervals of a preset time. As another example, the first character string received by the server 200 may be a frame-unsynchronized character string.

When the first character string received from the device 100 is a frame-unsynchronized character string, the processor 220 according to an embodiment of the disclosure may obtain a frame-synchronized character string from the first character string. The processor 220 may obtain the frame-synchronized character string by consecutively arranging at least one character included in the first character string a plurality of number of times in units of frames.

The processor 220 of the server 200 according to an embodiment of the disclosure may obtain the second character string from the first character string by replacing at least one character included in the first character string with another character.

The processor 220 according to an embodiment of the disclosure may identify replacement characters having pronunciations similar to pronunciations of each of the characters included in the first character string, and determine estimated character strings in which at least one character within the first character string has been corrected into another character, based on the identified replacement characters. The processor 220 may select a most appropriate estimated character string from the determined estimated character strings, based on pre-stored information such as a language model and dictionary information, and may obtain the most appropriate estimated character string as the second character string.

A method, performed by the processor 220 according to an embodiment of the disclosure, of obtaining the second character string will now be described in more detail.

First, the processor 220 may identify a plurality of estimated character strings from the first character string. The processor 220 may calculate likelihood matrices relating to replacement characters that are to replace each character within the first character string. The processor 220 may identify the plurality of estimated character strings in which at least one character within the first character string has been replaced by another character, based on the likelihood values within the likelihood matrices.

The processor 220 according to an embodiment of the disclosure may calculate likelihoods of the plurality of estimated character strings from the first character string. The processor 220 may calculate the likelihood of the plurality of estimated character strings, based on the likelihood values within the likelihood matrices relating to the replacement characters that are to replace each character within the first character string.

Likelihood obtained from the first character string may refer to likelihood that the first character string is estimated as a speech recognition result, when each of the plurality of estimated character strings is assumed to be a ground truth character string According to an embodiment of the disclosure, the processor 220 may identify the replacement characters having pronunciations similar to pronunciations of each character within the first character string, and may use a likelihood obtained from the first character string, to determine estimated character strings in which at least one character within the first character string has been corrected into another character, based on the identified replacement characters.

The processor 220 may obtain a second character string, which is one of the plurality of estimated character strings, based on the likelihood, dictionary information, and a language model. The processor 220 may determine whether to replace the first character string with the second character string, based on the calculated likelihood. The processor 220 may obtain the second character string from the first character string by replacing at least one character included in the first character string with another character, based on the determination.

The processor 220 according to an embodiment of the disclosure may calculate the likelihood from the first character string via a process to be described later in the disclosure.

For example, the processor 220 may calculate the posterior probabilities of each character within the first character string, based on previous characters of each character. The posterior probabilities of a certain character within the first character string may include probabilities that the certain character is replaced by a plurality of other characters, when considering previous characters of the certain character. In other words, the posterior probabilities of the certain character may include a probability that the ASR module of the processor 120 of the device 100 has accurately predicted the certain character and a probability that the ASR module has incorrectly predicted the certain character as being another character, when considering the previous characters of the certain character within the first character string.

Next, the processor 220 may calculate the character sequence probability of the first character string. The character sequence probability of a character string may refer to a probability that characters are arranged according to the character string. The character sequence probability may be calculated based on characters accumulated before each character of the character string. The processor 220 may calculate the likelihood of the plurality of estimated character strings obtained from the first character string, based on the posterior probabilities of each character and the character sequence probability.

To calculate the posterior probabilities, the processor 220 according to an embodiment of the disclosure may use a recurrent neural network (RNN) including a plurality of long-short term memory (LSTM) layers and a softmax layer. An RNN used to calculate the posterior probabilities will be described later in more detail with reference to FIG. 10A.

As another example, the processor 220 may calculate the posterior probabilities of each character within the first character string, based on a pre-determined confusion matrix. The processor 220 may calculate the likelihood of the plurality of estimated character strings obtained from the first character string, based on the posterior probabilities of each character. The confusion matrix used to calculate the posterior probabilities will be described in more detail with reference to FIG. 10B.

As another example, the processor 220 may calculate the posterior probabilities of each character within the first character string, based on pre-determined probability values. The processor 220 may determine a probability that a first character included in the first character string is actually a first character, to be P and P may be a pre-determined value, and P may be a value ranging from 0 to 1. The processor 220 may determine a probability that the first character included in the first character string is actually a character other than a first character, to be $(1-P)/(N-1)$, and N refers to the number of characters, and N may be a natural number. In other words, the processor 220 may determine a probability that the ASR module of the processor 120 of the device 100 has accurately predicted the first character within the first character string, to be P, and may determine a probability that the ASR module has incorrectly predicted another character as the first character, to be $(1-P)/(N-1)$.

For example, the processor 220 may determine, as 0.9, a probability that the first character included in the first character string is actually a first character, and determine, as $0.1/(N-1)$, a probability that the first character is actually another character.

The processor 220 according to an embodiment of the disclosure may include a likelihood calculator that calculates likelihood of the plurality of estimated character strings obtained from the first character string. The processor 220 may also include a decoder that obtains the second character string from the likelihood, by using the dictionary information and the language model. The processor 220 may obtain the second character string by performing re-decoding with respect to the likelihood obtained from the first character string, by using the dictionary information and the language model.

For example, the decoder of the processor 220 may obtain the second character string, based on the dictionary information and the language model stored in the server 200. The decoder may output the second character string, as the likelihood of the plurality of estimated character strings obtained from the first character string is input. For example, the decoder of the processor 220 may include a weighted finite state transducer (WFST) decoder.

When the processor 220 performs WFST decoding, the server 200 according to an embodiment of the disclosure may constitute and decode a search space by using a WFST, based on a relationship T between characters, dictionary information L including mapping information between a word and characters, and a language model G that estimates a probability of next words when a specific word string is assigned.

As another example, the decoder of the processor 220 may re-calculate the likelihood of the plurality of estimated character strings obtained from the first character string, based on the dictionary information and the language model. The decoder may determine a second character string having maximum re-calculated likelihood from among the plurality of estimated character strings. For example, the decoder of the processor 220 may include a Viterbi decoder. The Viterbi decoder may search for a character string having highest likelihood with respect to first character strings, as the second character string, in consideration of the dictionary information and the language model.

The communication interface 210 according to an embodiment of the disclosure may transmit the second character string to the device 100. Alternatively, the communication interface 210 may transmit a response message for the speech signal generated by the processor 220 to the device 100. The processor 220 may interpret the second character string by using an NLU model, and may generate the response message for the speech signal, based on a result of the interpretation.

The processor 220 may determine a type of the response message by applying a DM model to the result of the interpretation. The processor 220 may generate a response message of the determined type and transmit the same to the device 100, by using an NLG model.

Alternatively, the communication interface 210 may transmit information related to a voice assistant service generated based on the second character string to me device 100. To provide a voice assistant service, based on the second character string, the processor 220 may provide information for performing conversation with a user to the device 100, by using the NLU model, the DM model, the NLG model, and the like within the server 200. The processor 220 may generate a control command for controlling the device 100 or another device, based on a result of interpreting the second character string, and provide the generated control command to the device 100.

Figure 8A:
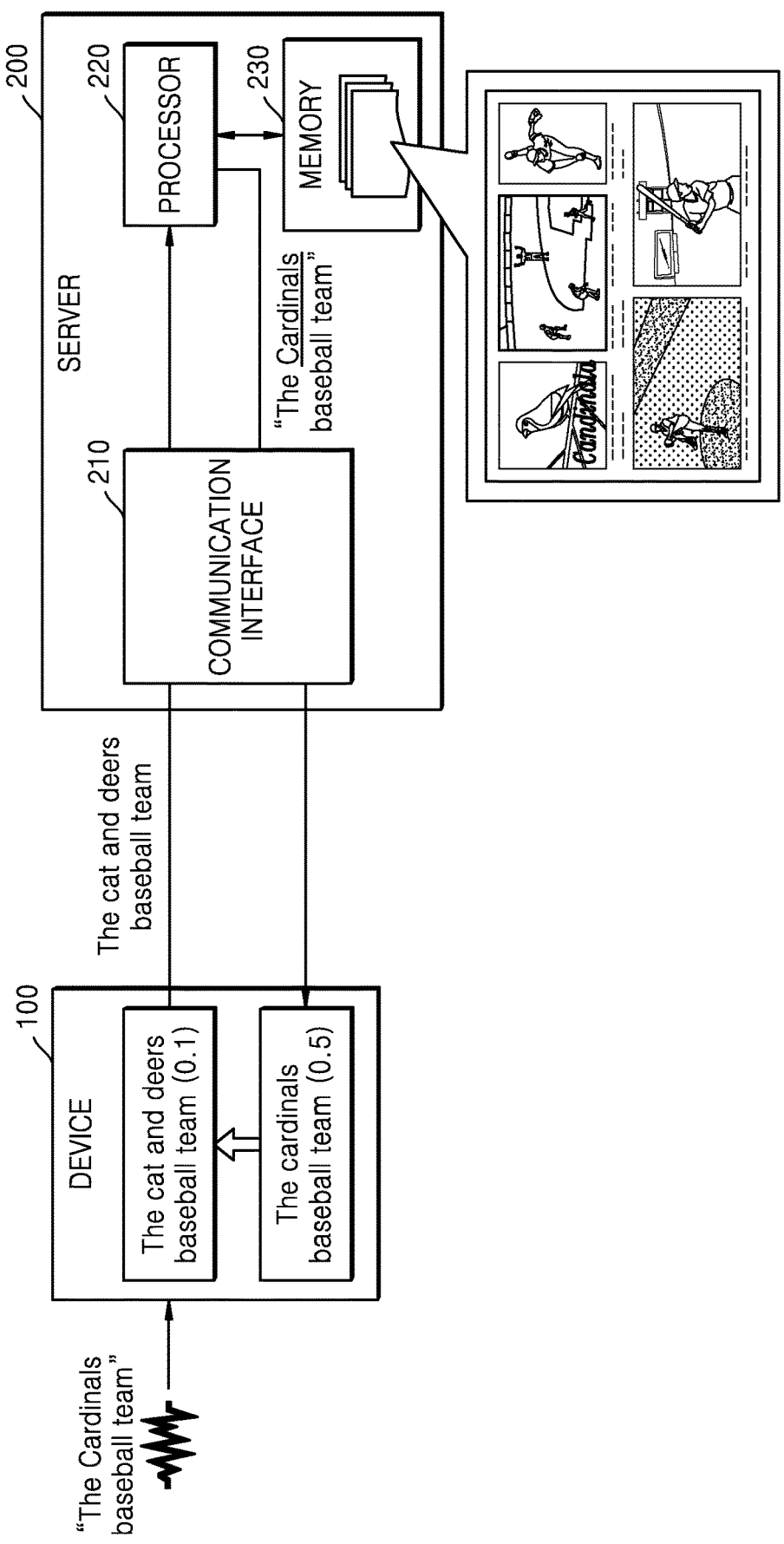
FIG. 8A is a view for explaining a method, performed by a server, of supporting speech recognition of a device, according to an embodiment of the disclosure.

A method, performed by each component of the server 200 according to an embodiment of the disclosure, of supporting speech recognition of the device 100 will now be described with reference to FIG. 8A. FIG. 8A illustrates a case in which a user of the device 100 utters "The Cardinals baseball team."

First, the device 100 may estimate a first character string [The cat and deers baseball team] by performing speech recognition with respect to a speech signal of the user.

The device 100 may determine whether to replace the first character string with another character string, based on the confidence score of the first character string, a domain associated with the first character string, a result of interpreting the meaning of the first character string, or whether the first character string includes a named entity. A detailed method, performed by the device 100, of determining whether to perform server-based speech recognition to replace the first character string has been described above with reference to FIGS. 4A through 5B, and thus a redundant description thereof will be omitted.

In FIG. 8A, the device 100 may determine that the first character string needs to be replaced with another character string, and may transmit the first character string [The cat and deers baseball team] to the server 200.

When transmitting the first character string to the server 200, the device 100 according to an embodiment of the disclosure may transmit information related to the speech signal together with the first character string. The device 100 according to an embodiment of the disclosure may transmit information related to the length of a speech signal frame represented by each character within the first character string, together with the first character string. For example, the device 100 may transmit a first character string synchronized with the speech signal frame to the server 200. A character string synchronized with a speech signal frame may refer to a character string including characters respectively corresponding to speech signal frames into which the speech signal is split at intervals of a preset lime.

However, embodiments of the disclosure are not limited to the embodiment of the disclosure in which the device 100 transmits the frame-synchronized character string to the server 200. The device 100 according to an embodiment of the disclosure may transmit a frame-unsynchronized first character string to the server 200. The frame-unsynchronized first character string may refer to a character string obtained according to a label synchronization method to include each character uttered by the speech signal one by one.

When transmitting the frame-unsynchronized first character string to the server 200, the device 100 according to an embodiment of the disclosure may provide information related to the speech signal together with the frame-unsynchronized first character string. The server 200 may generate the frame-synchronized character string by forcedly aligning the first character string, based on the information related to the speech signal. For example, the Information related to the speech signal may include information about a speech signal section from which the speech recognition model of the device 100 obtains the first character string.

The server 200 according b an embodiment of the disclosure may receive the first character string from the device 100 via the communication interface 210. The server 200 according to an embodiment of the disclosure may receive a frame-synchronized first character string. However, as described above, the server 200 may receive a frame-unsynchronized first character string. In this case, the server 200 may receive, from the device 100, information related to the speech signal together with the first character string obtained from the speech signal by the device 100. The server 200 may generate the frame-synchronized first character string by forcedly aligning the first character string, based on the information related to the speech signal.

The processor 220 may identify the plurality of estimated character strings from the first character string, and may obtain the second character string, based on the plurality of estimated character strings.

According to an embodiment of the disclosure, the processor 220 may identify replacement characters having similar pronunciations to each character within the first character string, and determine estimated character strings in which at least one character within the first character string has been corrected into another character, based on the identified replacement characters. The processor 220 may select a most appropriate estimated character string from the determined estimated character strings, based on pre-stored information such as a language model and dictionary information, and may obtain the most appropriate estimated character string as the second character string.

A method, performed by the processor 220 according to an embodiment of the disclosure, of obtaining the second character string will now be described in more detail.

First, the processor 220 may calculate likelihoods of the plurality of estimated character strings obtained from the first character string.

The first character string estimated by the device 100 from the speech signal is obtained with respect to a probability distribution that speech signal frames are to correspond to arbitrary characters, respectively, in consideration of the language model and the dictionary information stored in the device 100. The server 200 may remove a bias related to the language model and the dictionary information of the device 100 from the first character string estimated by the device 100, and may perform re-decoding by using the language model and the dictionary information stored in the server 200.

The server 200 may calculate the likelihood of the plurality of estimated character strings obtained from the first character string, to remove the bias related to the language model and the dictionary information of the device 100 from the first character string.

The processor 220 may obtain the second character string by performing decoding by applying the dictionary information and the language model stored in the memory 230 to the likelihood obtained from the first character string. When the processor 220 performs decoding by applying the dictionary information and the language model stored in the memory 23C of the server 200, the processor 220 may use dictionary information and a language model including many named entitles, leading to an increase in the accuracy of speech recognition.

For example, a named entity "Cardinals" may not be stored in the language model of the memory of the device 100. Accordingly, the device 100 may incorrectly estimate the first character string [The cat and deers baseball team] from the speech signal "The Cardinals baseball team."

However, as shown in FIG. 3A, a named entity "Cardinals" of a sports domain may be stored in the memory 230 of the server 200. Accordingly, the processor 220 of the server 200 may determine that a probability that 'cat and deers' estimated by the device 100 is actually a baseball team name 'Cardinals' is high.

The processor 220 may identify replacement characters having similar pronunciations to each character within the first character string, and obtain a second character string in which at least one character within the first character string has been corrected into another character, based on the identified replacement characters. Accordingly, the processor 220 may obtain a second character string [The Cardinals baseball team] in which 'cat and deers' within the first character string has been replaced by 'Cardinals.' A detailed method of obtaining the second character string [The Cardinals baseball team] from the first character string [The cat and deers baseball team] by using a WFST decoding method, will be described later with reference to FIG. 17.

The server 200 may transmit the second character string to the device 100. The device 100 may replace the first character string estimated by the device 100 with the second character string received from the server 200 and may output the second character string. As shown in FIG. 8A, for example, a confidence score of the first character string [The cat and deers baseball team] may be 0.1 and a confidence score of the second character string [The Cardinals baseball team] may be 0.5. The device 100 according to an embodiment of the disclosure may increase speech recognition performance by receiving the second character string having a confidence score higher than a confidence score of the first character string from the server 200 and utilize the received second character string to provide a more accurate response in reply to the user input.

As described above, the server 200 according to an embodiment of the disclosure may receive the frame-synchronized character string from the device 100 or may generate the frame-synchronized character string from a character string received from the device 100. The server 200 may determine a replacement character string by obtaining likelihood of each character corresponding to each speech signal frame. The server 200 may simultaneously receive the entire character string including a plurality of characters, or may sequentially receive at least some of the characters included in the character string.

Figure 8B:
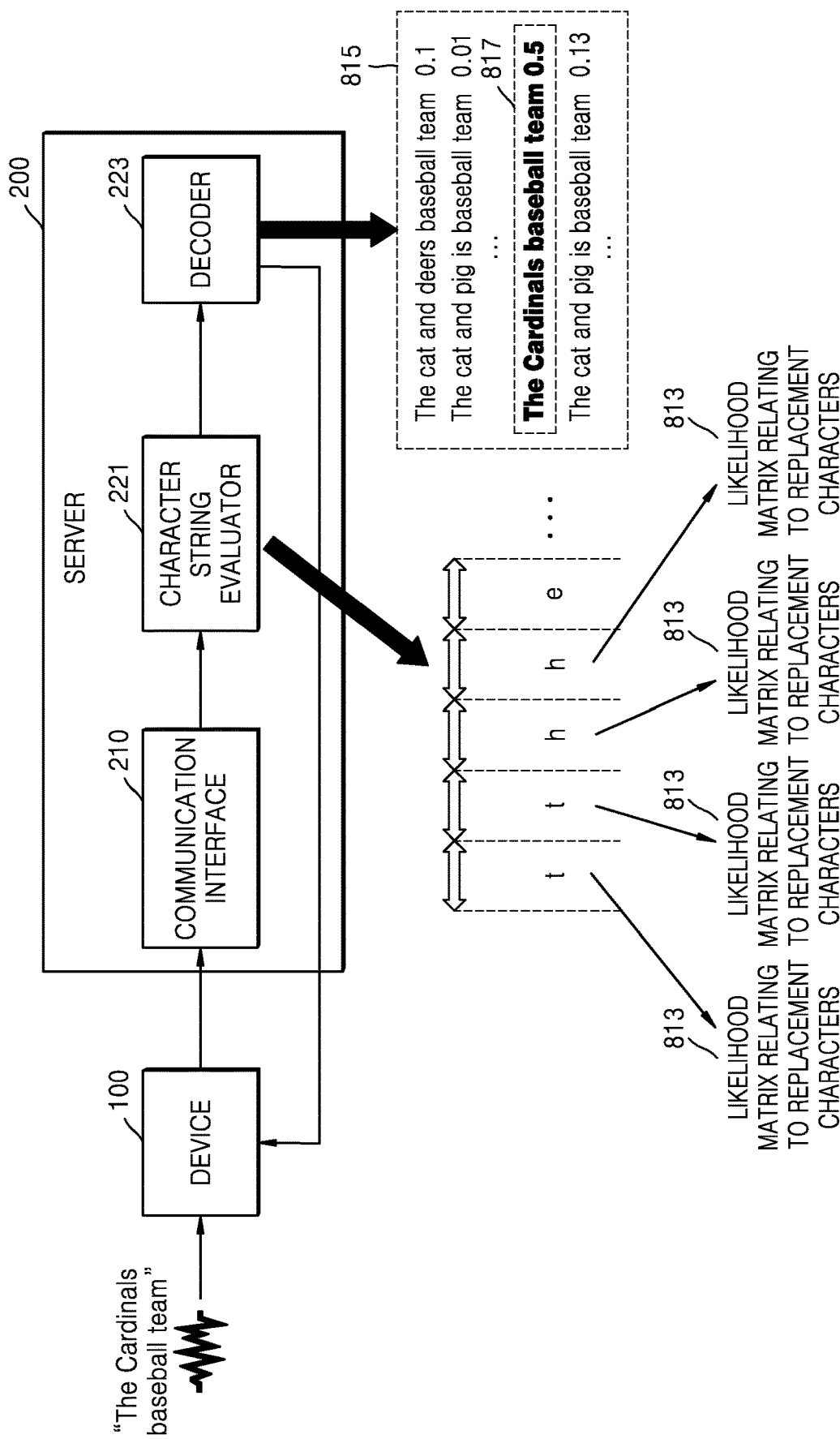
FIG. 8B is a view for explaining a method, performed by a server, of determining a replacement character string by obtaining a likelihood of each character corresponding to each speech signal frame, according to an embodiment of the disclosure.

A method, performed by the server 200 according to an embodiment of the disclosure, of determining the replacement character string by obtaining the likelihood of each character corresponding to each speech signal frame will now be described in more detail with reference to FIG. 8B.

The server 200 according b an embodiment of the disclosure may receive a frame-synchronized first character string from the device 100 or may generate the frame-synchronized first character string from a character string received from the device 100.

For example, the communication interface 210 of the server 200 may receive, from the device 100, information related to a speech Signal together with a character string obtained from the speech signal by the device 100. The server 200 may generate the frame-synchronized first character string by forcedly aligning the character string, based on the information related to the speech signal.

A character string evaluator 221 of the server 200 may calculate likelihood matrices 813 for each character within the frame-synchronized first character string, the likelihood matrices 813 relating to replacement characters that are to replace each character within the frame-synchronized first character string.

According to an embodiment of the disclosure, a likelihood matrix for a certain character that is calculated by the character string evaluator 221 may refer to a matrix including likelihood values for replacement characters that are to replace the certain character. A likelihood value for a replacement character that is to replace a certain character may refer to a probability that the certain character is estimated as a speech recognition result when the replacement character is assumed to be a ground truth character.

For example, for a character "a" included in a character string obtained as a speech recognition result, a likelihood matrix [0.4 0.01 0.01 0.01 0.2 . . . 0.01] including a probability value that a ground truth character is "a," a probability value that the ground truth character is "b," a probability value that a ground truth character is "c," . . . , and a probability value that the ground truth character is "z" may be obtained. When a likelihood matrix including likelihood values for replacement characters corresponding to each character included in a character string is obtained, a high likelihood value may be assigned to replacement characters having similar pronunciations to each character.

A decoder 223 of the server 200 may select one estimates character string from a plurality of estimated character strings in which at least one character within the frame-synchronized first character string has been replaced, based on the likelihood matrices 813, and may obtain the selected estimated character string as the second character string.

For example, the decoder 223 may re-calculate the likelihood matrices 813, based on dictionary information and a language model. The decoder 223 may determine a second character string having maximum re-calculated likelihood from among the plurality of estimated character strings. For example, the decoder 223 may include a Viterbi decoder. The Viterbi decoder may search for a character string having highest likelihood with respect to the first character string, as the second character string, in consideration of the dictionary information and the language model.

The decoder 223 of the server 200 may obtain a character string 817 having a highest confidence score from among a plurality of estimated character strings 815, as the second character string, based on the likelihood of the plurality of estimated character strings, the dictionary information, and the language model. The server 200 may transmit the second character string to the device 100. The device 100 may increase speech recognition performance by receiving the second character string having a higher confidence score than the first character string from the server 200 and using the second character string.

Various embodiments of the disclosure of a method, performed by the server 200, of calculating likelihood will now be described in detail with reference to FIGS. 9 through 11B.

Figure 9:
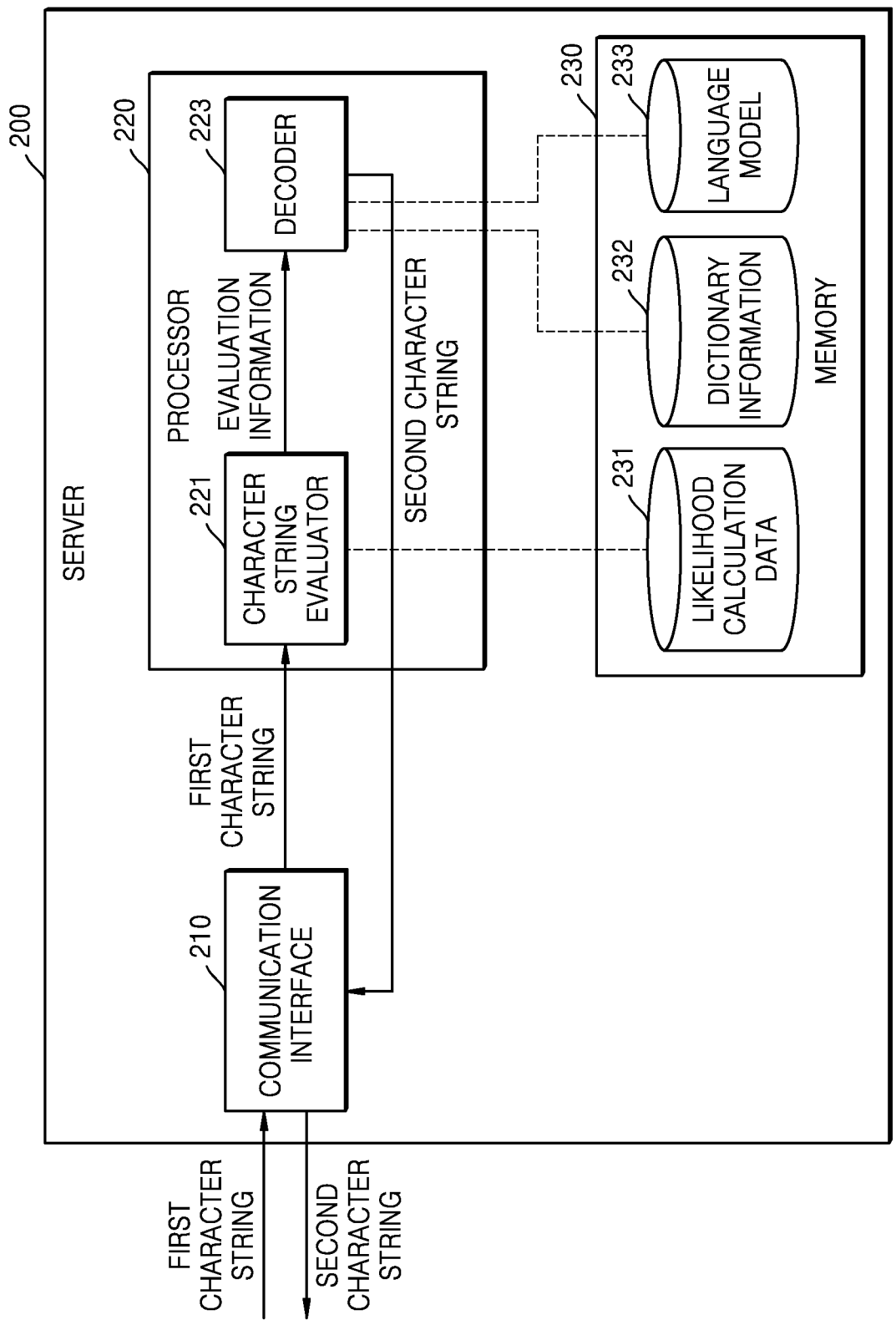
FIG. 9 is a detailed block diagram of a server according to an embodiment of the disclosure.

FIG. 9 is a detailed block diagram of a server according to an embodiment or the disclosure.

As illustrated in FIG. 9, the communication interface 210 of the server 200 may receive a first character string from the device 100.

The character string evaluator 221 of the processor 220 may output evaluation information for the first character string that enables the decoder 223 to recommend and output a second character string having a confidence score higher than a confidence score of the first character string. For example, the evaluation information of the first character string may include likelihood calculated from the first character string.

The character string evaluator 221 may calculate likelihoods of a plurality of estimated character strings obtained from the first character string. The character string evaluator 221 may obtain the plurality of estimated character strings by replacing each of the characters included in the first character string with another character. The likelihoods of the plurality of estimated character strings may refer to probabilities that, when each of the plurality of estimated character strings obtained from the first character string is assumed to be a ground truth character string, the first character string is estimated by a speech recognition module.

The likelihood obtained from the first character string and output by the character string evaluator 221 may be used to identify replacement characters having pronunciations similar to the characters of the first character string and determine estimated character strings in which at least one character within the certain character string has been corrected into another character, based on the identified replacement characters.

The character string evaluator 221 may calculate likelihood matrices relating to replacement characters that are to replace each character within the first character string, and may identify the plurality of estimated character strings, based on the likelihood values within the likelihood matrices. The character string evaluator 221 may output the likelihood matrices obtained from each character, as the likelihood of the plurality of estimated character strings.

The character string evaluator 221 may calculate the likelihood from the first character string by using likelihood calculation data 231 stored in the memory 230. For example, the likelihood calculation data 231 may include a neural network trained for likelihood calculation or a confusion matrix.

For example, the character string evaluator 221 may calculate the posterior probabilities of each character within the first character string, based on characters occurring previous to each character. The character string evaluator 221 may calculate a character sequence probability from the first character string. The character string evaluator 221 may calculate the likelihood of the plurality of estimated character strings obtained from the first character string, based on the posterior probabilities of each character and the character sequence probability.

As another example, the character string evaluator 221 may calculate the posterior probabilities of each character within the first character string, based on a pre-determined confusion matrix. The character string evaluator 221 may calculate the likelihood of the plurality of estimated character strings obtained from the first character string, based on the posterior probabilities of each character.

After the character string evaluator 221 calculates the likelihood, the decoder 223 may obtain the second character string, based on the calculated likelihood, by using dictionary information and a language model. The decoder 223 may main a second character string having maximum likelihood from among the plurality of estimated character strings obtained by replacing at least one character in the first character string with another character.

The decoder 223 may obtain a second character string in which at least one character in the first character string has been replaced with another character, by using dictionary information 232 and a language model 233. For example, the decoder 223 may include a WEST decoder using likelihood as an input, or a Viterbi decoder using typical token passing.

According to an embodiment of the disclosure, the dictionary information stored in the server 200 may be dictionary information storing relationships between words and character strings, instead of general dictionary information storing relationships between phoneme strings and words. A language model may be an AI model that has learned relationships between words to be able to estimate a probability of next words when a specific word string is assigned. For example, the language model may be a neural network such as an RNN, or a statistical n-gram.

The communication interface 210 may transmit the second character string to the device 100. However, embodiments of the disclosure are not limited to the embodiment of the disclosure of transmitting the second character string to the device 100. The server 200 according to an embodiment of the disclosure may transmit information related to a voice assistant service based on the second character string to the device 100 via the communication interface 210, by ascertaining an utterance intention of a user through natural language processing with respect to the second character string.

According to various embodiments of the disclosure, the information related to vie second character string transmitted by the server 200 to the device 100 has been described above with reference to FIGS. 2B and 2C, and thus a redundant description thereof will be omitted.

The decoder 223 of the server 200 according to an embodiment of the disclosure may perform decoding with respect to the first character string, by using different pieces of dictionary information end different language models for different domains. Accordingly, the server 200 according to an embodiment of the disclosure may output a speech recognition result having improved speech recognition accuracy through re-decoding with respect to the first character string received from the device 100.

The processor 220 of the server 200 according to an embodiment of the disclosure may receive the first character string from the device 100 and determine a domain related to the first character string. The decoder 223 of the server 220 may perform decoding with respect to the first character string, by using dictionary information and a language model corresponding to the determined domain.

For example, the processor 220 of the server 200 may receive domain information related with the first character string together with the first character string from the device 100, and may determine a domain to perform decoding with respect to the first character string, based on the received domain information. For example, the processor 220 may determine a domain that is the same as or similar to a domain identified from the domain information received from the device 100, as a domain to perform decoding.

As another example, the processor 220 of the server 200 may determine a domain related to the first character string received from the device 100, based on the received first character string. Although not shown in FIG. 9, the server 200 may store a domain identification model that is an AI model trained for performing domain identification, in the memory 230. The processor 220 may output a domain confidence score by using the first character string as an input value, by using the domain identification model. The processor 220 may determine the domain associated with the first character string, based on the domain confidence score indicating a confidence of the identified domain. According to an embodiment of the disclosure, the character string evaluator 221 or the decoder 223 of the server 200 may determine the domain associated with the first character string received from the device 100, based on the received first character string.

For example, the processor 223 of the server 200 may determine the domain related to the first character string received from the device 100, based on the lad received first character string. The decoder 223 according to an embodiment of the disclosure may perform decoding by using dictionary information and a language model specialized to the determined domain for the received first character string. The decoder 223 according b an embodiment of the disclosure may be a second pass decoder. The second pass decoder may perform primary decoding with respect to the evaluation information about the first character string received from the character string evaluator 221, and then may perform secondary decoding by using a result of the primary decoding.

In this case, the decoder 223 according to an embodiment of the disclosure may perform decoding based on a general dictionary and a language model, by using a first pass decoder. The decoder 223 according to an embodiment of the disclosure may perform decoding based on a dictionary and a language model specialized to the determined domain for the received first character string, by using the second pass decoder.

As another example, the communication interface 210 of the server 200 according to an embodiment of the disclosure may receive, from the device 100, information used to determine the domain related to the first character string, together with the first character string. For example, the information used to determine the domain, received from the device 100, may include context information. For example, the context information may include at least one of information about an application being currently used on the device 100 or the server 200 by the user, conversation history information, situation information of the surroundings of the device 100, or trend information. The processor 220 of the server 200 may determine a domain to perform decoding on the first character string, based on the context information. A detailed method of determining a domain, based on context information, will now be described.

For example, the processor 220 may determine the domain, based on an application currently being executed by the user. When the user is accessing a map application on the device 100 or the server 200, the processor 220 may determine a domain associated with a map as the domain to perform decoding when determining a domain for a character string obtained from an utterance of the user. For example, the processor 220 may determine a domain to perform decoding by applying a higher weight to the map domain, or may determine the map domain as the domain to perform decoding.

Alternatively, for example, the processor 220 may determine the domain, based on conversation history information. When it is determined that the conversion history of the user is associated with 'music,' the processor 220 may determine a domain associated with music as the domain to perform decoding when determining a domain for a character string obtained from an utterance of the user. For example, the processor 220 may determine a domain to perform decoding by applying a higher weight to the music domain, or may determine the music domain as the domain to perform decoding.

Alternatively, for example, the processor 220 may determine a domain, based on situation information of the surroundings of the device 100 sensed by a sensor mounted on the device 100. The processor 220 may determine a domain, based on a location of the device 100 identified using global positioning system (GPS) information of the device 100. When the user tries to search for a restaurant, the processor 220 may determine a domain associated with the location of the device 100 as the domain to perform decoding. When the location of the device 100 is near a cinema, the processor 220 may determine a domain associated with a movie as the domain to perform decoding.

Alternatively, for example, the processor 220 may determine a domain, based on trend information. The processor 220 may determine a domain associated with top news or a real-time search keyword through a portal site as the domain to perform decoding.

A case in which the character string evaluator 221 of the server 200 according to an embodiment of the disclosure obtains likelihood, based on previously accumulated characters of each character within the first character string will now be described in detail.

The communication interface 210 of the server 200 according to an embodiment of the disclosure may receive a frame-synchronized first character string $y_o[0:L+1]$ from the device 100. A frame-synchronized character string has been described above with reference to FIG. 6, and thus a redundant description thereof will be omitted.

In the description below, $y_o[L]$ may be a frame-synchronized character that is estimated from a speech signal by an on-device speech recognition module. The frame-synchronized character may refer to a character estimated from one speech frame included in the speech signal, $y_o[L]$ is included in V, which is a group of all characters.

$y_o[0:L+1]$ refers to a sequence of $y_o[L']$ when $0 \le L' \le L$. L and L' are indexes of a character string.

The communication interface 210 may simultaneously receive the entire character string including a plurality of characters, or may sequentially receive some of the characters included in the character string.

$y_p[L]$ refers to a frame-synchronized character that is estimated for a server to post-process the character string obtained by a device. $y_p[L]$ is included in V, which is a group of characters. $W_i$ is a word string. $W_i$ is a word included in D, which is a group of words.

The character string evaluator 221 of the server 200 may calculate a character sequence probability $P(y_o[0:L+1])$ that characters are arranged according to the first character string $y_o[0:L+1]$. The character sequence probability $P(y_o[0:L+1])$ may be calculated from a character-level language model.

The character string evaluator 221 may calculate posterior probabilities $P(y_p[L]|y_o[0:L+1])$ that, when the first character string $y_o[0:L+1]$ has been estimated by the device 100, an L-th character is actually $y_p[L]$. The character string evaluator 221 may calculate the posterior probabilities $P(y_p[L]|y_o[0:L+1])$ of the character $y_o[L]$, based on the first character string $y_o[0:L+1]$. In other words, the character string evaluator 221 may calculate a probability that the device 100 has accurately estimated the character $y_o[L]$ and probabilities that the device 100 has incorrectly estimated the character $y_o[L]$, based on the first character string $y_o[0:L+1]$.

The character string evaluator 221 according to an embodiment of the disclosure may calculate the posterior probabilities of each character of the first character string from the first character sting, by using a neural network. That is, the calculation of the posterior probabilities of each character of the first character string from the first character string may be performed utilizing a neural network trailed to calculate the posterior probabilities of each character of the first character string from the first character string.

Figure 10A:
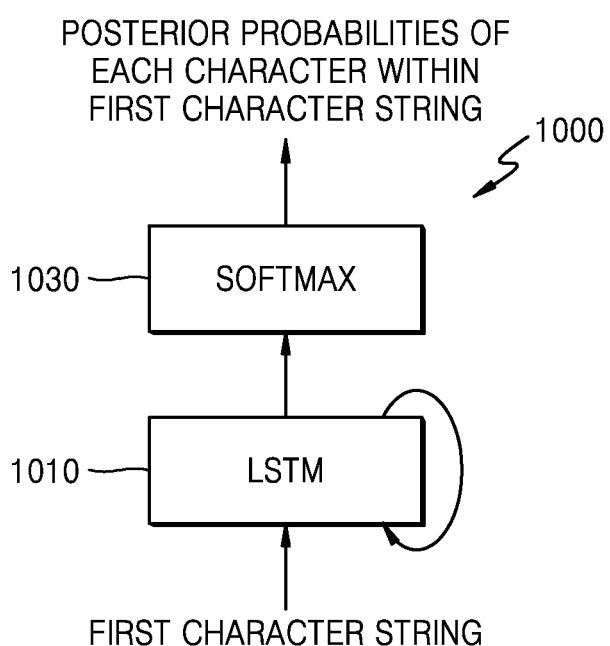
FIG. 10A illustrates a structure of an artificial intelligence recurrent neural network (RNN) for calculating posterior probabilities, according to an embodiment of the disclosure.

The character string evaluator 221 according to an embodiment of the disclosure may calculate the posterior probabilities of each character within the first character string by using an RNN 1000 including an LSTM layer 1010 and a softmax layer 1030 of FIG. 10A.

The LSTM layer 1010 of FIG. 10A may include a plurality of stacked LSTM layers. In FIG. 10A, the first character string may be input to the LSTM layer 1010, data output from the LSTM layer 1010 may be input to the softmax layer 1030, and the softmax layer 1030 may output the posterior probabilities of each character of the first character string.

According to an embodiment of the disclosure, a neural network that calculates the posterior probabilities of each character within a character string may be trained by learning a ground truth character string and an erroneous character string that is output from a speech recognition module. In detail, when the neural network has received the erroneous character string that is output from the speech recognition module, the neural network may be trained such that an output value approaches a ground truth character string.

An AI model used by the character string evaluator 221 according to an embodiment of the disclosure to obtain the posterior probabilities may be trained based on results of speech recognitions of a plurality of speech recognition modules to prevent the posterior probabilities from being overt on a result of speech recognition of a specific speech recognition module.

The character string evaluator 221 of the processor 220 may calculate likelihood $P(y_o[0:L+1]|y_p[L])$, based on the posterior probabilities $P(y_p[L]|y_o[0:L+1])$ and the character sequence probability $P(y_o[0:L+1])$.

The likelihood $P(y_o[0:L+1]|y_l[L])$ may be calculated using Equation 1 below, based on the posterior probabilities $P(y_p[L]|y_o[0:L+1])$ and the character sequence probability $P(y_c[0:L+1])$.

$$P(y_o[0:L+1] \mid y_P[L]) = \frac{P(y_P[L] \mid y_o[0:L+1])P(y_o[0:L+1])}{P(y_P[L])} \quad \text{[Equation 1]}$$

In [Equation 1], $P(y_p[L])$ indicates an anterior probability of $y_p[L]$. The anterior probability of the certain character $y_p[L]$ may be a value statistically pre-calculated based on a frequency of use of the certain character.

The decoder 223 of the server 200 according to an embodiment of the disclosure may estimate a second character string $W_i$ from the likelihood $P(y_o[0:L+1]|y_p[L])$ by using the dictionary information 232 and the language model 233. The second character string may be a character string obtained by replacing at least one character of the first character string with another character. The communication interface 210 may transmit the second character string $W_i$ to the device 100. Although the server 200 received a frame-synchronized character string $y_o[0:L+1]$ from the device 100, the server 200 may transmit the second character string $W_i$ having a word string shape, to the device 100.

The character string evaluator 221 of the server 200 according to another embodiment of the disclosure may calculate likelihood in consideration of only each character, without considering characters accumulated prior to each character. The character string evaluator 221 according to another embodiment of the disclosure may calculate likelihood in consideration of only the character $y_o[L]$ instead of the frame-synchronized character string $y_o[0:L+1]$. When considering only the character $y_o[L]$ instead of the frame-synchronized character string $y_o[0:L+1]$, the server 200 may have a very simple structure, and, because only a character-level confusion matrix is stored and used instead of a neural network, a calculation process may be simplified.

The communication interface 210 of the server 200 may receive a frame-synchronized first character string $y_o[0:L+1]$ from the device 100. A frame-synchronized character string has been described above with reference to FIG. 6, and thus a redundant description thereof will be omitted. The communication interface 210 may simultaneously receive the entire character string including a plurality of characters, or may sequentially receive some of the characters included in the character string.

The character string evaluator 221 of the server 200 according to another embodiment of the disclosure may obtain posterior probabilities $P(y_p[L]|y_o[L])$ that an L-th character is actually $y_p[L]$, when a first character $y_o[L]$ within the first character string has been estimated by the device 100. The character string evaluator 221 may obtain the posterior probabilities $P(y_p[L]|y_o[L])$ of the first character $y_o[L]$, based on the first character $y_o[L]$. In other words, the posterior probability calculator 221 may obtain a probability that the device 100 has accurately estimated the first character $y_o[L]$ and probabilities that the device 100 has incorrectly estimated the first character $y_o[L]$, based on the first character $y_o[L]$.

The character string evaluator 221 according to an embodiment of the disclosure may obtain the posterior probabilities of each character of the first character string from the first character string, by using a confusion matrix.

Figure 10B:
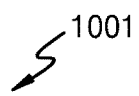
FIG. 10B illustrates an example of a confusion matrix for calculating a likelihood, according to an embodiment of the disclosure.

FIG. 10B illustrates an example of a confusion matrix 1001 for calculating the posterior probabilities according to an embodiment of the disclosure.

The confusion matrix 1001 includes a probability that the speech recognition module of the device 100 has accurately predicted a certain character included in a character string and a probability that another character has been incorrectly predicted as the certain character.

For example, because a character "a" and a character "e" have similar pronunciations, a probability that the speech recognition module incorrectly estimates the actual character "a" as the character "e" may be relatively high. On the other hand, because the character "a" and a character "b" have very different pronunciations, a probability that the speech recognition module incorrectly estimates the actual character "a" as the character "b" may be relatively low.

Accordingly, as shown in FIG. 10B, a probability that the speech recognition module of the device 100 incorrectly estimates the actual character "a" as a character "e" may be 0.23, and a probability that the speech recognition module incorrectly estimates the actual character "a" as the character "b" may be 0.01.

When a character estimated by the device 100 is the first character $y_o[L]$, the character string evaluator 221 according to an embodiment of the disclosure may search for and obtain the posterior probabilities $P(y_p[L]|y_o[L])$ that an actual character is $y_p[L]$, from the confusion matrix 1001 of FIG. 10B.

The character string evaluator 221 may calculate likelihood $P(y_o[L]|y_p[L])$, based on the obtained posterior probabilities $P(y_p[L]|y_o[L])$.

The likelihood $P(y_o[L]|y_p[L])$ may be calculated using Equation 2 below, based on the posterior probabilities $P(y_p[L]|y_o[L])$.

$$P(y_o[L]|y_P[L]) = \frac{P(y_P[L]|y_o[L])P(y_o[L])}{P(y_P[L])} \quad \text{[Equation 2]}$$

in [Equation 2], $P(y_p[L])$ indicates an anterior probability of $y_p[L]$. The anterior probability of the certain character $y_p[L]$ may be a value statistically pre-calculated based on a frequency of use of the certain character.

The decoder 223 of the server 200 may estimate the second character string W from the likelihood $P(y_o[L]|y_p[L])$ by using the dictionary information 232 and the language model 233. The second character string may be a character string obtained by replacing at least one character of the first character string with another character. The communication interface 210 may transmit the second character string $W_i$ to the device 100. Although the server 200 received the frame-synchronized character string $y_o[0:L+1]$ from the device 100, the server 200 may output the second character string $W_i$ having a word string shape.

As described above, the character string evaluator 221 of the server 200 according to an embodiment of the disclosure may receive the frame-synchronized character string from the device 100 and may obtain likelihood for each character corresponding to each speech signal frame. For example, the character string evaluator 221 may calculate the likelihood $P(y_o[0:L+1]|y_p[L])$ or $P(y_o[L]|y_p[L])$ for the character $y_o[L]$ of an index L corresponding to a speech signal frame.

A method, performed by the character string evaluator 221 according to an embodiment of the disclosure, of obtaining likelihood for each character corresponding to each speech signal frame from a character string received from the device 100 will now be described in detail wan reference to FIGS. 11A and 11B.

Figure 11A:
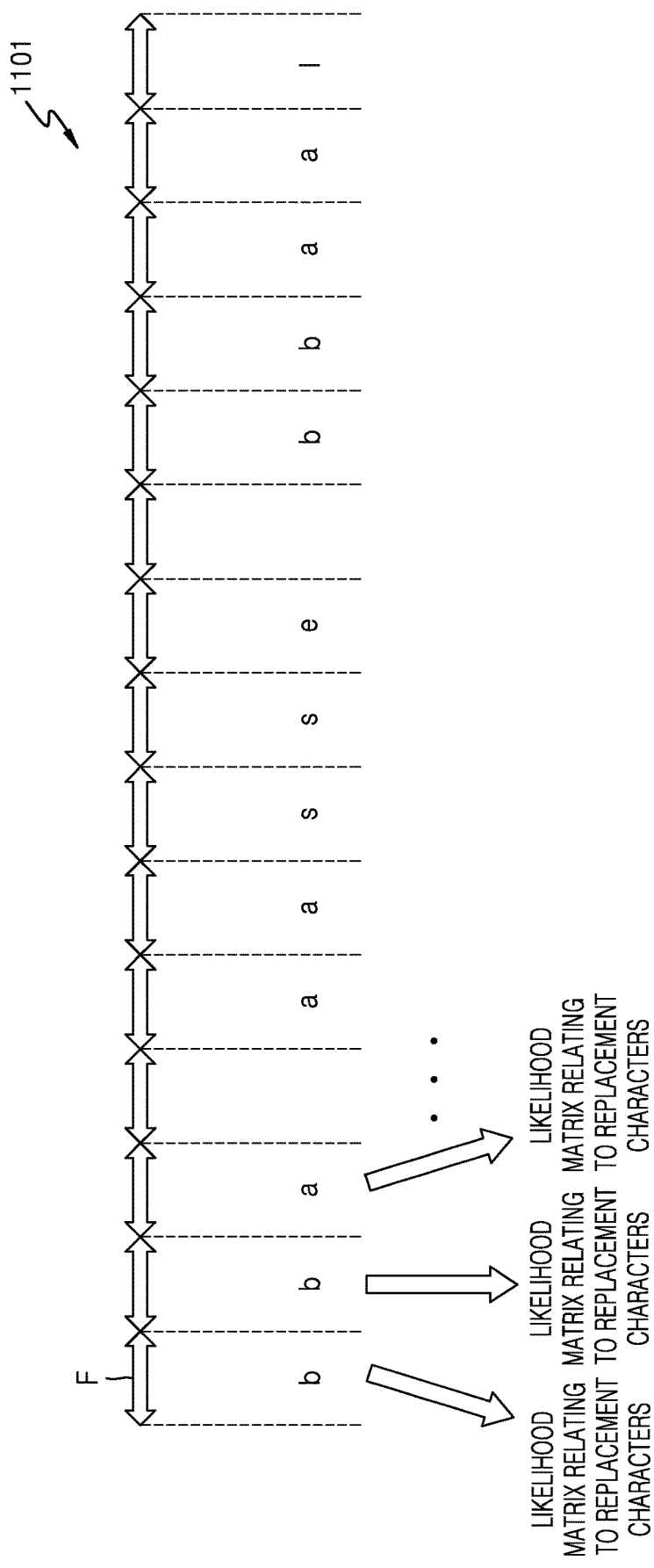
FIG. 11A is a view for explaining a process, performed by a server, of calculating a likelihood matrix relating to replacement characters that are to replace each character within a first character string received from a device, according to an embodiment of the disclosure.

Referring to FIG. 11A, the character string evaluator 221 according to an embodiment of the disclosure may receive a frame-synchronized character string 1101. The character string evaluator 221 may calculate a likelihood matrix relating to replacement characters that are to replace each character.

Figure 11B:
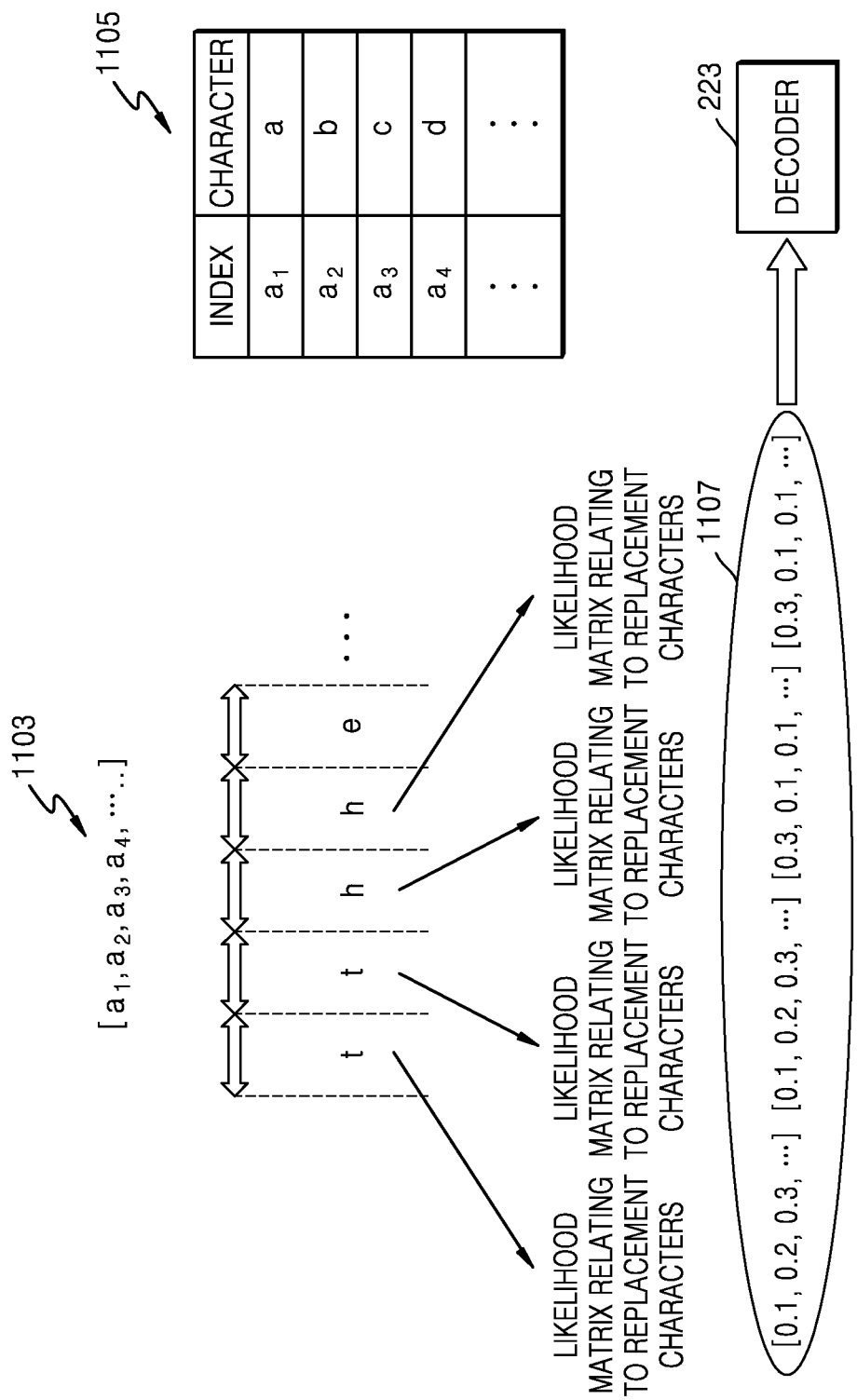
FIG. 11B is a view for explaining a process, performed by a server, of calculating a likelihood matrix relating to replacement characters that are to replace each character within a first character string received from a device according to another embodiment of the disclosure.

As shown in FIG. 11B, the likelihood matrix relating to replacement characters calculated by the character string evaluator 221 according to an embodiment of the disclosure may be expressed as a matrix including likelihoods that a certain character is each of arbitrary characters. As shown in table 1105 of FIG. 11B, each of the arbitrary characters may be mapped with each of the indexes of the likelihood matrix.

For example, the value of an index $a_1$ in a likelihood matrix 1103 may represent a likelihood that the certain character is replaced by a character "a" corresponding to the index $a_1$. The value of an index $a_2$ In the likelihood matrix 1103 may represent a likelihood that the certain character is replaced by a character "b" corresponding to the index $a_2$. The value of an index $a_3$ In the likelihood matrix 1103 may represent a likelihood that the certain character is replaced by a character "c" corresponding to the index $a_3$.

The character string evaluator 221 according to an embodiment of the disclosure may calculate likelihood matrices 1107 relating to the replacement characters that are to replace each character within a character string. The character string evaluator 221 may output, to the decoder 223, the likelihood matrices 1107 calculated as the likelihood of a plurality of estimated character strings in which at least one character within a first character string has been replaced.

The decoder 222 according to an embodiment of the disclosure may obtain a character string having a highest confidence score from among confidence scores of the plurality of estimated character strings, as a second character string, by using dictionary information and a language model, based on the likelihood received from the character string evaluator 221.

As described above, a speech recognition system according to various embodiments of the disclosure may perform on-device speech recognition in some cases or may perform server-based speech recognition in other cases. However, embodiments of the disclosure are not limited thereto. A device 300 according to an embodiment of the disclosure may include a plurality of speech recognition modules, and may perform on-device speech recognition in a first speech recognition module in some cases or may perform server-based speech recognition in a second speech recognition module in other cases.

Figure 12:
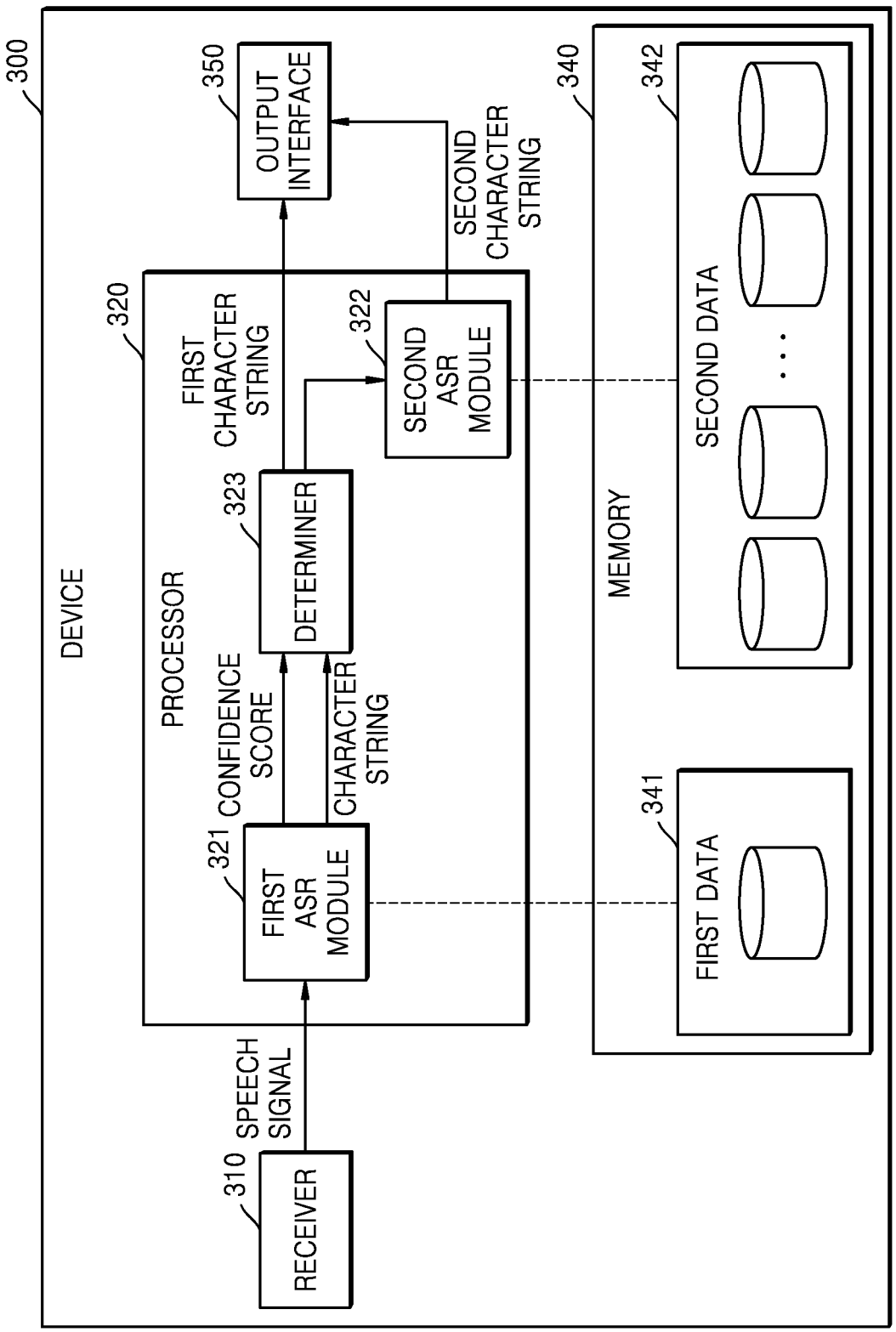
FIG. 12 is a block diagram of a device selectively using two speech recognition modules, according to an embodiment of the disclosure.

FIG. 12 is a block diagram of the device 300 selectively using two speech recognition modules, according to an embodiment of the disclosure.

Referring to FIG. 12, the device 300 may include a receiver 310, a processor 320, a memory 340, and an output interface 350. One or more components of the device 300 illustrated in FIG. 12 may be omitted or consolidated together Additional components other than those illustrated in FIG. 12 may be included in the device 300. For example, referring to FIG. 19, a device 300 according to some embodiments of the disclosure may further include a user input interface 2100, a sensing unit 2400, and an A/V input interface 2600.

The receiver 310 according to an embodiment of the disclosure may receive a speech signal from a user. For example, the receiver 310 may receive the speech signal by transforming external sound into electrical acoustic data via a microphone. In FIG. 12, the receiver 310 is included in the device 300. However, according to another embodiment of the disclosure, the receiver 310 may be included in a separate device and may be connected to the device 300 in a wired or wireless manner.

The memory 340 according to an embodiment of the disclosure may store instructions for performing speech recognition, and various models, a neural network, dictionary information, and the like that are used in speech recognition.

The memory 340 may store various models, a neural network, dictionary information, and the like that are used in speech recognition. First data 341 stored in the memory 340 may include at least one of a model, a neural network, or dictionary information that are used by a first ASR module 321 to perform speech recognition, second data 342 stored in the memory 340 may Include at least one of a model, a neural network, or dictionary information that are used by a second ASR module 322 to perform speech recognition.

The processor 320 according to an embodiment of the disclosure may perform speech recognition by executing one or more instructions stored in the memory 340. The processor 320 according to an embodiment of the disclosure may include the first ASR module 321 and the second ASR module 322.

The first ASR module 321 of the processor 320 according to an embodiment of the disclosure may receive the speech signal obtained by the receiver 310, and may perform speech recognition with respect to the speech signal, based on the first data 341 (for example, an acoustic model, a neural network, a language model, or dictionary information). The first ASR module 321 may obtain a first character string from the speech signal. The first character string may be a frame-synchronized character string.

Because the first ASR module 321 of FIG. 12 may correspond to the ASR module 121 of FIG. 4A or the ASR module 121 of FIG. 4B, a redundant description thereof will be omitted.

A determiner 323 of the processor 320 according to an embodiment of the disclosure may determine whether to replace the first character string output by the first ASR module 321 with another character string.

For example, the determiner 323 of the processor 320 may determine a confidence score of the first character string, and may determine whether to replace the first character string with another character string, based on the determined confidence score.

For example, when the confidence score of the first character string IS equal to or greater than a threshold value, the determiner 323 of the processor 320 according to an embodiment of the disclosure may determine that correction of the first character string is unnecessary, and may output the first character string through the output interface 350. On the other hard, when the confidence score is less than the threshold value, the determiner 323 of the processor 320 may determine that correction of the first character string is necessary, and may transmit the first character string to the second ASR module 322.

As another example, the determiner 323 of the processor 320 may determine whether to replace the first character string with another character string, based on a result of comparing keywords pre-stored in the device 100 with the first character string. As another example, the determiner 323 of the processor 320 may determine whether to replace the first character string with another character string, based on whether a named entity is included in a domain to which the first character string is related or the first character string Regarding a detailed method, performed by the determiner 323 of the processor 320 according to an embodiment the disclosure, of determining whether to replace the first character string with another character string, the method, performed by the processor 120 of the device 100 according to an embodiment of the disclosure, of determining whether to replace the first character string with another character string, described above with reference b FIGS. 3 through 5B, may be used. A repeated description thereof will be omitted.

When it is determined that correction of the first character string is not necessary, the determiner 323 of the processor 320 according to an embodiment of me disclosure may determine that the first character string is not replaced by another character string. When the first character string is not replaced by another character string, the determiner 323 of the processor 320 according to an embodiment of the disclosure may output the first character string through the output interface 350.

When it is determined that the first character string needs to be replaced with another character string, the determiner 323 of the processor 320 according to an embodiment of the disclosure may transmit the first character string to the second ASR module 322, based on the determination.

The determiner 323 of the processor 320 according to an embodiment of the disclosure may transmit the first character string to the second ASR module 322 in units of sentences, words, phrases, or frames. When the first ASR module 321 of the processor 320 according to an embodiment of the disclosure performs speech recognition and thus obtains a character string that constitutes a sentence or a phrase, the determiner 323 may transmit all of the characters included in the sentence or phrase to the second ASR module 322 or transmit some of the characters included in the sentence or phrase to the second ASR module 322. The determiner 323 may transmit some characters having low confidence scores to the second ASR module 322, based on the confidence score of the character string.

The second ASR module 322 of the processor 320 according to an embodiment of the disclosure may receive and process the first character string. The second ASR module 322 may obtain the second character string in which at least one character within the first character string has been replaced, by re-decoding the first character string, based on a language modal and dictionary information that are stored in the second data 342.

The second ASR module 322 may calculate the likelihood of a plurality of estimated character strings from the first character string. The second ASR module 322 may determine whether to replace the first character string with the second character string, based on the calculated likelihood. The second ASR module 322 may obtain the second character string from the first character string by replacing at least one character included in the first character string with another character, based on the determination. The second ASR module 322 may obtain the second character string, which is one of the plurality of estimated character strings, based on likelihood, dictionary information, and a language model.

Because the second ASR module 322 of FIG. 12 may correspond to the processor 220 of FIGS. 7 and 9, a redundant description thereof will be omitted.

The second ASR module 322 may output the second character string via the output interface 350.

The output interface 350 according to an embodiment of the disclosure may output a speech recognition result corresponding to the first character string or the second character string. The output interface 350 may inform the user of the speech recognition result or may transmit the speech recognition result to an external device (for example, a smartphone, a home appliance, a wearable device, or a server). For example, the output interface 350 may include a speaker capable of outputting an audio signal or a display capable of outputting a video signal.

Alternatively, the device 300 according to an embodiment of the disclosure may perform an operation corresponding to a result of interpreting the first character string or the second character string. For example, the device 300 may determine a function of the device 300 corresponding to a result of speech recognition, and output a screen image for performing the determined function through the output interface 350. Alternatively, the device 30C may transmit a keyword corresponding to the result of the interpretation to an external server, and may receive information related to the transmitted keyword from the external server and output the received information to a screen through the output interface 350.

Alternatively, the device 300 according to an embodiment of the disclosure may output information related to a voice assistant service through the output interface 350, by ascertaining an utterance intention of the user through natural language processing with respect to the first character string or the second character string. The device 300 may use, for example, an NLU model, a DM model, and an NLG model within the device 300, to provide a voice assistant service.

For example, the device 300 may generate a response message to a user voice input, based on the first character string or the second character string, and output the generated response message, to imitate a person directly talking with the user in consideration of a situation of the user, a situation of a device, and the like. As another example, the device 300 may generate information needed by the user, based on the first character string or the second character string, and may output the generated information. As another example, the device 300 may ascertain an utterance intention of the user, based on the first character string or the second character string, and may request a service providing server to provide a service requested by the user. The device 300 may transmit the information received from the service providing server through the output interface 350.

The second ASR module 322 according to an embodiment of the disclosure may use second data 342 including many language models and a large amount of dictionary information, compared with the first data 341 used by the first ASR module 321. The second data 342 may include many named entitles such as a place name, a personal name, and a trade mark name, compared with the first data 341. Thus, according to speech recognition by the second ASR module 322, dictionary information and a language model including a large number of named entities may be used, and high-accuracy speech recognition may be performed.

Therefore, the device 300 of FIG. 12 may perform general-purpose speech recognition such as dictation, a general command, and caption generation, in the first ASR module 321, to minimize a latency. However, when the confidence score of the first character string output by the first ASR module 321 is not sufficiently high, the device 300 may perform additional processing with respect to the first character string in the second ASR module 322. The second ASR module 322 may increase the accuracy of speech recognition by using the second data 342 including more information than the first data 341.

The processor 320 of the device 300 according to an embodiment of the disclosure may obtain a corrected character string from the second ASR module 322, and may combine a character string not transmitted to the second ASR module 322 according to a determination that correction is unnecessary, with the corrected character string. The device 300 according to an embodiment of the disclosure may output a combined character string, output a result of speech recognition performed based on the combined character string, or provide a voice assistant service, based on a result of interpreting the combined character string.

The determiner 323 of the processor 320 according to an embodiment of the disclosure may provide Information of a domain associated with the first character string to the second ASR module 322, while requesting the second ASR module 322 to correct the first character siring. The information of the domain is information for identifying the domain, and may include, for example, the name of the domain and the identifier of the domain, but embodiments of the disclosure are not limited thereto.

The determiner 323 of the device 300 may identify the domain associated with the first character string, based on a domain confidence score of the first character string output by the first ASR module 321. The domain confidence score may be a figure representing how strongly at least a portion of the first character string is associated with a specific domain. For example, the determiner 323 may calculate a confidence score representing how strongly the first character string output by the first ASR module 321 is related to a domain previously registered in the first data 341. The device 300 may identify the domain associated with the first character string, based on the calculated domain confidence score. The device 300 may identify the domain associated with the first character string, based on a rule, or may obtain a domain confidence score associated with the first character string by using an AI model trained for domain identification.

The second ASR module 322 according to an embodiment of the disclosure may perform decoding with respect to the first character string, by using different pieces of dictionary information End different language models for different domains included in the second data 342. Accordingly, the second ASR module 322 according to an embodiment of the disclosure may output a speech recognition result having improved speech recognition accuracy through re-decoding with respect to the first character string.

The second ASR module 22 according to an embodiment of the disclosure may receive the first character string from the determiner 323 and determine the domain associated with the first character string. The second ASR module 322 may perform decoding with respect to the first character string, by using dictionary information and a language model corresponding to the determined domain.

For example, the second ASR module 322 may receive the information of the domain associated with the first character string together with the first character string from the determiner 323, and may determine a domain to perform decoding with respect to the first character string, based on the received information. For example, the second ASR module 322 may determine, as a domain to perform decoding, a domain that is the same as or similar to a domain identified from the information received from the determiner 323.

As another example, the second ASR module 322 may determine a domain related to the first character string received from the determiner 323, based on the received first character string. The device 300 may store a domain identification model that is an AI model trained for domain identification, in the memory 340. The second ASR module 322 may output a domain confidence score by using the first character string as an input value, by using the domain identification model. The second ASR module 322 may determine the domain associated with the first character string, based on the domain confidence score.

As another example, the second ASR module 322 according to an embodiment of the disclosure may receive information used to determine the domain related to the first character string, together van the first character string, from the determiner 323. The information used to determine the domain, received from the determiner 323, may include context Information. For example, the context information may include at least one of information about an application being currently used on the current device 300 by the user, conversation history information, situation information of the surroundings of the device 300, or trend information. The second ASR module 322 may determine a domain to perform decoding on the first character string, based on context information. A detailed method of determining the domain, based on the context information, may use the operation method of the processor 220 of FIG. 9, and thus a redundant description thereof will be omitted.

An operation method of the device 100 according to an embodiment of the disclosure will now be described in detail. Operations of the operation method of the device 100 to be described below may be respectively performed by the device shown in FIGS. 3, 4A, and 4B.

Figure 13:
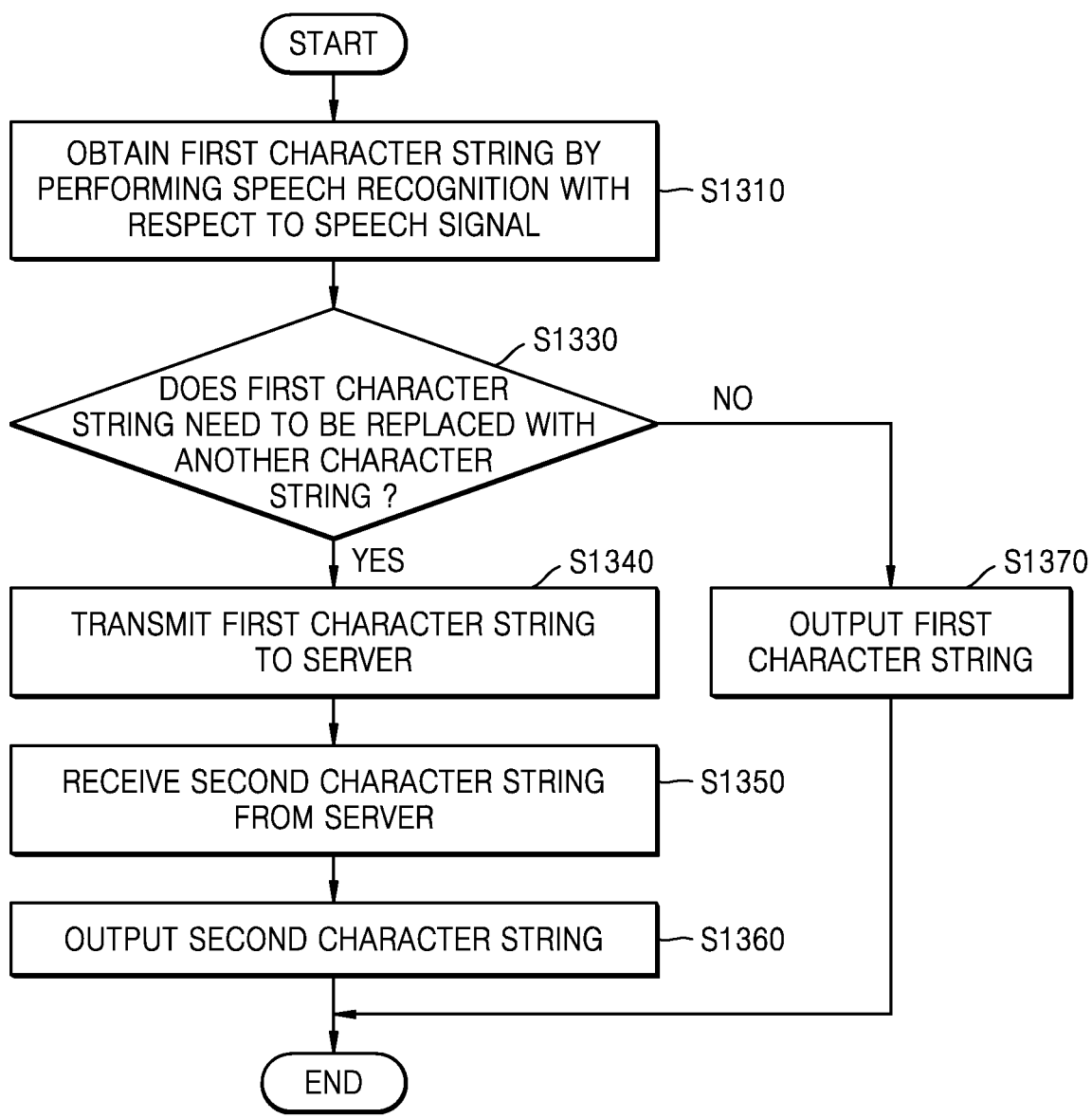
FIG. 13 is a flowchart of a method, performed by a device, of performing speech recognition, according to an embodiment of the disclosure.

FIG. 13 is a flowchart of a method, performed by a device, of performing speech recognition, according to an embodiment of the disclosure.

In operation S1310, the device 100 according to an embodiment of the disclosure may obtain the first character string by performing speech recognition with respect to the speech signal.

The device 100 according to an embodiment of the disclosure may estimate the first character string by performing speech recognition according to various speech recognition methods.

For example, the device 100 may obtain a character string from the speech signal by using an acoustic model, dictionary information, and a language model. First, the device 100 may obtain a phoneme string included in the speech signal, by using the acoustic model. For example, the device 100 may estimate a phoneme string including phonemes by using a hidden Markov model, a Gaussian mixture model, a Bayesian inference, a multilayer neural network, and the like. The device 100 may estimate words from the phoneme string and obtain the first character string including the estimated words, based on the dictionary information and the language model.

As another example, the device 100 may extract a feature vector from the speech signal, and may output the first character string from the feature vector by using a DNN.

For example, the first character string may be a frame-synchronized character string including characters respectively corresponding to speech signal frames obtained by spitting the speech signal at intervals of a preset time. Alternatively, for example, the first character string may be a character string obtained according to a label synchronization method to include each character uttered by the speech signal one by one.

When the first character string is not frame-synchronized, the device 100 according to an embodiment of the disclosure may obtain a frame-synchronized character string by performing forced alignment. The description with reference to FIG. 6 may be applied to the frame-synchronized character string and a detailed method of generating the frame-synchronized character string via forced alignment. A redundant description of the frame-synchronized character string and the detailed method of generating the frame-synchronized character string via forced alignment will be omitted.

In operation S1330, the device 100 according to an embodiment of the disclosure may determine whether to replace the first character string with another character string.

For example, the device 100 according to an embodiment of the disclosure may determine a confidence score of the first character string, and may determine whether to replace the first character string with another character string, based on the determined confidence score. For example, when the confidence score of the first character string is equal to or higher than a threshold value, the device 100 may determine that the first character string does not need to be replaced by another character string. On the other hand, when the confidence score of the first character string is lower than the threshold value, the device 100 may determine that the first character string needs to be replaced with another character string.

The confidence score of the first character string may be calculated based on at least one of the likelihood of a plurality of estimated character strings obtained from the first character string or the posterior probabilities that at least one character within the first character string is replaced by another character.

For example, the device 100 may calculate the confidence score, based on a likelihood that is output as a Viterbi decoding result. Alternatively, the processor 120 may calculate the confidence score, based on posterior probabilities that are output from a softmax layer in an end-to-end speech recognition model.

Alternatively, the device 100 according to an embodiment of the disclosure may determine a plurality of estimated character strings estimated during speech recognition with respect to the speech signal, and may calculate the confidence score of the first character string, based on a correlation between the plurality of estimated character strings. As the correlation between the plurality of estimated character strings including the first character string increases, the confidence score of the first character string may increase.

As another example, the device 100 may determine whether to replace the first character string with another character string, based on a result of comparing pre-stored keywords with the first character string. For example, when the pre-stored keywords are not included in the first character string, the device 100 may determine whether to replace the first character string with another character string.

As another example, the device 100 may determine whether to replace the first character string with another character string, based on whether a named entity is included in a domain to which the first character string is related or in the first character string. For example, when it is determined that the first character string is associated with a named entity-oriented domain, the device 100 may determine that the first character string is replaced with another character string.

When it is determined in operation S1330 that the first character string is replaced with another character string, the device 100 according to an embodiment of the disclosure may transmit the first character string to the server 200, in operation S1340. The device 100 according to an embodiment of the disclosure may transmit a frame-synchronized first character string to the server 200. The device 100 may simultaneously transmit the entire character string including a plurality of characters, or may sequentially transmit some of the characters included in the character string. The device 100 according to an embodiment of the disclosure may transmit the first character string in units of words or sentences.

When it is determined in operation S1330 that the first character string is not replaced with another character string, the device 100 according to an embodiment of the disclosure may output the first character string, in operation S1370. The device 100 according to an embodiment of the disclosure may output the first character string without changes, or may output a word string obtained from the first character string.

In operation S1350, the device 100 according to an embodiment of the disclosure may receive the second character string from the server 200. The second character string may be a character string obtained by the server 200 by replacing at least one character within the first character string with another character.

In operation S1360, the device 100 according to an embodiment of the disclosure may output the second character string. The device 100 according to an embodiment of the disclosure may output the second character string without changes, or may output a word string obtained from the second character string. For example, the device 100 may output a modified first character string in which the characters of the first character string are replaced by the characters of the second character string, as described with respect to FIGS. 8A-B.

Embodiments of the disclosure are not limited to the embodiment of the disclosure of FIG. 13 in which the device 100 outputs the first character string or the second character string without changes. The device 100 according to an embodiment of the disclosure may output information related to a voice assistant service, by ascertaining an utterance intention of the user through natural language processing with respect to the first character string or the second character string.

The device 100 may use, for example, an NLU model, a DM model, and an NLG model within the device 100, to provide a voice assistant service based on the first character string or the second character string.

For example, the device 100 may generate a response message, based on the first character string or the second character string, and output the generated response message, to imitate a person directly talking with the user in consideration of a situation of the user, a situation of a device, and the like. As another example, the device 100 may generate information needed by the user, based on the first character string or the second character string, and may output the generated information. As another example, the device 100 may ascertain an utterance intention of the user, based on the first character string or the second character string, and may request a service providing server to provide a service requested by the user. The device 100 may output information received from the service providing server.

The device 100 according to an embodiment of the disclosure may receive and output information related to a voice assistant service generated based on the second character string, instead of receiving the second character string from the server 200. The information related to the voice assistant service may be information that is generated by the server 200, based on the second character string obtained by correcting the first character string. For example, the information related to the voice assistant service may include a response message for the speech signal of the user, a service needed by the user, or information needed by the user.

As shown in FIG. 13, the device 100 according to an embodiment of the disclosure may determine whether to replace a first character string output by an on-device speech recognition module with another character string, and may selectively use server-based post-processing, based on a result of the determination.

The device 100 according to an embodiment of the disclosure may calculate the confidence score of the first character string output by the on-device speech recognition module in units of words (or sentences) uttered by the user, and may determine whether to replace the first character string, based on the calculated confidence score.

Figure 14:
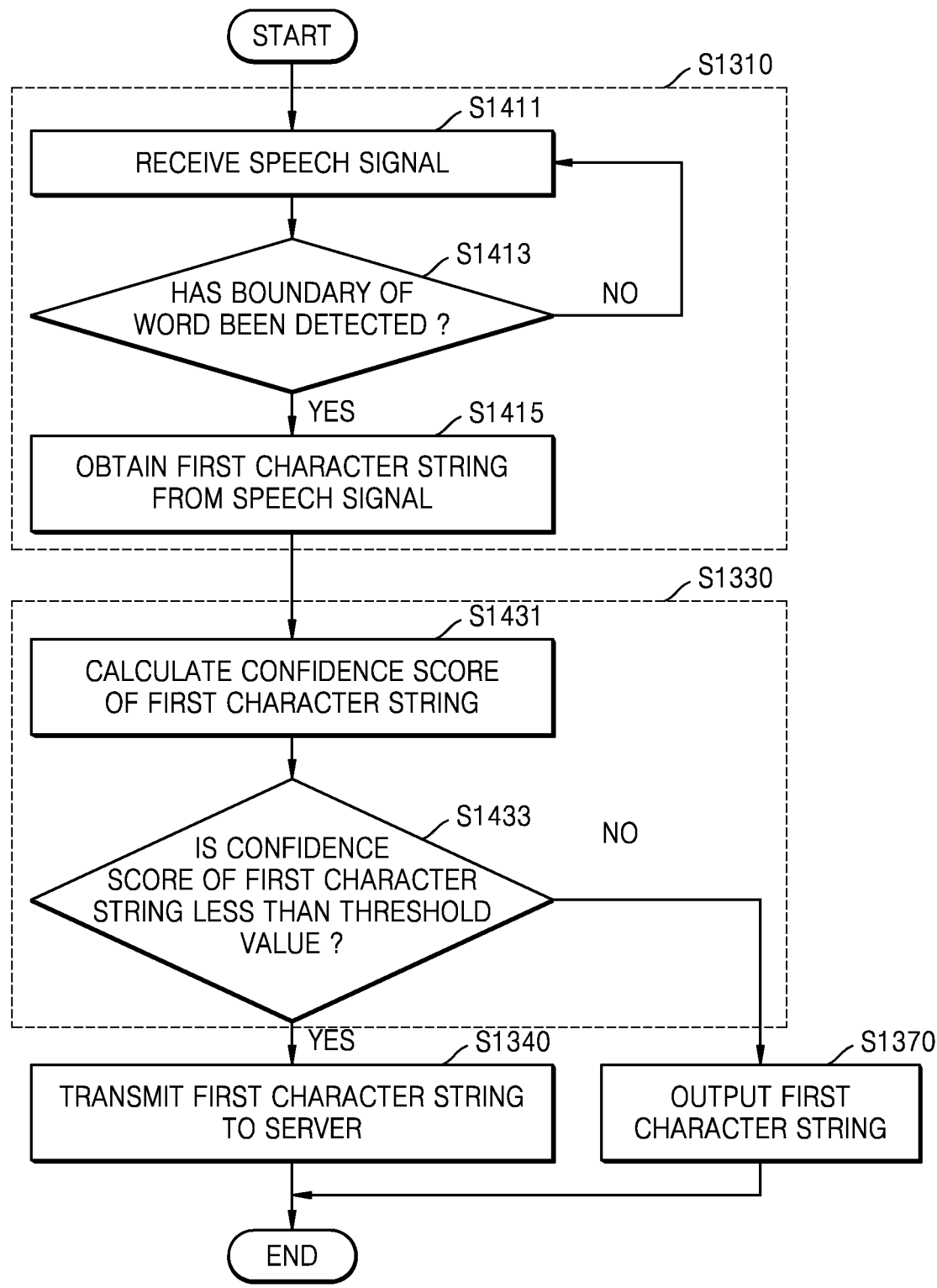
FIG. 14 is a detailed flowchart of a method, performed by a device, of performing speech recognition, according to an embodiment of the disclosure.

FIG. 14 is a detailed flowchart of operation S1310 of FIG. 13 in the method, performed by a device, of performing speech recognition, according to an embodiment of the disclosure.

In operation S1411, the device 100 according to an embodiment of the disclosure may receive a speech signal. In operation S1413, the device 100 according to an embodiment of the disclosure may determine whether the boundary of a word has been detected. The device 100 according to an embodiment of the disclosure may continuously receive a speech signal including speech frames, until the boundary of a word is detected.

For example, the device 100 may detect the boundary of a word, based on a pause detected from the speech signal, or prosodic information including accent and intonation.

When the boundary of a word is detected, the device 100 according to an embodiment of the disclosure may obtain a first character string from the speech signal, in operation S1415.

In operation S1431, the device 100 according to an embodiment of the disclosure may calculate a confidence score of the first character string. The confidence score of the first character string may be calculated based on at least one of the likelihood of a plurality of estimated character strings obtained from the first character string or the posterior probabilities that at least one character within the first character string is replaced by another character.

For example, the device 100 may calculate the confidence score, based on a likelihood that is output as a Viterbi decoding result. Alternatively, the device 100 may calculate the confidence score, based on posterior probabilities that are output from a softmax layer in an end-to-end speech recognition model.

Alternatively, the device 100 according to an embodiment of the disclosure may determine a plurality of estimated character strings estimated during speech recognition with respect to the speech signal, and may calculate the confidence score of the first character string, based on a correlation between the plurality of estimated character strings. As the correlation between the plurality of estimated character strings including the first character string increases, the confidence score of the first character string may increase.

In operation S1433, the device 100 according to an embodiment of the disclosure may determine whether the confidence score of the first character string is less than a threshold value.

When it is determined that the confidence score of the first character string is less than the threshold value, the device 100 according to an embodiment of the disclosure may transmit the first character string to the server 200, in operation S1340. The device 100 may receive a second character string in which at least one character in the first character string has been replaced with another character, in response to the transmitted first character string. The device 100 may output the received second character string.

On the other hand, when it is determined mat the confidence score of the first character string is equal to or greater than the threshold value, the device 100 according to an embodiment of the disclosure may output the first character string, in operation S1370.

The device 100 according to an embodiment of the disclosure may output information related to a voice assistant service, by ascertaining an utterance intention of the user through natural language processing with respect to the first character string or the second character string, instead of outputting the first character string or the second character string without changes.

The device 100 may use, for example, an NLU model, a DM model, and an NLG model within the device 100, to provide a voice assistant service based on the first character string or the second character string.

For example, the device 100 may generate a response message, based on the first character string or the second character string, and output the generated response message, to imitate a person directly talking with the user in consideration of a situation of the user, a situation of a device, and the like. As another example, the device 100 may generate information requested by the user, based on the first character string or the second character string, and may output the generated information. As another example, the device 100 may ascertain an utterance intention of the user, based on the first character string or the second character string, and may request a service providing server to provide a service requested by the user. The device 100 may output information received from the service providing server.

The device 100 according to an embodiment of the disclosure may receive information related to a voice assistant service generated based on the second character string, instead of receiving the second character string from the server 200 in response to the transmitted first character string. The device 100 may output information received from the server 200. The information related to the voice assistant service may be information that is generated by the server 200, based on the second character string obtained by correcting the first character string.

For example, the information related to the voice assistant service may include a response message for the speech signal of the user, a service needed by the user, or information needed by the user.

As shown in FIG. 14, the device 100 according to an embodiment of the disclosure may determine whether to replace the first character string with another character string, based on the confidence score of the first character string. When the confidence score of the first character string is less than the threshold value, the device 100 may transmit the first character string to the server 200. The device 100 may obtain, from the server 200, the second character string obtained by replacing at least one character of the first character string with another character, based on dictionary information and a language model within the server 200. Accordingly, the device 100 according to an embodiment of the disclosure may increase speech recognition accuracy by receiving the second character string having a higher confidence score than the first character string from the server 200 and using the received second character string.

FIG. 14 illustrates an embodiment of the disclosure of calculating the confidence score of a speech recognition result in units of words uttered by a user and determining whether to replace the first character string. However, embodiments of the disclosure are not limited thereto. The device 100 according to an embodiment of me disclosure may calculate the confidence score of a speech recognition result in units of sentences uttered by a user and determining whether to replace the first character string. Conventional various methods may be used to detect termination of a sentence uttered by a user, and detailed descriptions thereof will be omitted herein.

Figure 15:
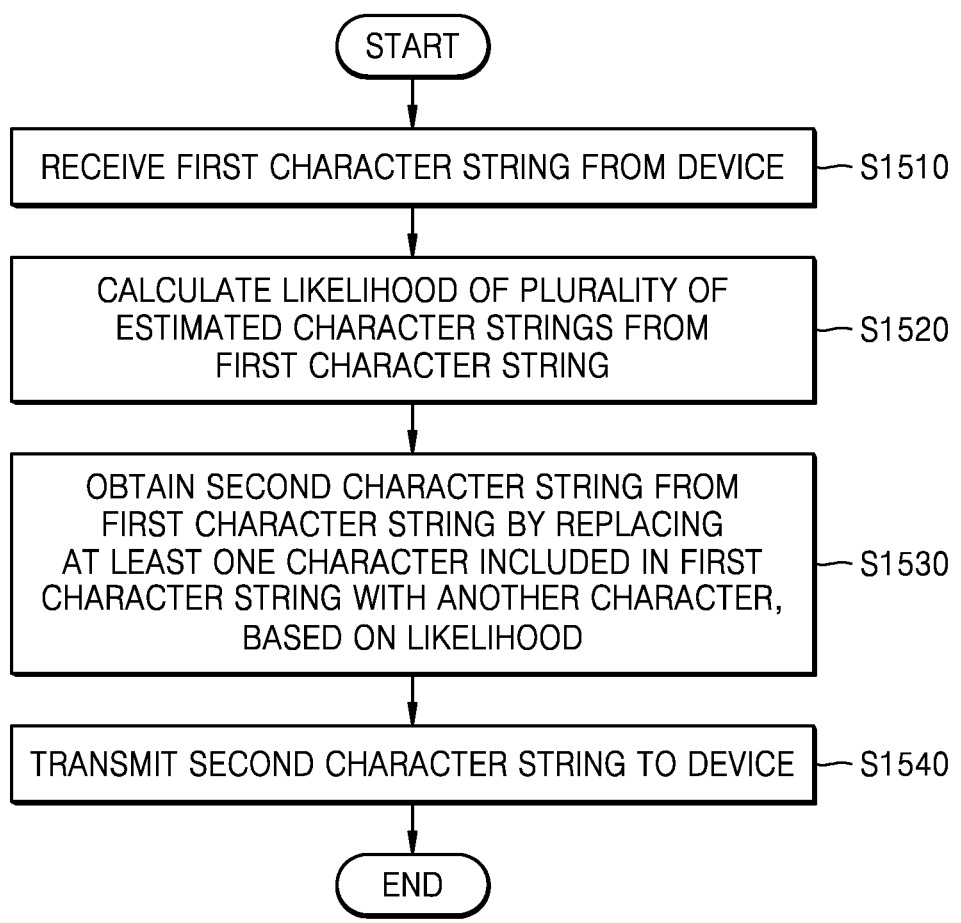
FIG. 15 is a flowchart of an operation method of a server, according to an embodiment of the disclosure.

FIG. 15 is a flowchart of an operation method of the server, according to an embodiment of the disclosure. Operations of the operation method of the server 200 to be described below may be respectively performed by the server shown in FIGS. 7 and 9.

In operation S1510, the server 200 according to an embodiment of the disclosure may receive a first character stung from the device 100. The first character string may be output via speech recognition performed by the device 100 with respect to a speech signal.

For example, the first character string received by the server 200 may be a frame-synchronized character string including characters respectively corresponding to speech signal frames obtained by splitting the speech signal at intervals of a preset time. As another example, the first character string received by the server 200 may be a frame-unsynchronized character string.

When the first character string received from the device 100 is a frame-unsynchronized character string, the processor 220 according to an embodiment of the disclosure may obtain a frame-synchronized character string from the first character string. The processor 220 may obtain the frame-synchronized character string by consecutively arranging at least one character included in the first character string a plurality of number of times in units of frames.

In operation S1520, the server 200 according to an embodiment of the disclosure may calculate likelihood of a plurality of estimated character strings from the first character string. The server 200 according to an embodiment of the disclosure may obtain the plurality of estimated character strings by replacing each of the characters included in the first character string with another character. The likelihood of the plurality of estimated character strings may refer to a probability that, when each of the plurality of estimated character strings obtained from the first character string is assumed to be a ground truth character wing, the first character string is estimated by a speech recognition module.

According to an embodiment of the disclosure, the server 200 may identify the replacement characters having similar pronunciations to each character within the first character string, and may obtain likelihood obtained from the first character string, to determine estimated character strings in which at least one character within the first character string has been corrected into another character, based on the identified replacement characters.

The server 200 according b an embodiment of the disclosure may calculate likelihood matrices relating to replacement characters that are to replace each character within the first character string, and may identify the plurality of estimated character strings, based on the likelihood values within the likelihood matrices. The server 200 may output the likelihood matrices obtained from each character, as the likelihood of the plurality of estimated character strings.

For example, the server 200 may calculate the likelihood from the first character string, based on characters accumulated prior to each character within the first character string. The server 200 according to an embodiment of the disclosure may calculate the posterior probabilities of each character within the first character string, based on the characters accumulated prior to each character within the first character string. The server 200 may calculate a character sequence probability, based on the characters accumulated prior to each character within the first character string. The server 200 may calculate the likelihood of the plurality of estimated character strings obtained from the first character string, based on the posterior probabilities of each character and the character sequence probability.

As another example, the server 200 may calculate the likelihood from the first character string in consideration of only each character within the first character string, without considering the characters accumulated prior to each character within the first character string. The server 200 according to an embodiment of the disclosure may calculate the posterior probabilities of each character within the first character string, based on a pre-determined confusion matrix. The server 200 may calculate the likelihood of the plurality of estimated character strings obtained from the first character string, based on the posterior probabilities of each character.

In operation S1530, the server 200 according to an embodiment of the disclosure may obtain the second character string from the first character string by replacing at least one character included in the first character string with another character, based on the likelihood calculated in operation S1520.

The server 200 according b an embodiment of the disclosure may identify a plurality of estimated character strings in which at least one character within the first character string has been replaced by another character, based on the calculated likelihood. The server 200 may obtain a second character string from among the plurality of estimated character strings, based on the likelihood for the identified plurality of estimated character strings, a language model, and dictionary information.

The server 200 according b an embodiment of the disclosure may determine whether to replace the first character string with the second character string, based on the calculated likelihood. The server 200 may obtain the second character string from the first character string by replacing at least one character included in the first character string with another character, based on the determination. The server 200 may select an estimated character string having maximum likelihood from the plurality of estimated character strings, based on the likelihood, the dictionary information, and the language model. The server 200 may obtain the second character string in which at least one character included in the first character string has been replaced with another character, according to the selected estimated character string.

For example, the server 200 may obtain the second character string, based on the dictionary Information and the language model stored in the server 200, by using a WFST decoder. When the server 200 performs WFST decoding, the server 200 according to an embodiment of the disclosure may constitute and decode a search space by using a WFST, based on a relationship T between characters, dictionary information L including mapping information between a word and characters, and a language model G that estimates a probability of next words when a specific word string is assigned.

As another example, the server 200 may include a Viterbi decoder that re-calculates the likelihood of the plurality of estimated character strings obtained from the first character string, based on the dictionary information and the language model. The Viterbi decoder may determine a second character string having maximum re-calculated likelihood from among the plurality of estimated character strings. The Viterbi decoder may search for a character string having highest likelihood with respect to first character strings, as the second character string, in consideration of the dictionary information and the language model.

In operation S1540, the server 200 according to an embodiment of the disclosure may transmit the second character string to the device 100. Alternatively, the server may transmit the one or more characters to be replaced and the one or more replacement characters, to the device 100.

The server 200 according to an embodiment of the disclosure may interpret the second character string by using an NLU model, and may generate a response message for the speech signal of the user, based on a result of the interpretation. The server 200 may generate the response message and additionally transmit the response message to the device 100.

Embodiments of the disclosure are not limited to the embodiment of the disclosure of FIG. 15 in which the server 200 transmits the second character string to the device 100 without changes. The server 200 according to an embodiment of the disclosure may transmit information related to a voice assistant service, by ascertaining an utterance intention of the user through natural language processing with respect to the second character string.

The server 200 may use, for example, an NLU model, a DM model, and an NLG model within the server 200, to provide a voice assistant service based on the second character string.

For example, the server 200 may generate a control command for controlling the device 100 or another device, based on a result of Interpreting the second character string, and transmit the generated control command to the device 100. As another example, the server 200 may generate a response message, based on the second character string, and transmit the generated response message, to imitate a person directly talking with the user in consideration of a situation of the user, a situation of a device, and the like. As another example, the server 200 may generate information requested by the user, based on the second character string, and may transmit the generated information. As another example, the server 200 may ascertain an utterance intention of the user, based on the second character string, and may request a service providing server to provide a service requested by the user. The server 200 may transmit information received from the service providing server.

Figure 16:
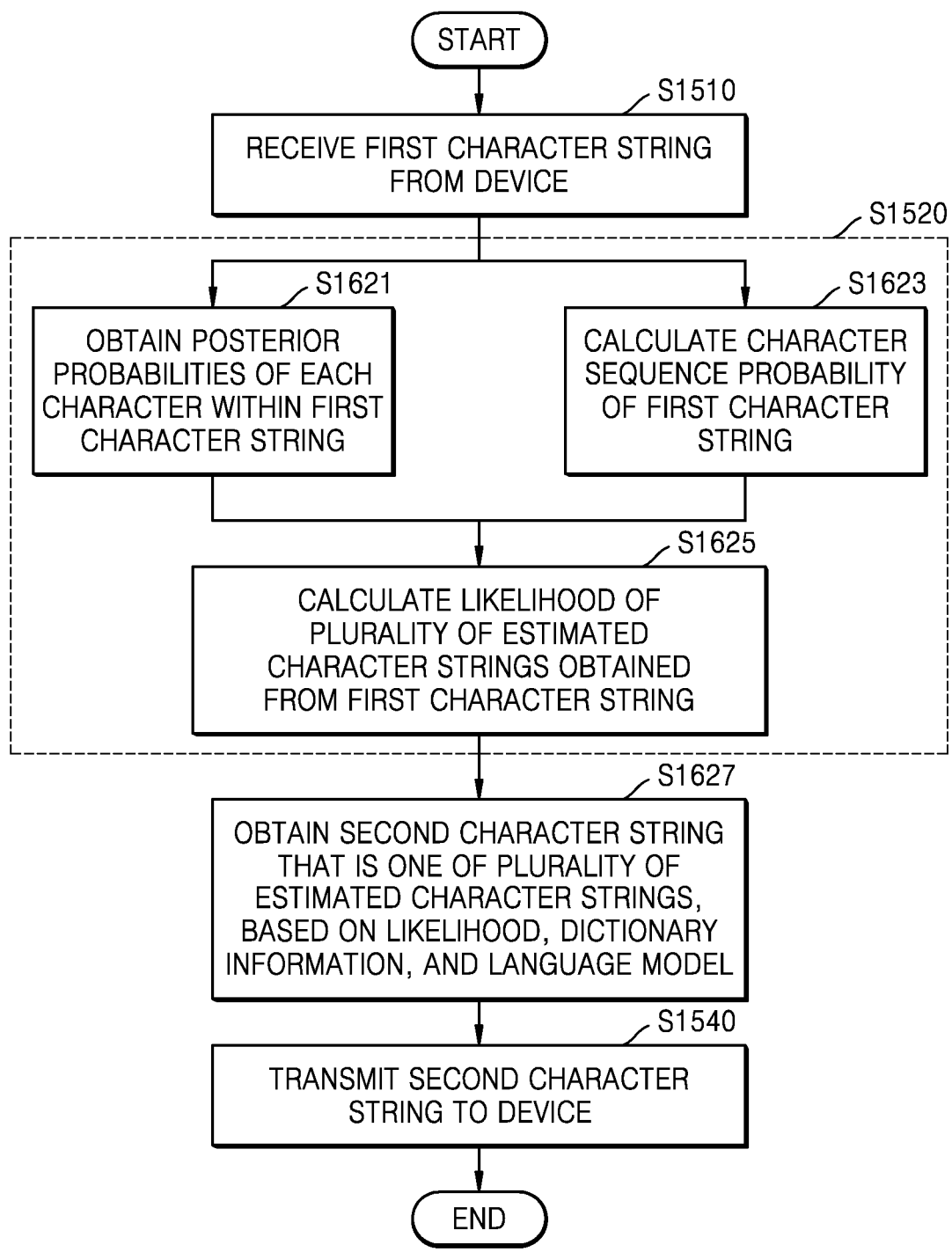
FIG. 16 is a detailed flowchart of a method of operating a server, according to an embodiment of the disclosure.

FIG. 16 is a detailed flowchart of a method of obtaining likelihood from a character string in consideration of characters accumulated prior to each character, in the operation method of the server according to an embodiment of the disclosure.

In operation S1510, the server 200 according to an embodiment of the disclosure may receive a first character string from the device 100. The operation S1510 in FIG. 16 may be the same as the operation in FIG. 15, and thus further redundant description is omitted.

In operation S1621, the server 200 according to an embodiment of the disclosure may obtain the posterior probabilities of each character within the first character string, based on the characters accumulated prior to each character within the first character string.

For example, the server 200 may calculate the posterior probabilities of each character within the first character sting, by using a neural network previously trained to calculate the posterior probability of a character string.

In operation S1623, the server 200 according to an embodiment of the disclosure may calculate a character sequence probability from the first character string.

In operation S1625, the server 200 according to an embodiment of the disclosure may calculate the likelihood of a plurality of estimated character strings obtained from the first character string, bated on the posterior probabilities calculated in operation S1621 and the character sequence probability calculated in operation S1623. The server 200 according to an embodiment of the disclosure may calculate likelihood matrices relating to replacement characters that are to replace each character within the first character string, and may obtain the likelihood of the plurality of estimated character strings, based on the calculated likelihood matrices.

The server 200 according b an embodiment of the disclosure may determine whether likelihood matrices hare been calculated for all of the characters included in the first character string. The server 200 according to an embodiment of the disclosure may repeatedly perform operations S1621, S1623, and S1625 until the likelihood matrices are calculated for all of the characters included in the first character string.

A detailed process of calculating the likelihood from the first character string has been described above with reference to FIG. 9, and thus a redundant description thereof will be omitted.

In operation S1627, the server 200 according to an embodiment of the disclosure may obtain the second character string from the likelihood calculated in operation S1525, by using dictionary information and a language model. The second character string may be a character string obtained by replacing at least one character of the first character string with another character.

For example, the server 200 may obtain the second character string from among the plurality of estimated character strings, based on the dictionary information, the language model, and the calculated likelihood, by using a WFST decoder using likelihood as an input or a Viterbi decoder using typical token passing.

In operation S1540, the server 200 according to an embodiment of the disclosure may transmit the second character string to the device 100. The server 200 according to an embodiment of the disclosure may transmit information related to a voice assistant service, by ascertaining an utterance intention of the user through natural language processing with respect to the second character string, instead of transmitting the second character string to the device 100 without changes. A repeated description thereof will be omitted. The operation 1540 in FIG. 16 may be the same as the operation in FIG. 15, and thus further redundant description is omitted.

Figure 17:
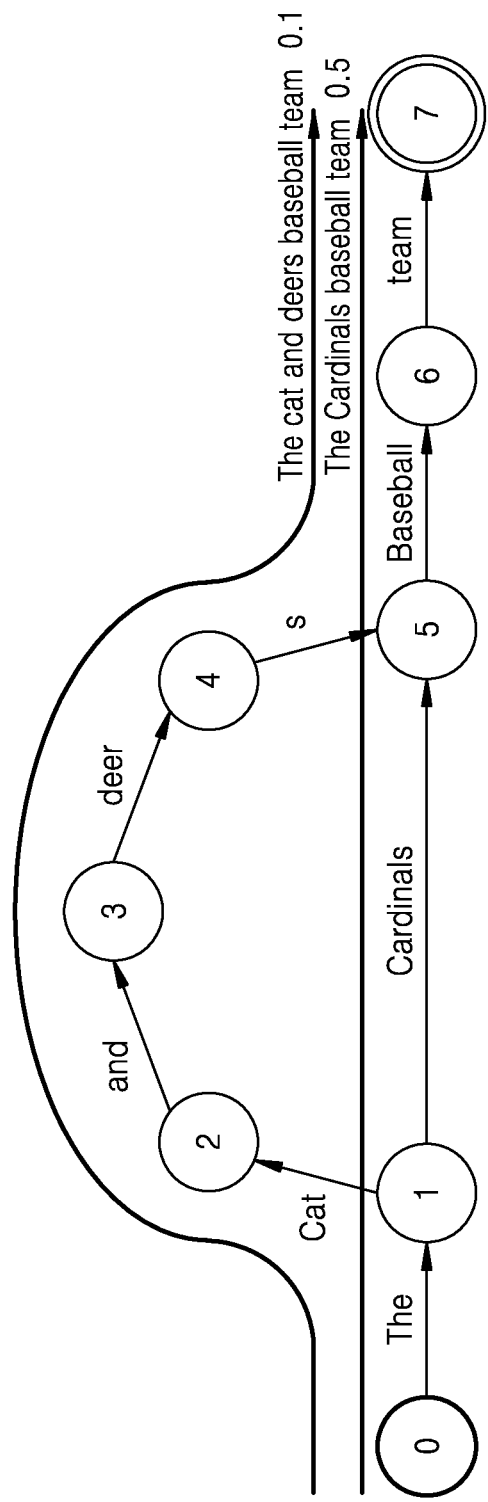
FIG. 17 is a view for explaining weighted finite state transducer (WFST) decoding performed by a service, according to an embodiment of the disclosure.

FIG. 17 is a view for explaining WFST decoding according to an embodiment of the disclosure.

The server 200 according b an embodiment of the disclosure may calculate likelihood from the first character string received from the device 100, and may perform WFST decoding by using the calculated likelihood as an input. The server 200 according to an embodiment of the disclosure may perform WFST decoding, by modeling each of a likelihood T of a plurality of estimated character strings obtained from the first character string, dictionary information L including mapping information between a word and characters, and a language model G that estimates a probability of next words when a specific word string is assigned, by using a WFST.

An example where a language model that stores information about a relationship between words 'the,' 'cat,' 'and,' 'deer,' 'is,' 'cardinals,' 'baseball,' and 'team' is modeled using a WFST will now be described. FIG. 17 illustrates a finite number of character strings that may be formed by combining words, based on the language model.

In FIG. 17, each circle indicates a state, and the words stored in the language model are represented on arrows. A WFST decoder may calculate a confidence score for a character string from each of a plurality of character strings combined along a plurality of paths. The confidence score for each character string may be calculated based on likelihood of each character string, dictionary information, and a language model. The WFST decoder may select and output a character string having a highest confidence score.

For example, as shown in FIG. 8A, the server 200 according to an embodiment of the disclosure may receive a first character string [The cat and deers baseball team] from the device 100.

The server 200 may calculate likelihood of a plurality of estimated character strings obtained from the first character string. As the calculated likelihood is input to the WFST decoder of the server 200, the WFST decoder may output a second character string. The WFST decoder may determine a second character string having a highest confidence score from among the confidence scores of the plurality of estimated character strings, and may output the determined second character string.

As shown in FIG. 8A, a named entity "Cardinals" of a sports domain may be stored in the memory 230 of the server 200. Accordingly, the processor 220 of the server 200 may determine that a probability that 'cat and deers' estimated by the device 100 is actually a baseball team name 'Cardinals' is high.

Therefore, referring to FIG. 17, the WFST decoder according to an embodiment of the disclosure may determine, as the second character string, a character string having a highest confidence score [The Cardinals baseball team] from among the plurality of estimated character strings [The cat and deers baseball team] and [The Cardinals baseball team] and may output the determined second character string.

Figure 18:
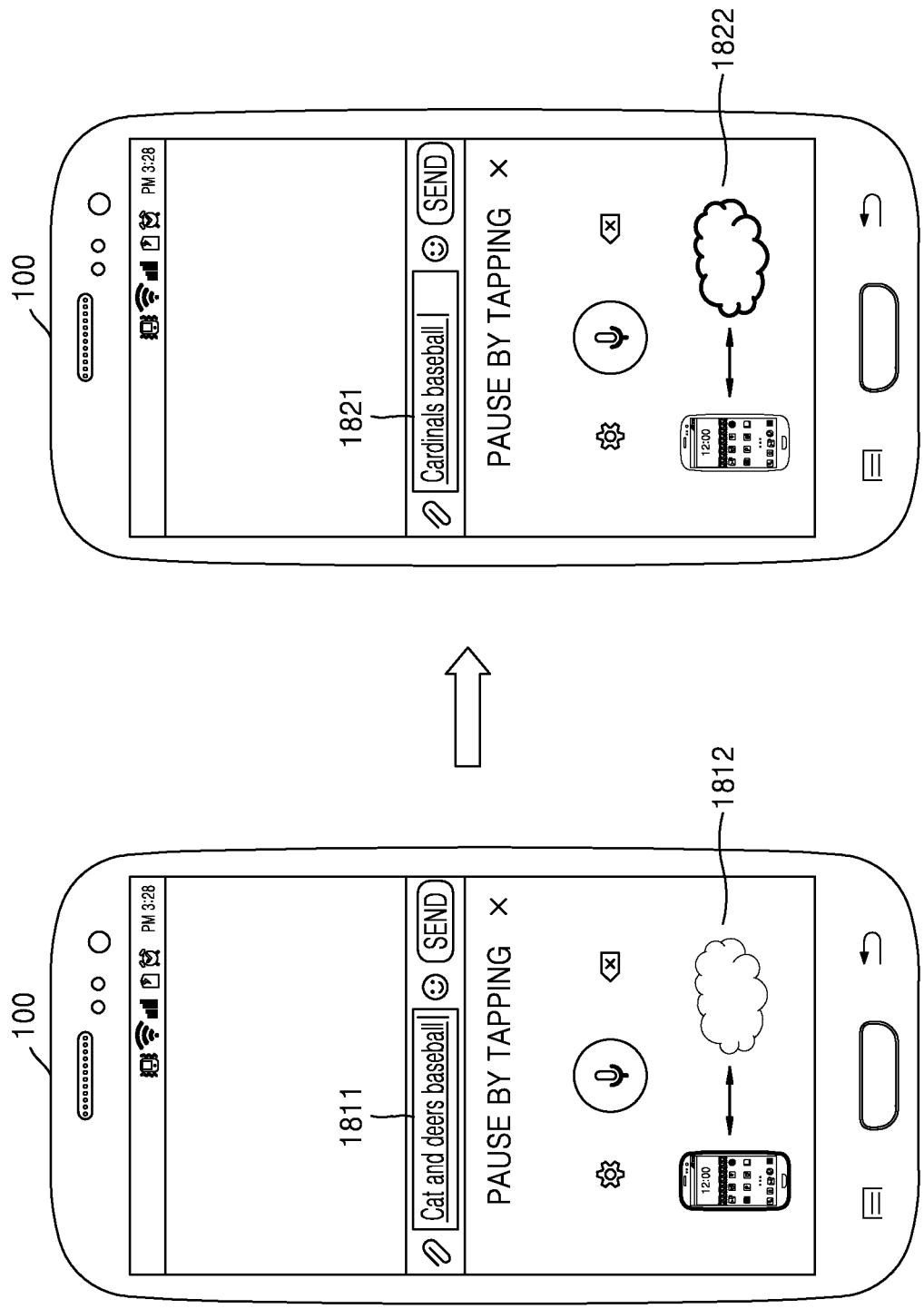
FIG. 18 illustrates a screen of a device on which a speech recognition result is displayed, according to an embodiment of the disclosure.

FIG. 18 illustrates a screen of a device on which a speech recognition result is displayed, according to an embodiment of the disclosure.

The device 100 according to an embodiment of the disclosure may output a word string 1811 of "Cat and deers baseball team" obtained from a character string estimated via speech recognition with respect to a speech signal received from a user. When on-device speech recognition is performed, the device 100 may display an image 1812 representing that on-device speech recognition is being performed, on the screen.

When a confidence score fora result of executing speech recognition by using on-device speech recognition is sufficiently high, the device 100 according to an embodiment of the disclosure may use the result of executing speech recognition, without changes.

On the other hand, when the device 100 according to an embodiment of the disclosure determines that the confidence score for the result of executing speech recognition via on-device speech recognition is insufficiently high, the device 100 may transmit a character string corresponding to the speech recognition result to the server 200.

The server 200 according b an embodiment of the disclosure may receive the character string from the device 100 and decode the character string by using the language model and the dictionary information within the server 200, thereby obtaining a character string "Caldinals baseball team" in which at least one character included in the character string has beer corrected. The server 200 may transmit "Caldinals baseball team" to the device 100.

The device 100 according to an embodiment of the disclosure may output a character string 1821 "Caldinals baseball team" received from the server 200. When server-based speech recognition is performed, the device 100 may display an image 1822 representing that server-based speech recognition is being performed, on the screen.

Figure 19:
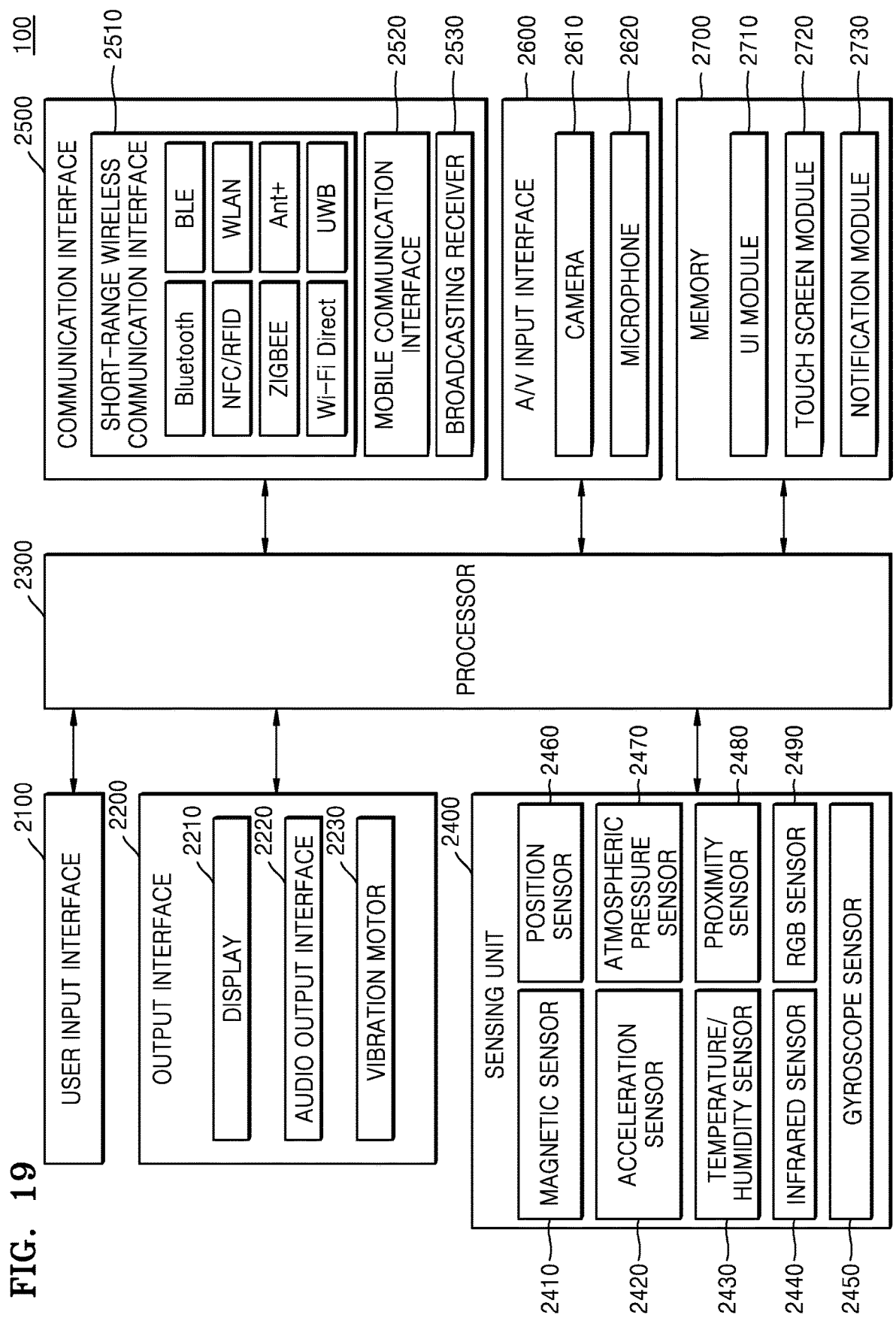
FIG. 19 is a detailed block diagram of a device according to an embodiment of the disclosure.

FIG. 19 is a detailed block diagram of the device according to an embodiment of the disclosure.

The device 100 of FIG. 19 may include the same components as those of the device 100 described above with reference to FIG. 3. For example, a processor 2300 from among the components of FIG. 19 may be the same as the processor 120 of FIG. 3, and an output interface 2220 may be the same as the output interface 150 of FIG. 3. Although not shown in FIG. 19, a memory 2700 of FIG. 19 may stare instructions for performing speech recognition, and various models, a neural network, dictionary information, and the like that are used in speech recognition, like the memory 140 of FIG. 3. Thus, a repeated description thereof will be omitted herein.

The device 100 of FIG. 19 may perform all of the operations and functions of the device 100 described above with reference to FIGS. 3 through 18. Accordingly, components of the device 100 that have not been described above will now be described.

Referring to FIG. 19, the device 100 may include the user input interface 2100, an output interface 2200, the processor 2300, the sensing unit 2400, a communication interface 2500, the A/V input interface 2600, and the memory 2700.

The user input interface 2100 denotes means via which the user inputs data for controlling the device 100. For example, the user input interface 2100 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch. The user input interface 2100 may receive a user unit necessary for generating conversation information that is to be provided to a user.

The output interface 2200 may output an audio signal, a video signal, or a vibration signal, and may include a display 2210, an audio output interface 2220, and a vibration motor 2230.

The vibration motor 2230 may output a vibration signal. For example, the vibration motor 2230 may output a vibration signal corresponding to an output of audio data or video data (for example, a call signal receiving sound or a message receiving sound).

The sensing unit 2400 may sense the status of the device 100 or the status of the surrounding of the device 100 and may transmit information corresponding to the sensed status to the processor 2300.

The sensing unit 2400 may include, but is not limited thereto, at least one selected from a magnetic sensor 2410, an acceleration sensor 2420, a temperature/humidity sensor 2430, an infrared sensor 2440, a gyroscope sensor 2450, a position sensor 2460 (e.g., a GPS), a pressure sensor 2470, a proximity sensor 2480, and an RGB sensor 2490 (i.e., an illumination sensor). Functions of most of the sensors would be instinctively understood by one of ordinary skill in the art in view of their names and thus detailed descriptions thereof will be omitted herein.

The communication interface 2500 may include a component for communicating with another device. For example, the communication interface 2500 may include a short-range wireless communication interface 2510, a mobile communication interface 2520, and a broadcasting receiver 2530.

Examples of the short-range wireless communication interface 2510 may include, but are not limited to, a Bluetooth communication interface, a Bluetooth Low Energy (BLE) communication interlace, a near field communication (NFC) interface, a wireless local area network (WLAN) (e.g., Wi-Fi) communication interface, a ZigBee communication interface, an infrared Data Association (IrDA) communication interface, a Wi-Fi direct (WFD) communication interface, an ultra wideband (UWB) communication interface, and an Ant+ communication interface.

The mobile communication interface 2520 may exchange a wireless signal with at least one selected from a base station, an external terminal, and a server on a mobile communication network. Here, examples of the wireless signal may include a voice call signal, a video call signal, and various types of data according to text/multimedia messages transmission.

The broadcasting receiver 2530 receives a broadcasting signal and/or broadcasting-related information from an external source via a broadcasting channel. The broadcasting channel may be a satellite channel, a ground wave channel, or the like. According to embodiments of the disclosure, the device 100 may not include the broadcasting receiver 2530.

The communication interface 2500 may transmit or receive information necessary for generating conversation information that is to be provided to the user, to or from a second interactive electronic device, another device, and a server.

The A/V input interface 2600 inputs an audio signal or a video signal, and may include a camera 2610 and a microphone 2620. The camera 2610 may acquire an image frame, such as a still image or a moving picture, via an image sensor in a video call mode or a photography mode. An image captured via the image sensor may be processed by the processor 2300 or a separate image processor (not shown).

The image frame obtained by the camera 2610 may be stored in the memory 2700 or transmitted to the outside via the communication interface 2500. At least two cameras 2610 may be included depending on a configuration of the device 100.

The microphone 2620 receives an external audio signal and converts the external audio signal into electrical audio data. For example, the microphone 2620 may receive an audio signal from an external device or a speaking person. The microphone 2620 may use various noise removal algorithms to remove noise that is generated while receiving the external audio signal.

The memory 2700 may store a program used by the processor 2300 to perform processing and control, and may also store data that is Input to or output from the device 100.

The memory 2700 may include at least one type of storage medium selected from among a flash memory type, a hard disk type, a multimedia card micro type, a card type memory (for example, a secure digital (SD) or extreme digital (XD) memory), a random access memory (RAMI, a static random access memory (SRAM), a read-only memory (ROM), an electrically erasable programmable ROM (EEPROM), a programmable ROM (PROM), magnetic memory, a magnetic disk, and an optical disk.

The programs stored in the memory 2700 may be classified into a plurality of modules according to their functions, for example, a user interface (UI) module 2710, a touch screen module 2720, and a notification module 2730.

The UI module 2710 may provide a UI, graphical user interface (GUI), or the like that is specialized for each application and Interoperates with the device 100. The touch screen module 2720 may detect a touch gesture on a touch screen of a user and transmit information regarding the touch gesture to the processor 2300. The touch screen module 2720 according to some embodiments of the disclosure may recognize and analyze a touch code. The touch screen module 2720 may be configured by separate hardware including a controller and may be included in the display 2210 of the output interface 2200.

The notification module 2730 may generate a signal for notifying that an event has been generated in the device 100. Examples of the event generated in the electronic apparatus 100 may include call signal receiving, message receiving, a key signal input, schedule notification, and the like. The notification module 2730 may output a notification signal in the form of a video signal via the display 2210, in the form of an audio signal via the audio output interface 2220, or in the form of a vibration signal via the vibration motor 2230.

The embodiments of the disclosure may be implemented as one or more software programs including computer-readable instructions stored in computer-readable storage media and/or the memory of the device 100.

A computer is a device capable of calling stored instructions from a storage medium and operating according to the embodiments of the disclosure according to the called instructions, and may include the image transmission devices and the image reception devices according to the embodiments of the disclosure.

The computer-readable storage medium may be provided as a non-transitory storage medium. Here, 'non-transitory' means that the storage medium does not include a signal and is tangible, but does not include distinguish whether data is stored semi-permanently or temporarily in the storage medium.

Also, electronic devices or methods according to the embodiments of the disclosure may be provided in a computer program product. The computer program product may be traded as a commodity between a seller and a purchaser.

The computer program product may include a software program and a computer-readable storage medium having the software program stored thereon. For example, the computer program product may include a product in the form of a software program (e.g., a downloadable app) that is electronically distributed through the manufacturer of an electronic device or an electronic market (e.g., Google Play Store, AppStore). For electronic distribution, at least a portion of the software program may be stored on a storage medium or may be created temporarily. In this case, the storage medium may be a server of a manufacturer, a server of an electronic market, or a storage medium of a relay server for temporarily storing an software program.

The computer program product may Include a storage medium of a server or a storage medium of a terminal in a system composed of a server and a terminal (e.g., an image transmission device or an image reception device). Alternatively, when there is a third device (e.g., a smartphone) in communication with the server or terminal, the computer program product may include a storage medium of the third device. Alternatively, the computer program product may include the software program itself transmitted from the server to the terminal or the third device, or transmitted from the third device to the terminal.

In this case, one of the server, the terminal, and the third device may execute the computer program product to perform the methods according to the embodiments of the disclosure. Alternatively, at least two of the server, the terminal, and the third device may execute the computer program product to distribute and perform the methods according to the embodiments of the disclosure.

For example, a server (e.g., a cloud server or an AI server) may execute a computer program product stored on a server to control a terminal communicating with the server to perform the methods according to the embodiments of the disclosure.

As another example, a third device may execute a computer program product to control a terminal in communication with the third device to perform the methods according to the embodiments of the disclosure. For example, the third device may remotely control an image transmission device or an image reception device to transmit or receive a packing image.

When the third device executes the computer program product, the third device may download the computer program product from the server and execute the downloaded computer program product. Alternatively, the third device may execute a computer program product provided in a preloaded state to perform methods according to the embodiments of the disclosure.

What is claimed is:
1. A server comprising:
   a memory storing one or more computer-readable instructions;
   a processor configured to execute the one or more computer-readable instructions stored in the memory; and
   a communication interface configured to receive from a device a first character string of speech recognition by the device of a speech signal input to the device,
   wherein the processor when executing the one or more computer-readable instructions is configured to:
      identify an estimated character string to replace a portion of the first character string, based on the first character string; and control the communication interface to transmit a second character string to the device, the second character string comprising the portion of the first character string replaced with the estimated character string, and wherein the processor when executing the one or more computer-readable instructions is further configured to:

calculate likelihood matrices relating to replacement characters of the estimated character string that are to replace each character of the first character string, based on characters of the first character string accumulated prior to each character of the first character string; and identify the estimated character string based on likelihood values within the likelihood matrices.

2. The server of claim 1, wherein the processor when executing the one or more computer-readable instructions is further configured to:

obtain, the second character string, by replacing the portion of the first character string with the estimated character string based on the replacement characters, and wherein the replacement characters are characters having pronunciations similar to each character within the first character string.

3. The server of claim 1, wherein the processor when executing the one or more computer-readable instructions is further configured to:

calculate a likelihood of the estimated character string, based on the likelihood values within the likelihood matrices; and select the estimated character string from among a plurality of estimated character strings, based on the likelihood, dictionary information, and a language model.

4. The server of claim 1, wherein the likelihood matrices obtained for each character of the first character string are calculated based on posterior probabilities calculated based on characters of the first character string accumulated prior to each character of the first character string, and a character sequence probability calculated based on the characters of the first character string accumulated prior to each character of the first character string.

5. The server of claim 4, wherein the posterior probabilities are calculated using an artificial intelligence recurrent neural network (RNN) including a plurality of long-short term memory (LSTM) layers and a softmax layer.

6. The server of claim 1, wherein the likelihood matrices obtained for each character of the first character string are calculated based on a pre-determined confusion matrix.

7. The server of claim 1, wherein the first character string includes characters respectively corresponding to speech signal frames obtained by splitting the speech signal at intervals of a preset time.

8. The server of claim 1, wherein the processor when executing the one or more computer-readable instructions is further configured to provide a service associated with the speech signal input to the device, based on the second character string.

9. A device comprising:

a memory storing one or more computer-readable instructions;

a processor configured to execute the one or more computer-readable instructions stored in the memory; and a communication interface configured to communicate with a server, wherein the processor when executing the one or more computer-readable instructions is further configured to:

obtain a first character string by performing speech recognition on a speech signal;

determine whether to replace a portion of the first character string with another character string;

control the communication interface to transmit the first character string to the server, based on the determination; and control the communication interface to receive, from the server, a second character string obtained by the server by replacing the portion included in the first character string with an estimated character string.

10. An operation method of a server, the operation method comprising:

receiving from a device a first character string of speech recognition by the device of a speech signal input to the device;

identifying an estimated character string to replace a portion of the first character string, based on the first character string;

transmitting a second character string to the device, the second character string comprising the portion of the first character string replaced with the estimated character string, wherein the identifying comprises:

calculating likelihood matrices relating to replacement characters of the estimated character string that are to replace each character of the first character string, based on characters of the first character string accumulated prior to each character of the first character string; and identifying the estimated character string based on likelihood values within the likelihood matrices.

11. The operation method of claim 10, wherein the obtaining of the second character string, based on a plurality of estimated character strings, comprises obtaining, the second character string, by replacing the portion of the first character string with the estimated character string based on the replacement characters, and the replacement characters are characters having pronunciations similar to each character within the first character string.

12. The operation method of claim 10, wherein the obtaining of the second character string comprises:

calculating a likelihood of the estimated character string, based on the likelihood values within the likelihood matrices; and selecting the estimated character string from among a plurality of estimated character strings, based on the likelihood, dictionary information, and a language model.

13. The operation method of claim 10, wherein the likelihood matrices obtained for each character of the first character string are calculated based on posterior probabilities calculated based on characters of the first character string accumulated prior to each character of the first character string, and a character sequence probability calculated based on the characters of the first character string accumulated prior to each character of the first character string.

14. The operation method of claim 10, wherein the first character string includes characters respectively corresponding to speech signal frames obtained by splitting the speech signal at intervals of a preset time.

15. The operation method of claim 10, further comprising providing a service associated with the speech signal input to the device, based on the second character string.

16. An operation method of a device, the operation method comprising:
- obtaining a first character string by performing speech recognition on a speech signal;
- determining whether to replace a portion of the first character string with another character string;
- transmitting the first character string to a server, based on the determination; and
- receiving, from the server, a second character string obtained by the server by replacing the portion included in the first character string with an estimated character string.

* * * * *